US012640836B2

(12) United States Patent
Li et al.

(10) Patent No.: US 12,640,836 B2
(45) Date of Patent: May 26, 2026

(54) METHOD FOR SIGNAL TRANSMISSION AND APPARATUS THEREOF

(71) Applicant: SAMSUNG ELECTRONICS CO., LTD., Suwon-si (KR)

(72) Inventors: Qi Li, Beijing (CN); Peng Lin, Beijing (CN); Di Su, Beijing (CN); Chen Qian, Beijing (CN); Longhai Zhao, Beijing (CN); Bin Yu, Beijing (CN); Yunchuan Yang, Beijing (CN); Yu Xiao, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 243 days.

(21) Appl. No.: 18/260,588

(22) PCT Filed: Jan. 7, 2022

(86) PCT No.: PCT/KR2022/000268
§ 371 (c)(1),
(2) Date: Jul. 6, 2023

(87) PCT Pub. No.: WO2022/149893
PCT Pub. Date: Jul. 14, 2022

(65) Prior Publication Data
US 2024/0305404 A1      Sep. 12, 2024

(30) Foreign Application Priority Data

Jan. 7, 2021   (CN) .......................... 202110018846.8
Jan. 7, 2021   (CN) .......................... 202110019659.1
(Continued)

(51) Int. Cl.
*H04W 72/20*      (2023.01)
*H04L 1/00*       (2006.01)
(Continued)

(52) U.S. Cl.
CPC ............ *H04L 1/0026* (2013.01); *H04L 27/36* (2013.01); *H04L 27/38* (2013.01)

(58) Field of Classification Search
CPC ... H04L 1/0003; H04L 1/0026; H04L 5/0048; H04L 5/006; H04L 27/2613;
(Continued)

(56) References Cited

U.S. PATENT DOCUMENTS 8,452,238 B2 *   5/2013   Nakajima ........... H04W 52/262
                                                   370/335
9,634,778 B2     4/2017   Gruber
(Continued)

FOREIGN PATENT DOCUMENTS

EP      1760940 A1      3/2007
EP      2575386 A1      4/2013
EP      3648369 A1      5/2020

OTHER PUBLICATIONS

Supplementary European Search Report dated May 8, 2024, in connection with European Patent Application No. 22736870.1, 8 pages.
(Continued)

*Primary Examiner* — Frank Duong

(57) ABSTRACT

A method for signal transmission and apparatus thereof are provided. Particularly, an uplink signal transmission method is provided, comprising: reporting parameters of signal transmission quality in a specific modulation mode; acquiring configuration parameters of an uplink physical channel and/or a physical signal; and transmitting an uplink signal according to the configuration parameters of the uplink physical channel and/or the physical signal.

18 Claims, 31 Drawing Sheets

<table>
<tr><td>(30)</td><td colspan="3"><b>Foreign Application Priority Data</b></td></tr>
</table>

| | | | |
|---|---|---|---|
| May 21, 2021 | (CN) | ......................... | 202110560600.3 |
| Jun. 18, 2021 | (CN) | ......................... | 202110679480.9 |
| Oct. 22, 2021 | (CN) | ......................... | 202111233514.8 |

(51) Int. Cl.

*H04L 27/36* (2006.01)
*H04L 27/38* (2006.01)

(58) Field of Classification Search

CPC ..... H04L 27/2614; H04L 27/34; H04L 27/36; H04L 27/38; H04W 52/146; H04W 52/247; H04W 52/26; H04W 52/365; H04W 52/367; H04W 72/0446; H04W 72/0453; H04W 72/0473; H04W 72/08; H04W 72/1268; H04W 72/231

See application file for complete search history.

(56) References Cited

U.S. PATENT DOCUMENTS

| | | | | |
|---|---|---|---|---|
| 10,355,842 | B2 * | 7/2019 | Lee | ....................... H04W 52/16 |
| 10,958,489 | B2 * | 3/2021 | Kwon | ................ H04L 27/3405 |
| 11,553,358 | B2 * | 1/2023 | Pius | ...................... H04W 24/08 |
| 2009/0161561 | A1 | 6/2009 | Zhou | |
| 2015/0195819 | A1 * | 7/2015 | Kwon | ................... H04L 1/0026 |
| | | | | 370/329 |
| 2017/0099669 | A1 | 4/2017 | Jung et al. | |
| 2020/0052761 | A1 * | 2/2020 | Nammi | ............... H04B 7/0626 |
| 2020/0145280 | A1 | 5/2020 | Cirik et al. | |
| 2020/0323031 | A1 * | 10/2020 | Nakamura | ........... H04W 80/08 |
| 2021/0100067 | A1 * | 4/2021 | Logothetis | ........... H04W 48/17 |
| 2023/0388934 | A1 * | 11/2023 | Li | ...................... H04W 52/367 |

OTHER PUBLICATIONS

ETSI TS 138 213 V16.3.0 (Nov. 2020), 5G; NR; Physical layer procedures for control (3GPP TS 38.213 version 16.3.0 Release 16), Nov. 2020, 181 pages.

ETSI TS 138 211 V15.8.0 (Jan. 2020 ), 5G; NR; Physical channels and modulation (3GPP TS 38.211 version 15.8.0 Release 15), Jan. 2020, 100 pages.

International Search Report and Written Opinion of the International Searching Authority dated Apr. 13, 2022, in connection with International Application No. PCT/KR2022/000268, 7 pages.

\* cited by examiner

[Fig. 1]

[Fig. 2A]
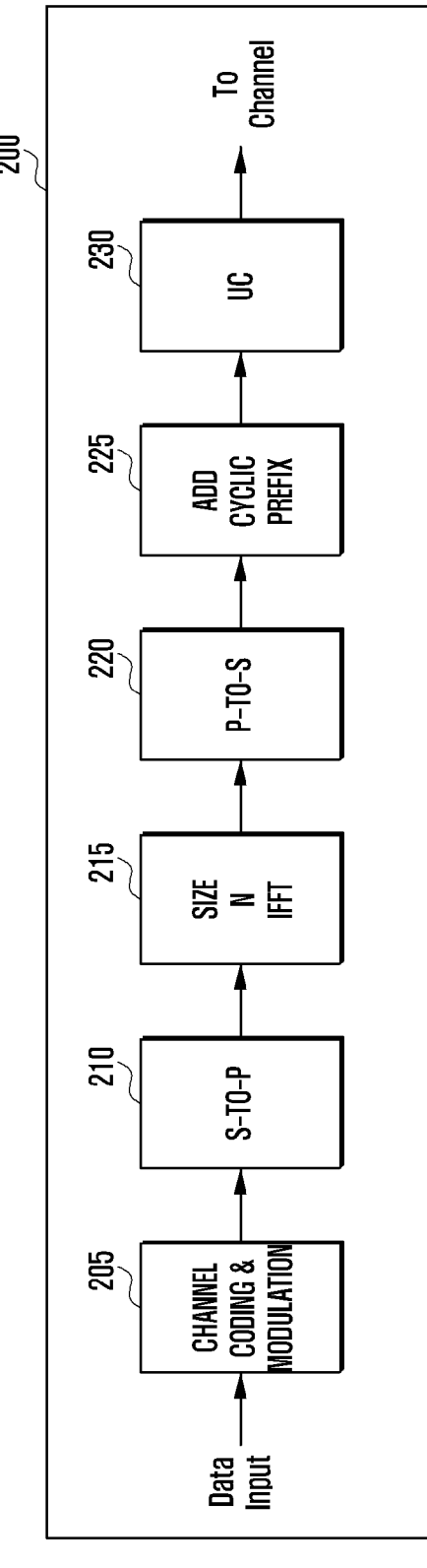

Figure 2B:
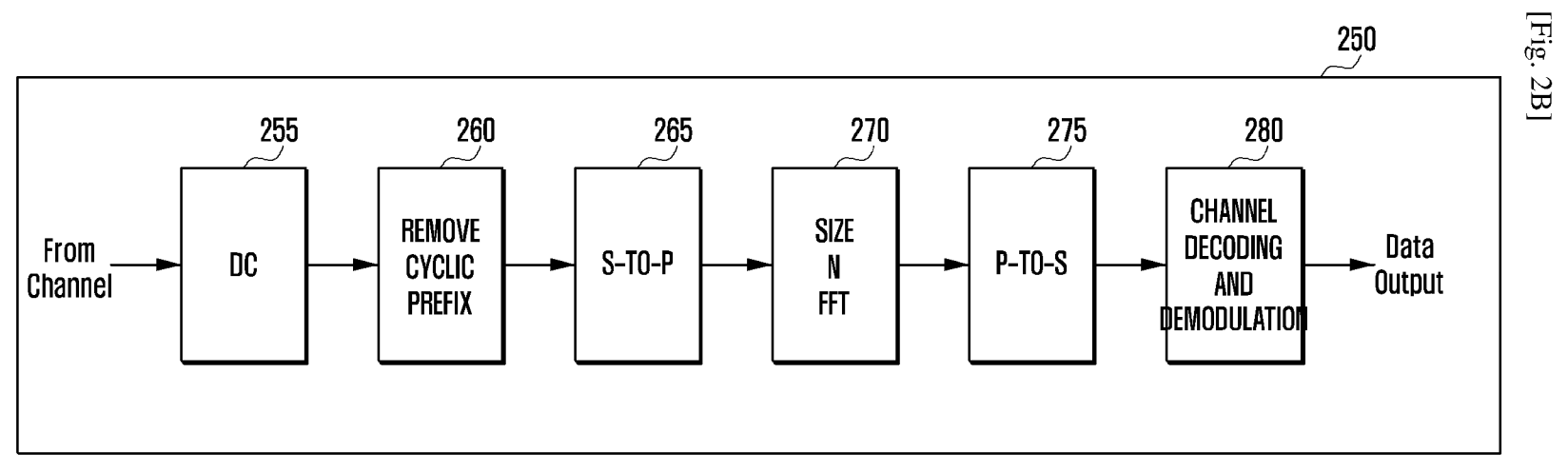

From Channel → 255 DC → 260 REMOVE CYCLIC PREFIX → 265 S-TO-P → 270 SIZE N FFT → 275 P-TO-S → 280 CHANNEL DECODING AND DEMODULATION → Data Output

[Fig. 3A]
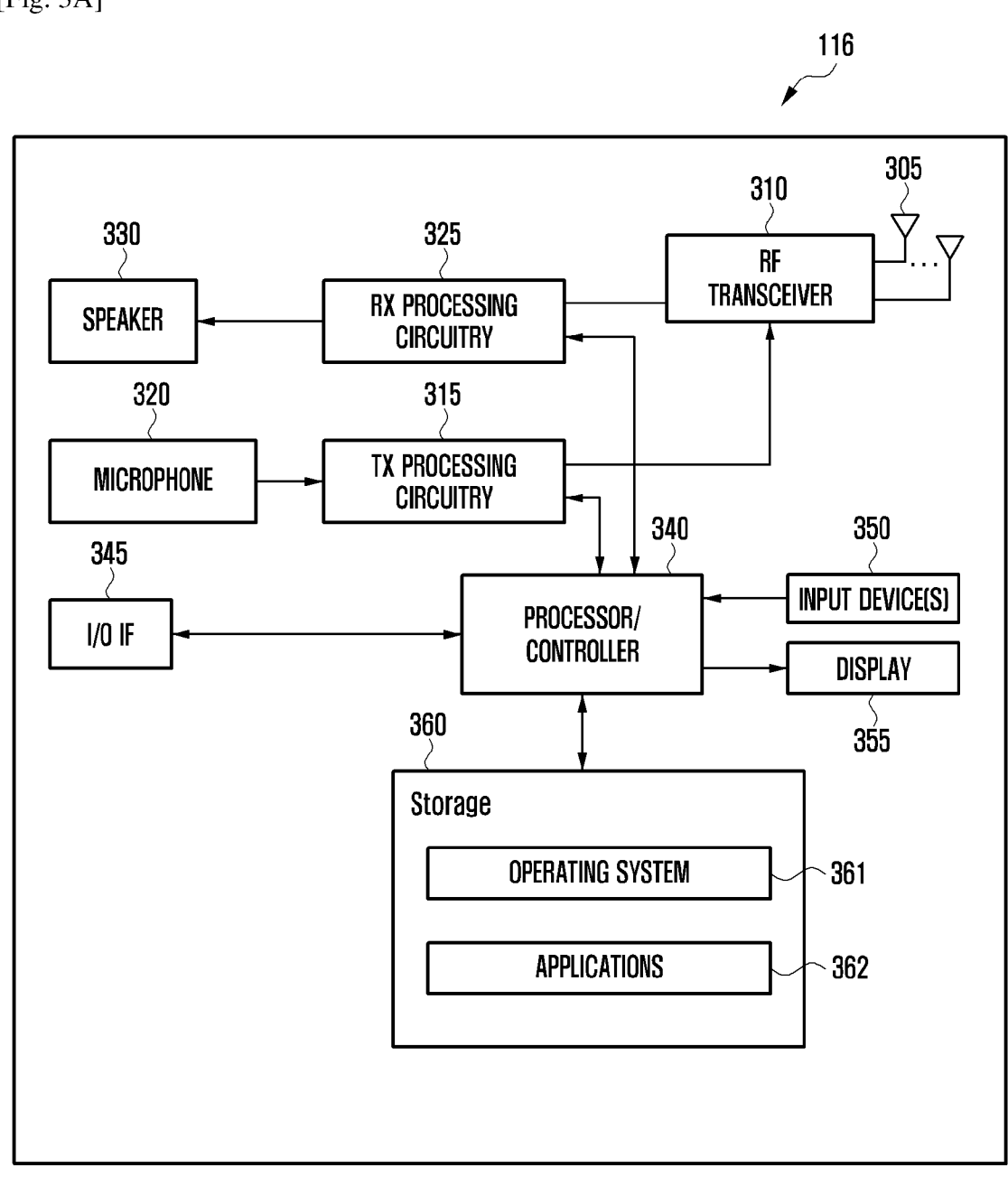

[Fig. 3B]
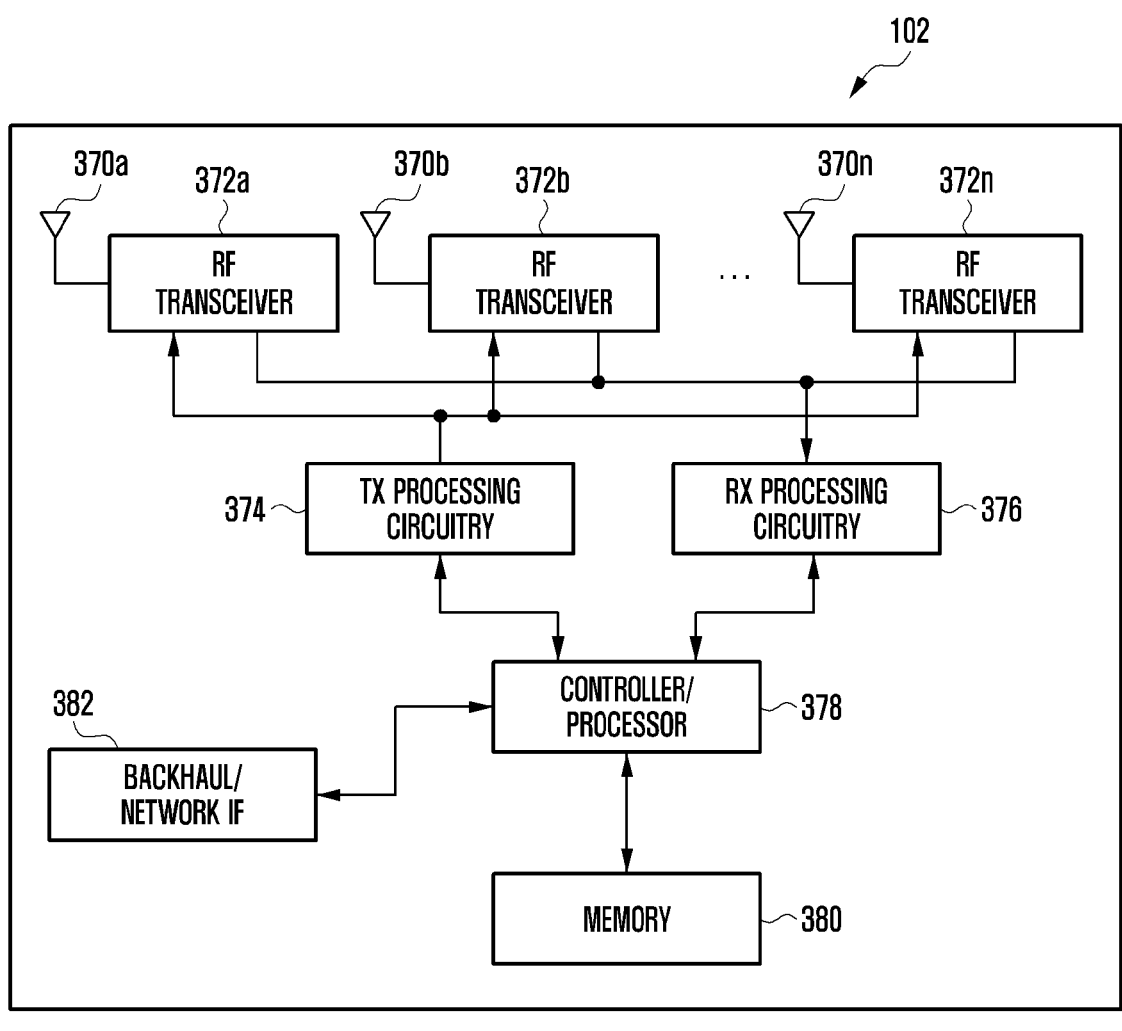
[Fig. 4]
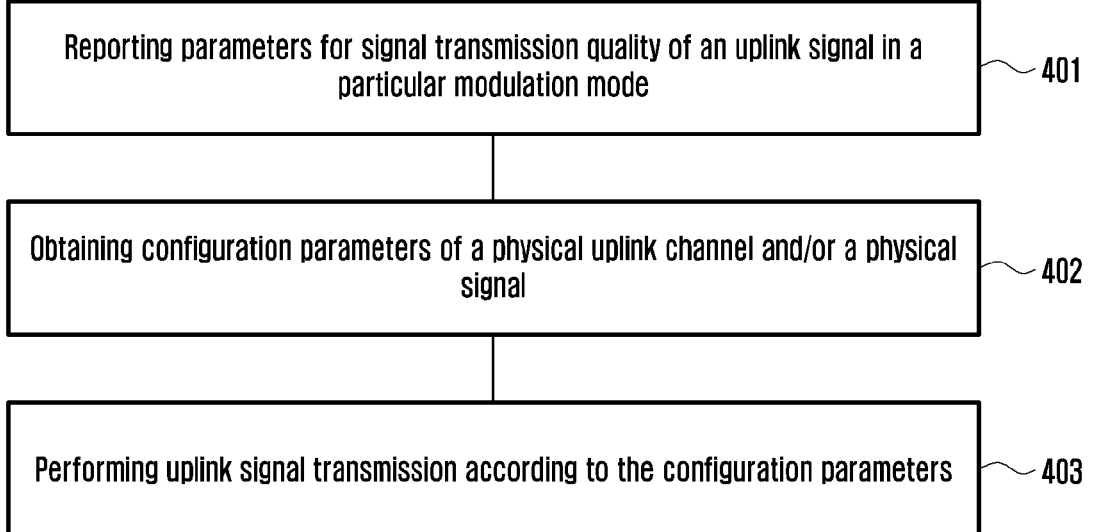

[Fig. 5]
[Fig. 6]
[Fig. 7]
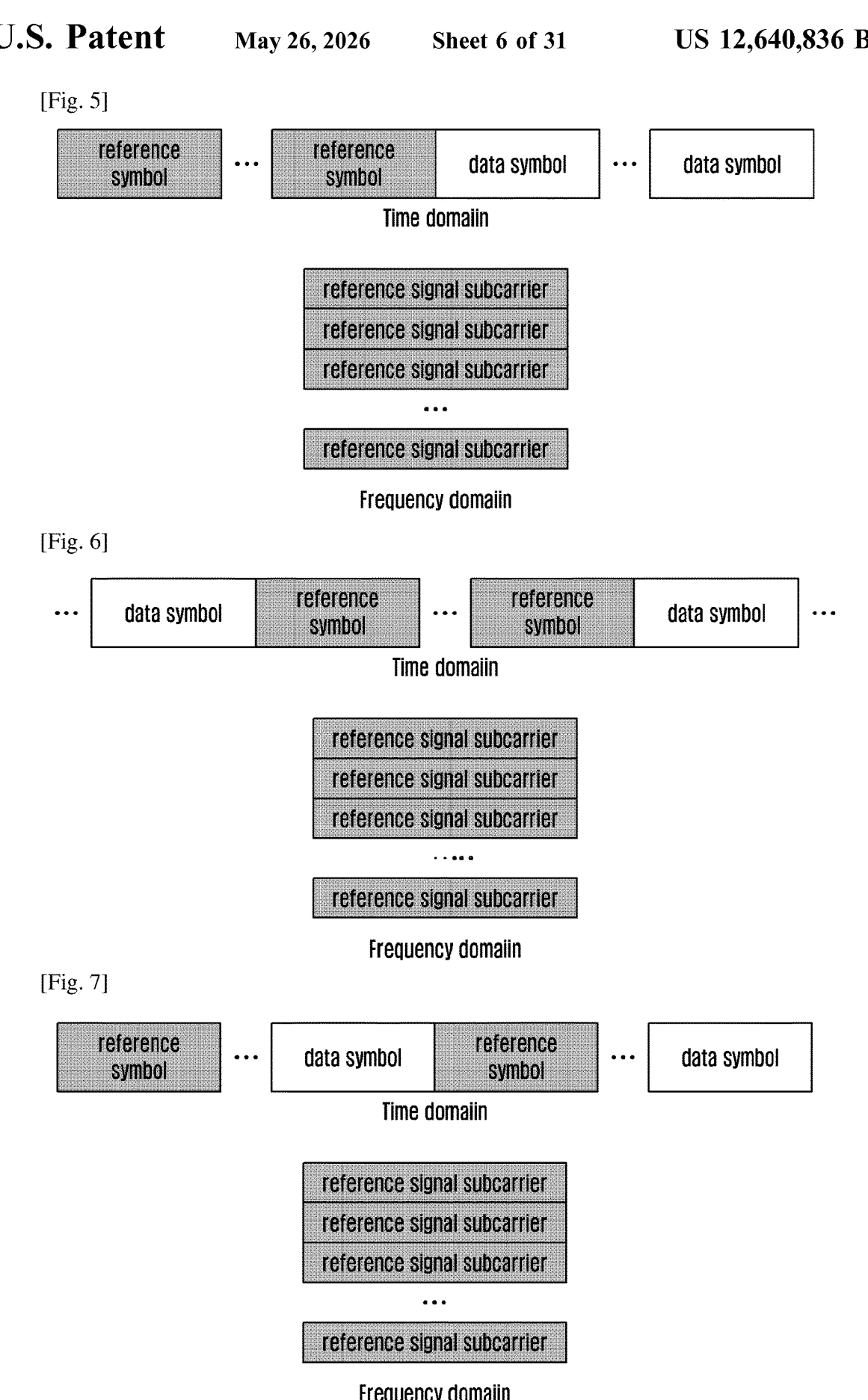

[Fig. 8]
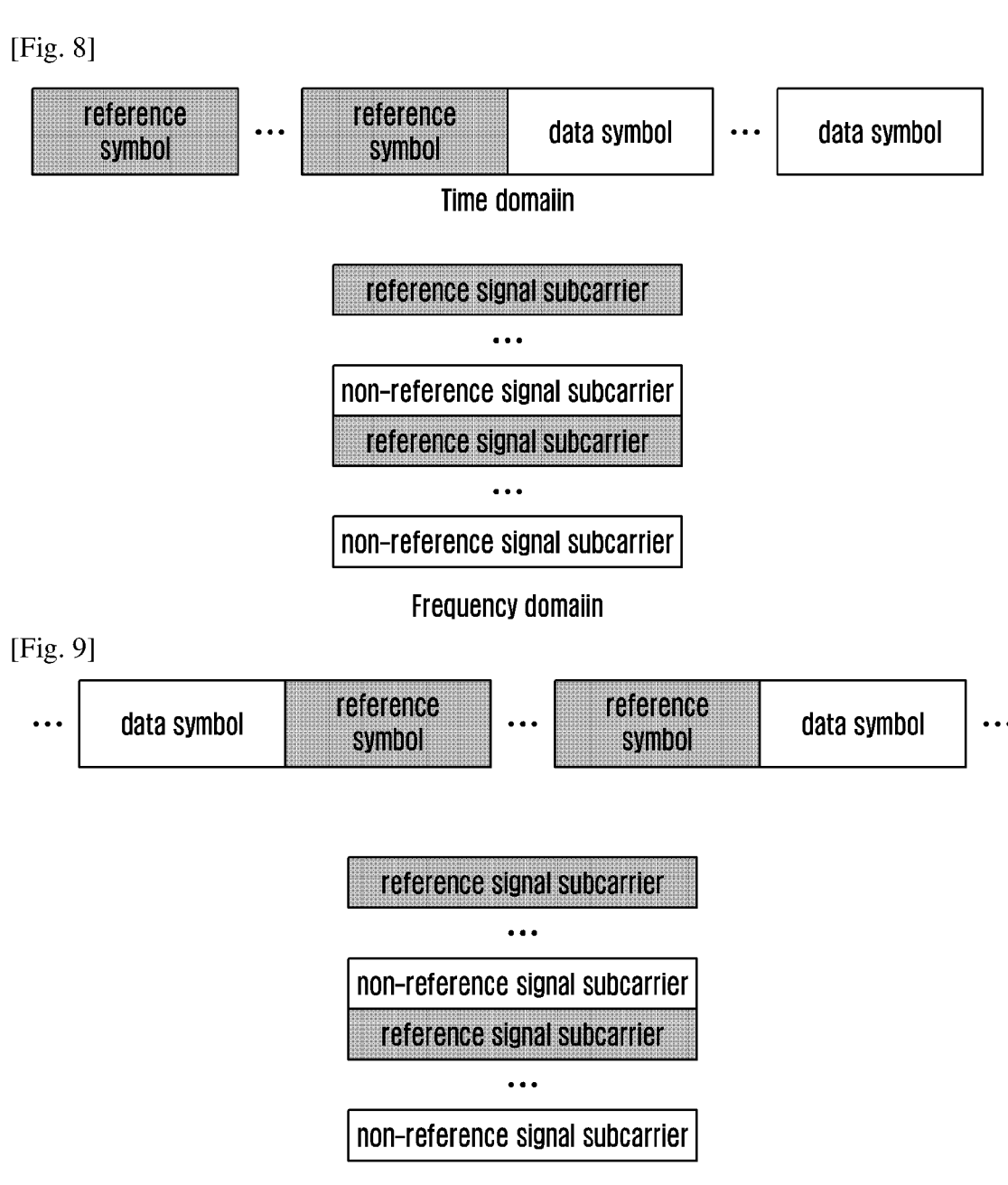
[Fig. 9]

[Fig. 10]
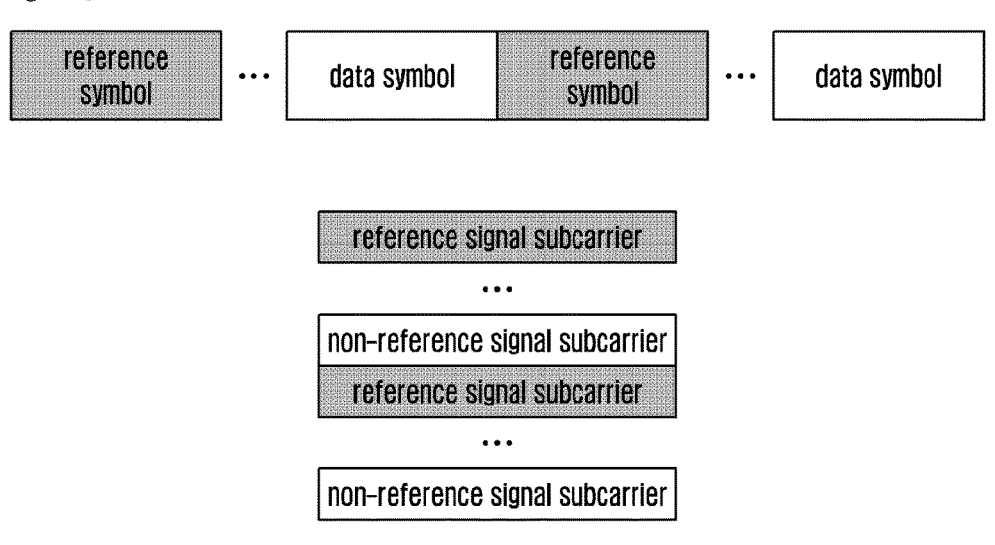
[Fig. 11]
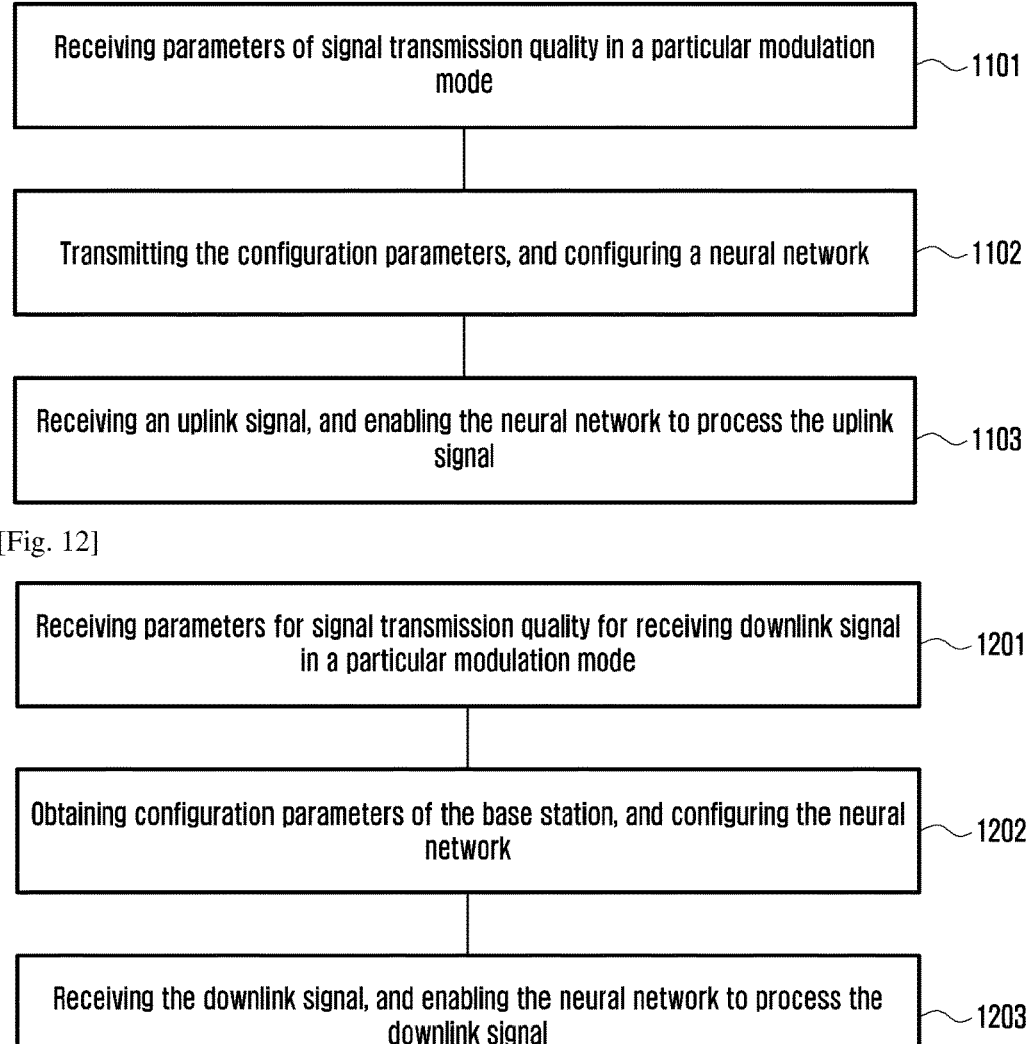

[Fig. 13]
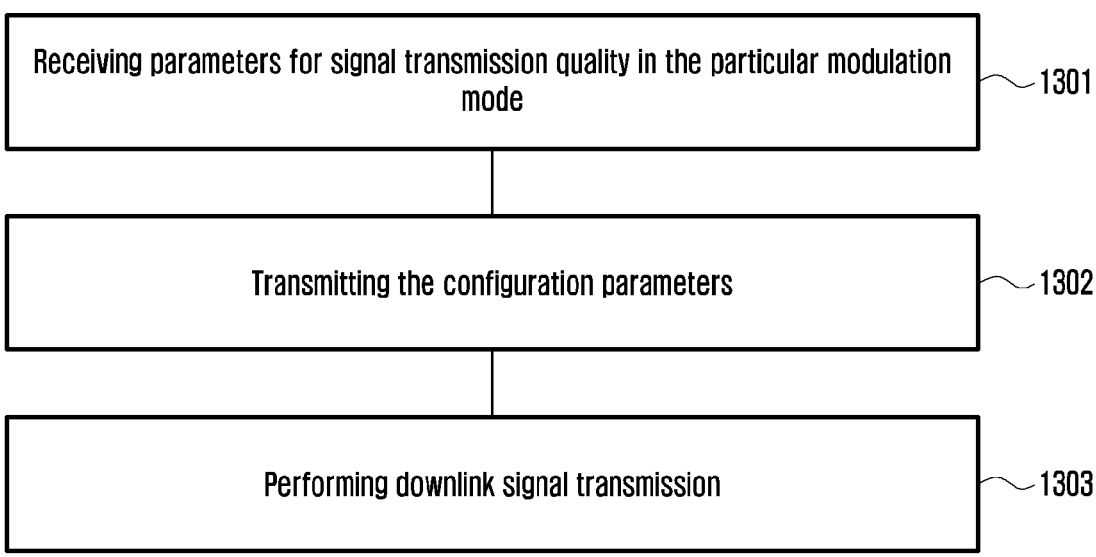
Receiving parameters for signal transmission quality in the particular modulation mode — 1301
Transmitting the configuration parameters — 1302
Performing downlink signal transmission — 1303

[Fig. 14]
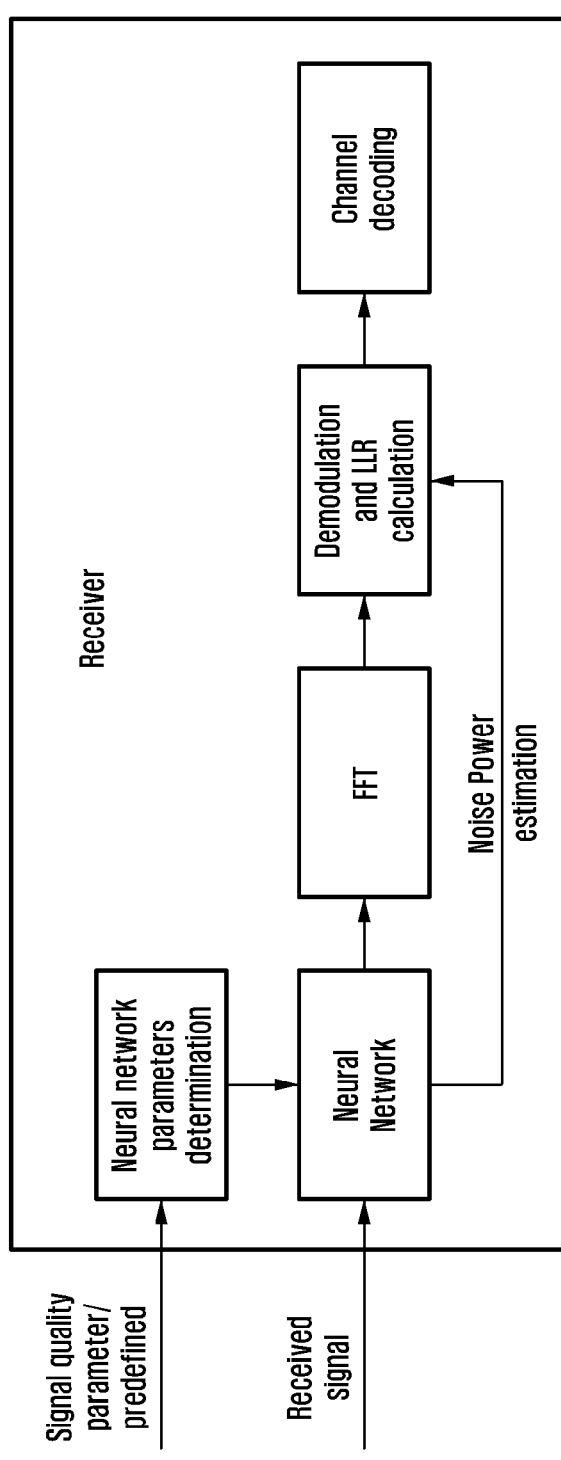

[Fig. 15]
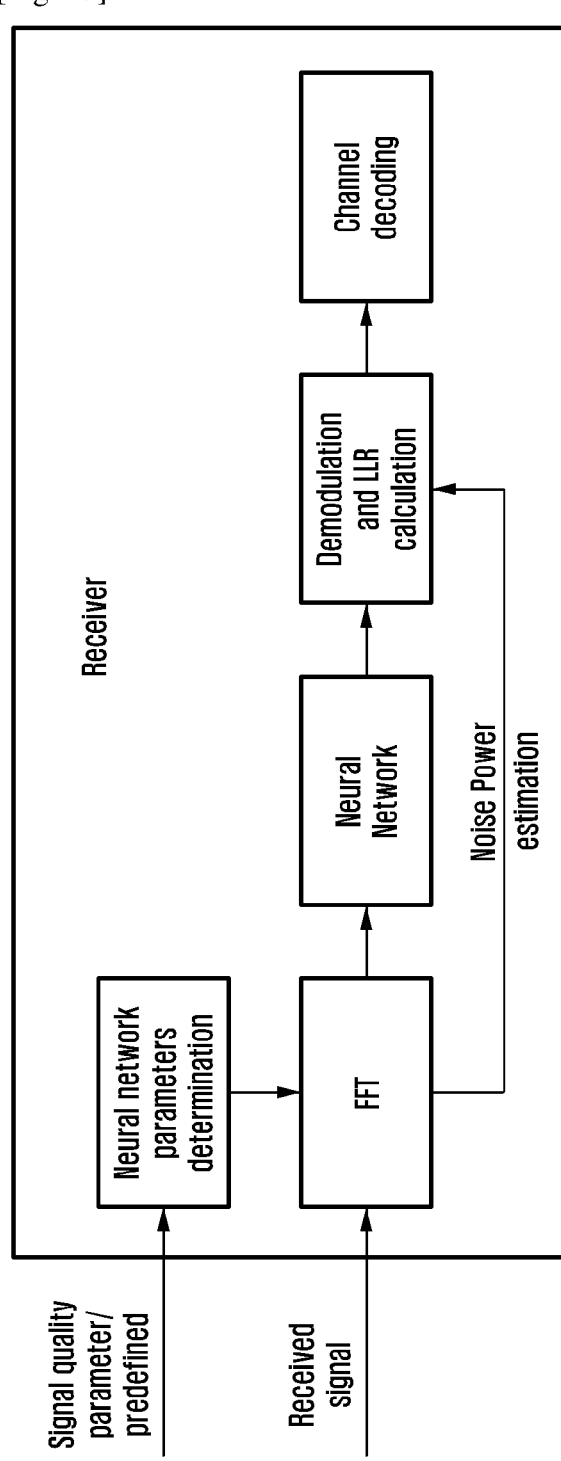

[Fig. 16]
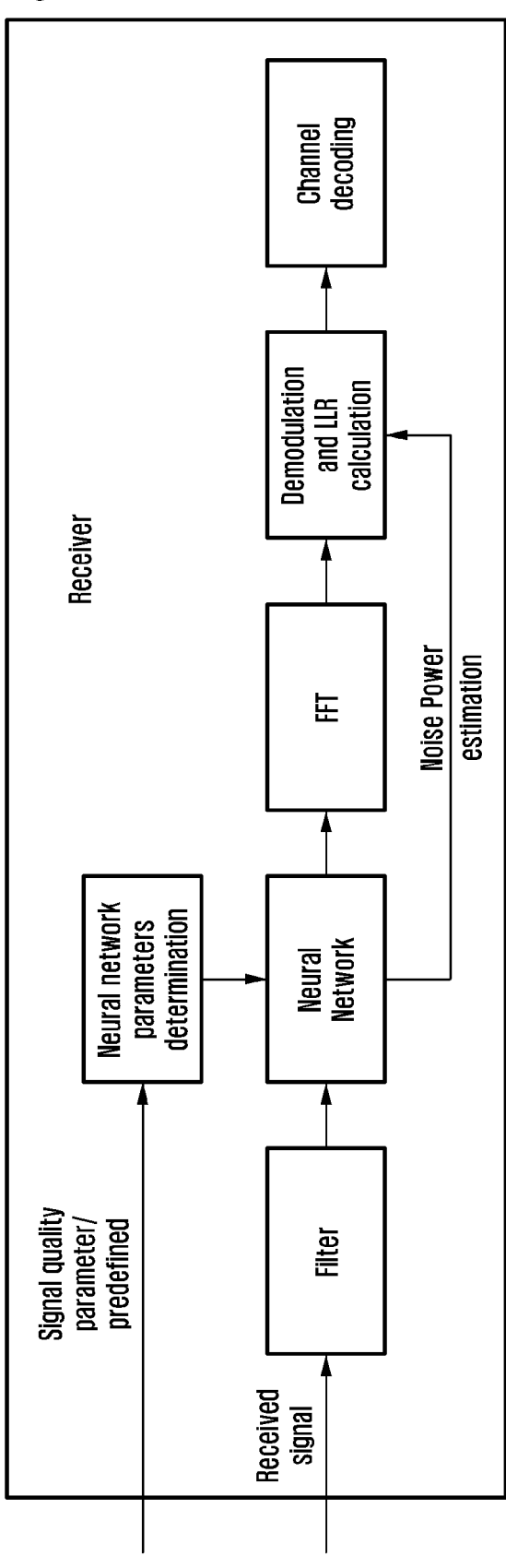

[Fig. 17]
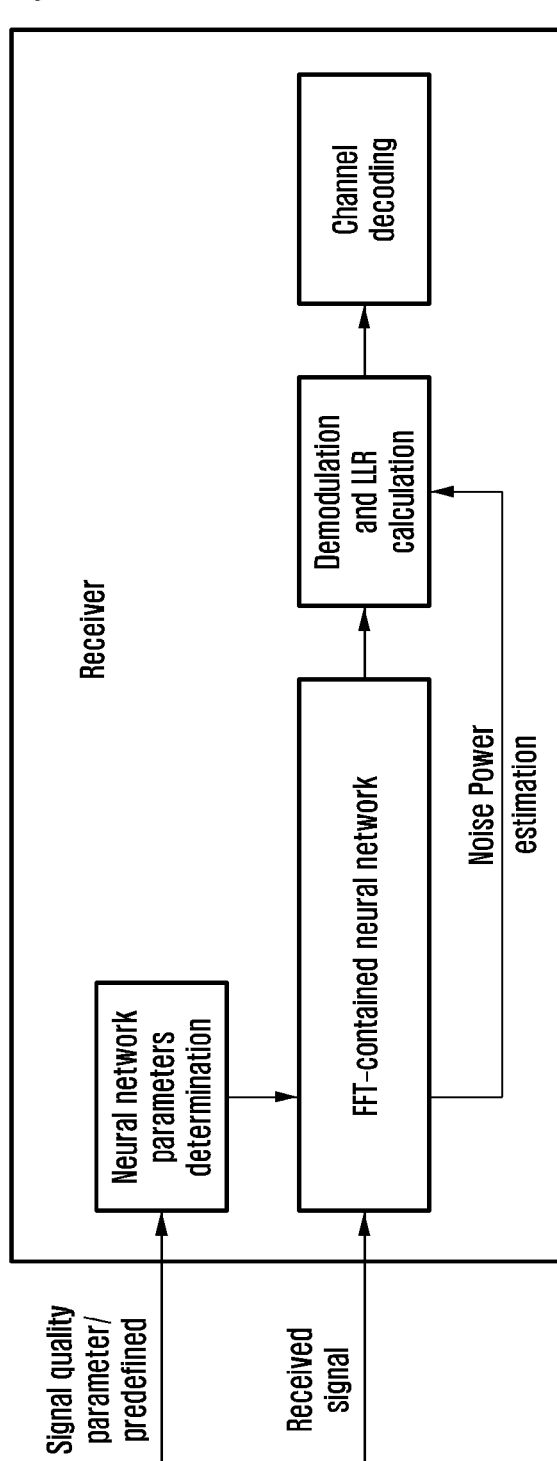

[Fig. 18]
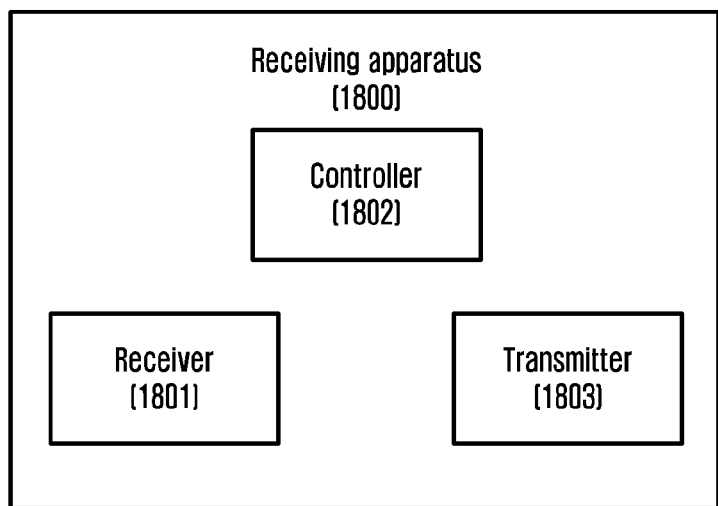
[Fig. 19]
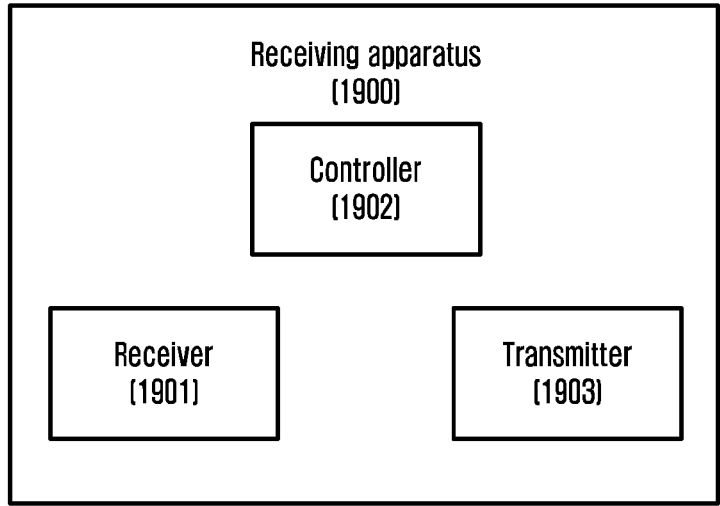
[Fig. 20]
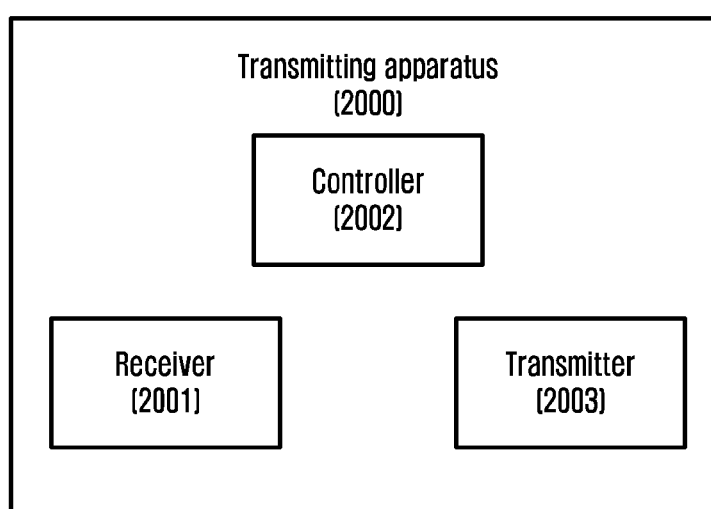

[Fig. 21]
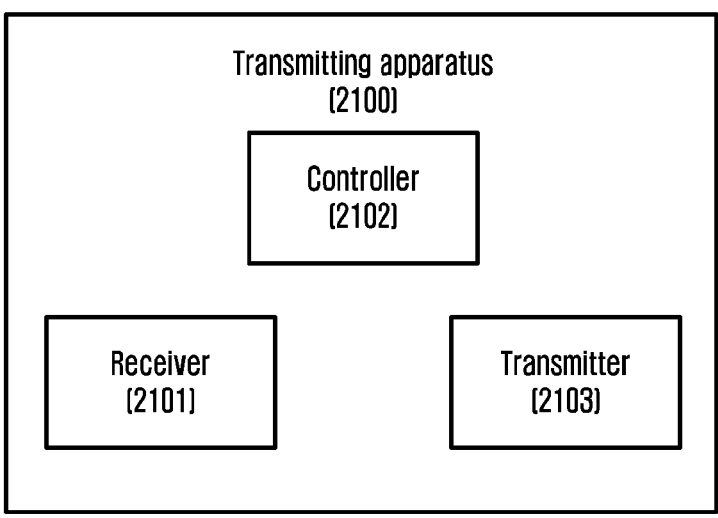

[Fig. 22]
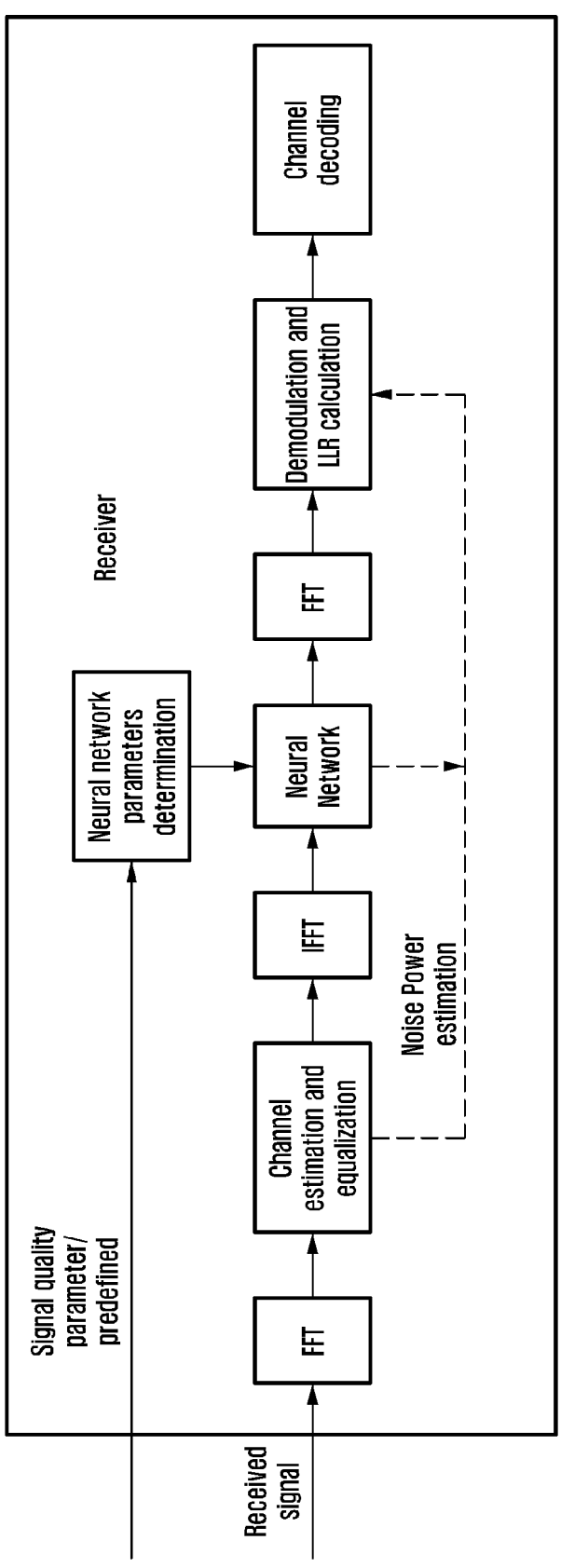

[Fig. 23]
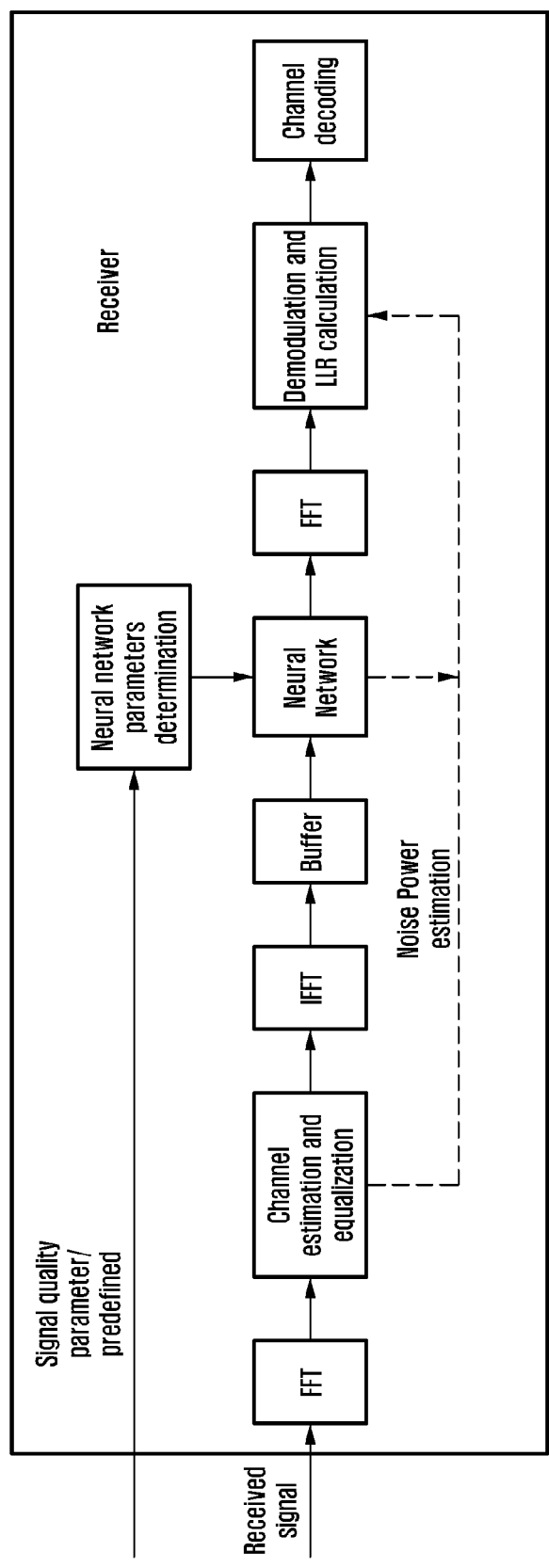

[Fig. 24]
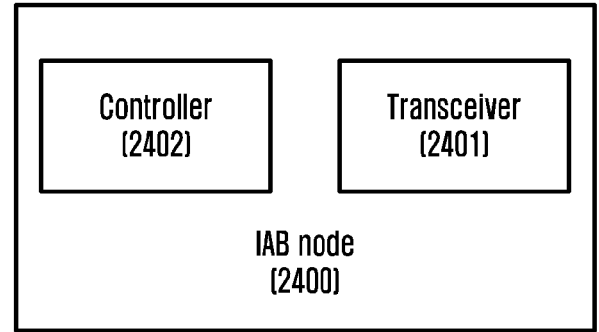
[Fig. 25]
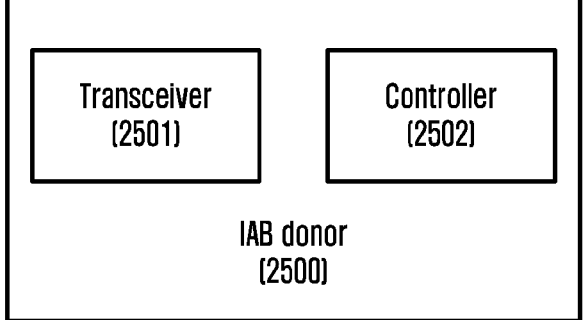

[Fig. 26]
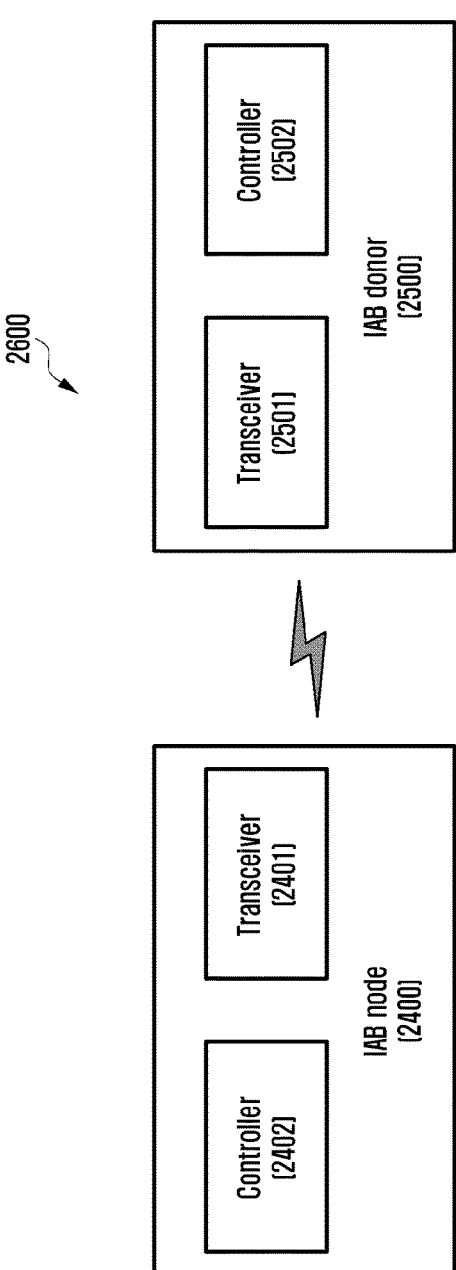
[Fig. 27]
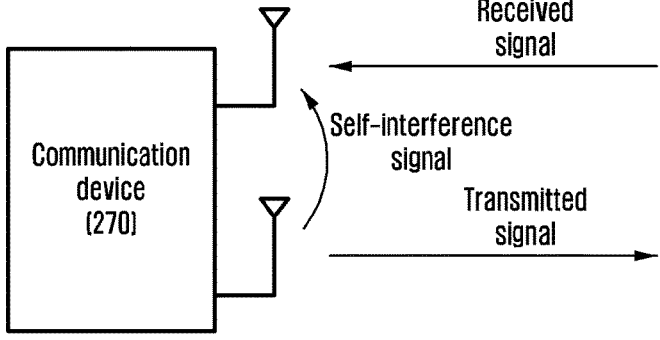

[Fig. 28]
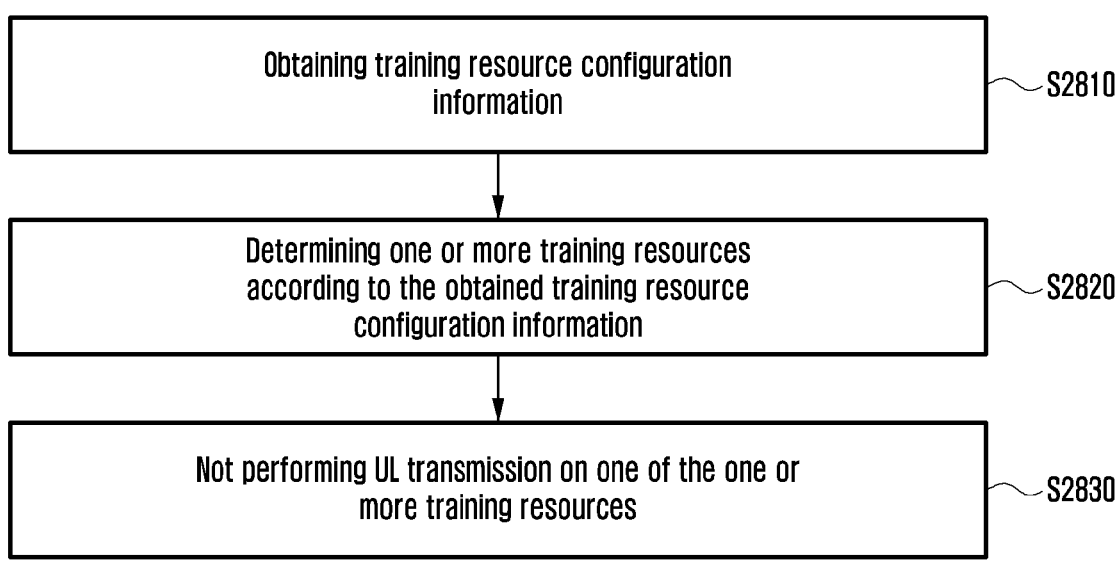
| Obtaining training resource configuration information | S2810 |
| Determining one or more training resources according to the obtained training resource configuration information | S2820 |
| Not performing UL transmission on one of the one or more training resources | S2830 |

Figure 29:
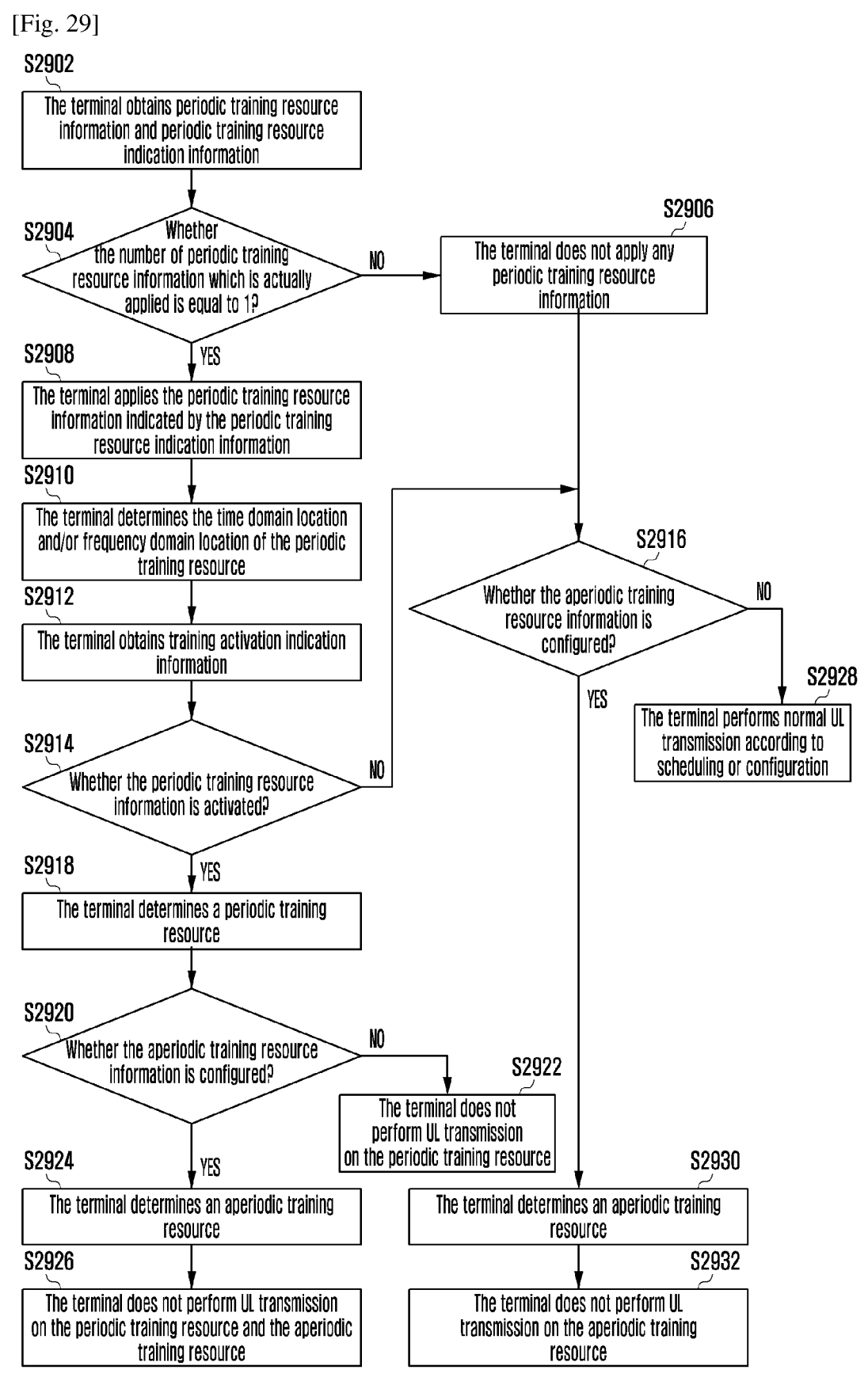

The terminal obtains periodic training resource information and periodic training resource indication information S2904 — Whether the number of periodic training resource information which is actually applied is equal to 1?

NO →

S2906 — The terminal does not apply any periodic training resource information

YES

S2908 — The terminal applies the periodic training resource information indicated by the periodic training resource indication information S2910 — The terminal determines the time domain location and/or frequency domain location of the periodic training resource S2912 — The terminal obtains training activation indication information S2914 — Whether the periodic training resource information is activated?

NO →

S2916 — Whether the aperiodic training resource information is configured?

NO →

S2928 — The terminal performs normal UL transmission according to scheduling or configuration

YES

S2918 — The terminal determines a periodic training resource

S2920 — Whether the aperiodic training resource information is configured?

NO →

S2922 — The terminal does not perform UL transmission on the periodic training resource

YES

S2924 — The terminal determines an aperiodic training resource

S2930 — The terminal determines an aperiodic training resource

S2926 — The terminal does not perform UL transmission on the periodic training resource and the aperiodic training resource S2932 — The terminal does not perform UL transmission on the aperiodic training resource

[Fig. 30]
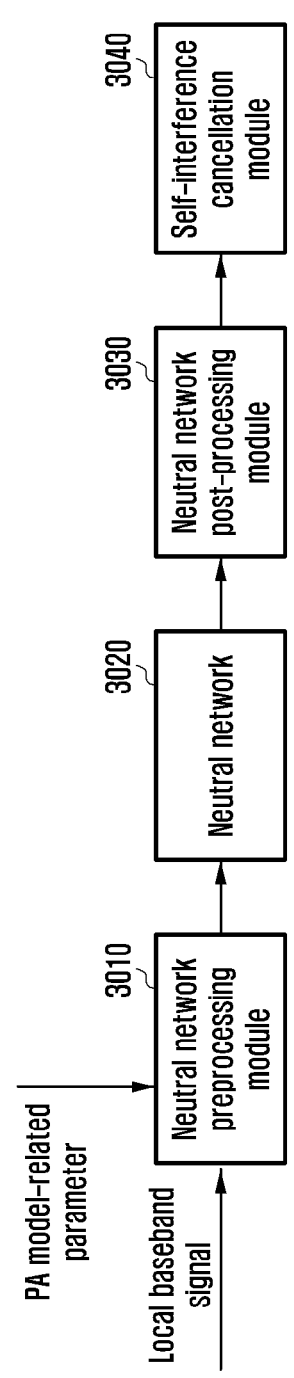

[Fig. 31]
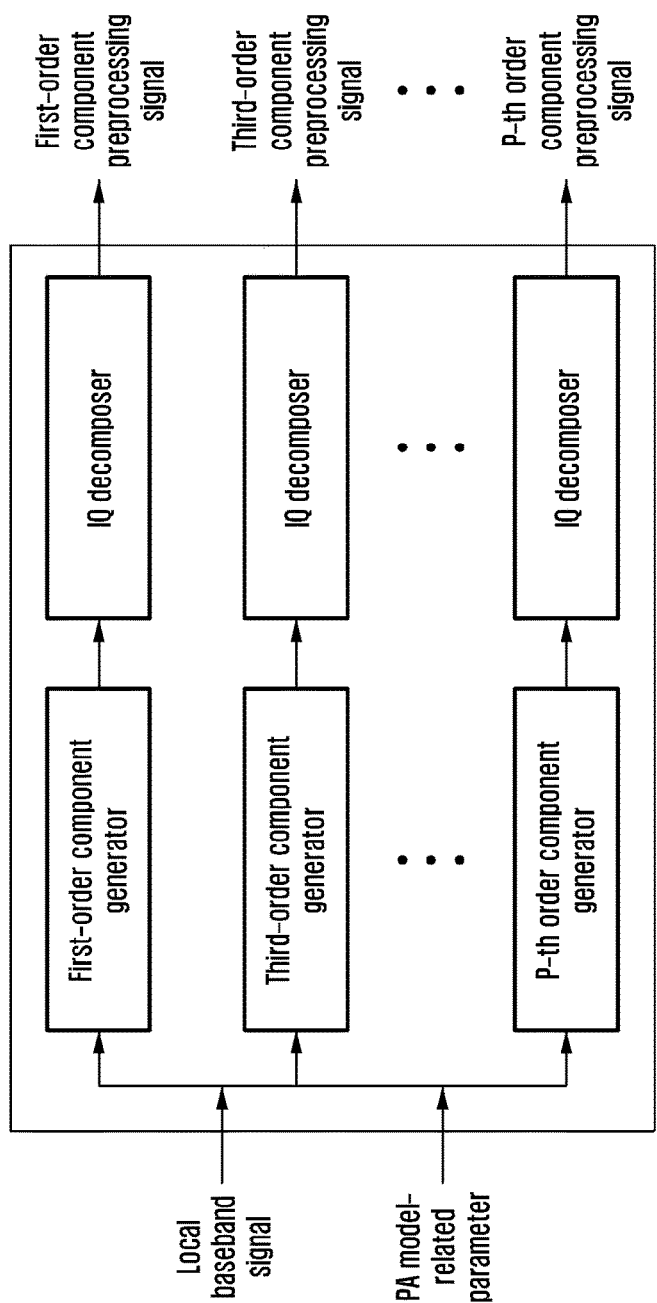
[Fig. 32]
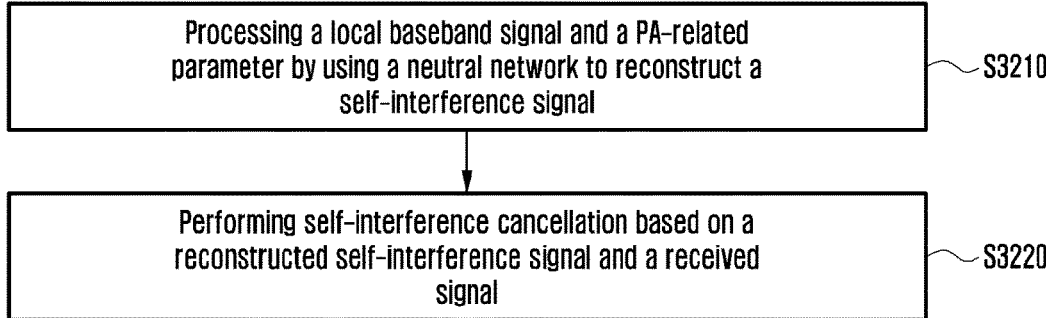

[Fig. 33]

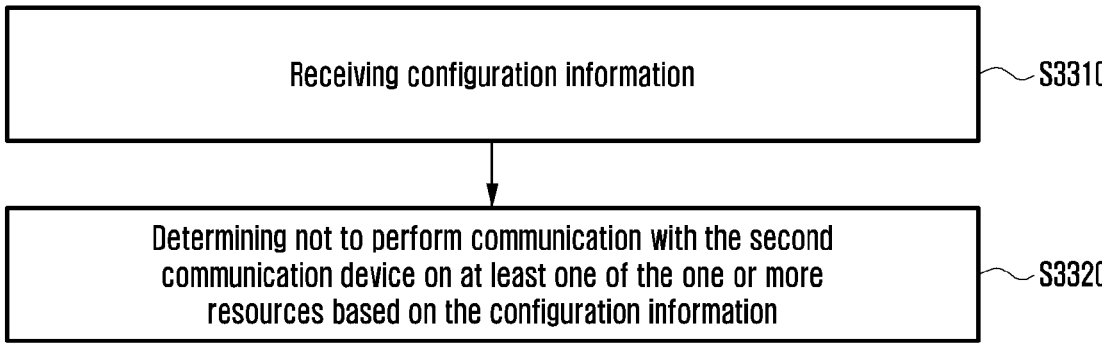

Receiving configuration information    S3310

Determining not to perform communication with the second communication device on at least one of the one or more resources based on the configuration information    S3320

[Fig. 34]

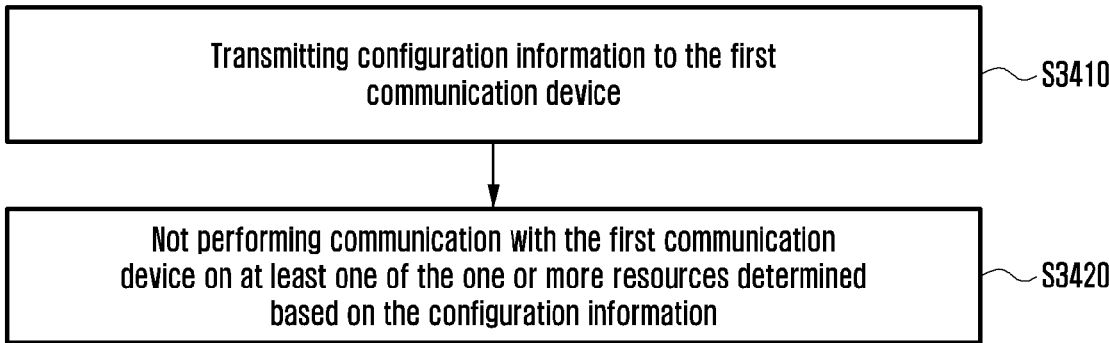

Transmitting configuration information to the first communication device    S3410

Not performing communication with the first communication device on at least one of the one or more resources determined based on the configuration information    S3420

[Fig. 35]

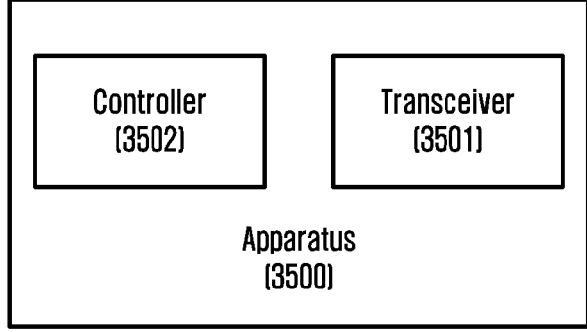

Controller (3502)

Transceiver (3501)

Apparatus (3500)

[Fig. 36]

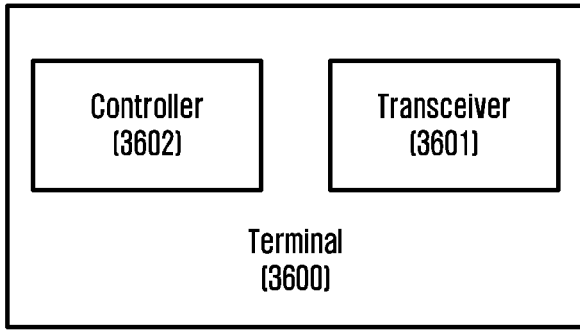

Controller (3602)

Transceiver (3601)

Terminal (3600)

[Fig. 37]
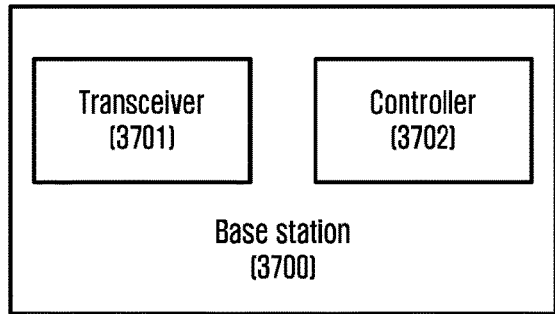
[Fig. 38]
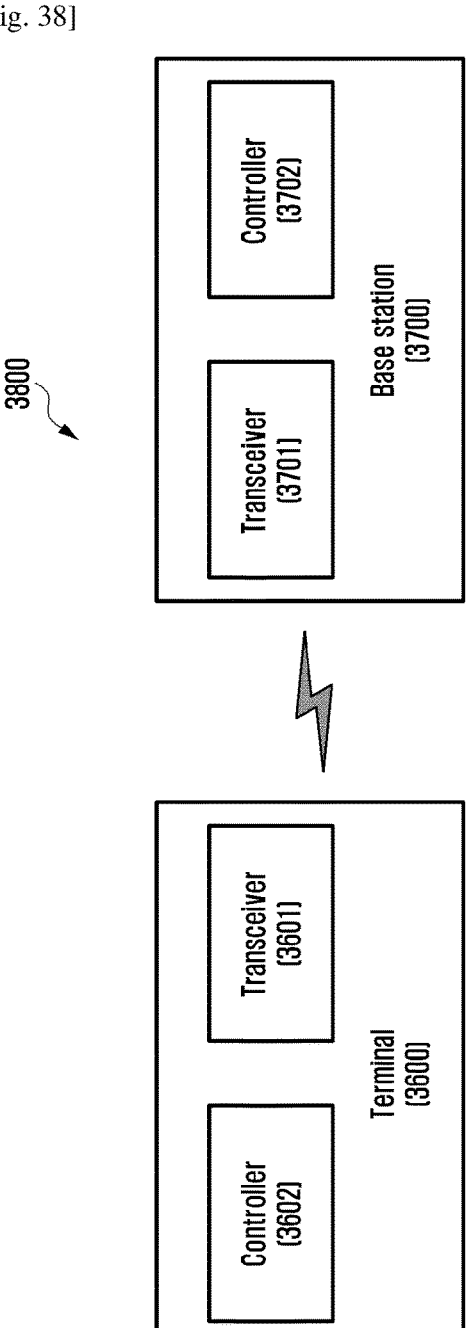

[Fig. 39]
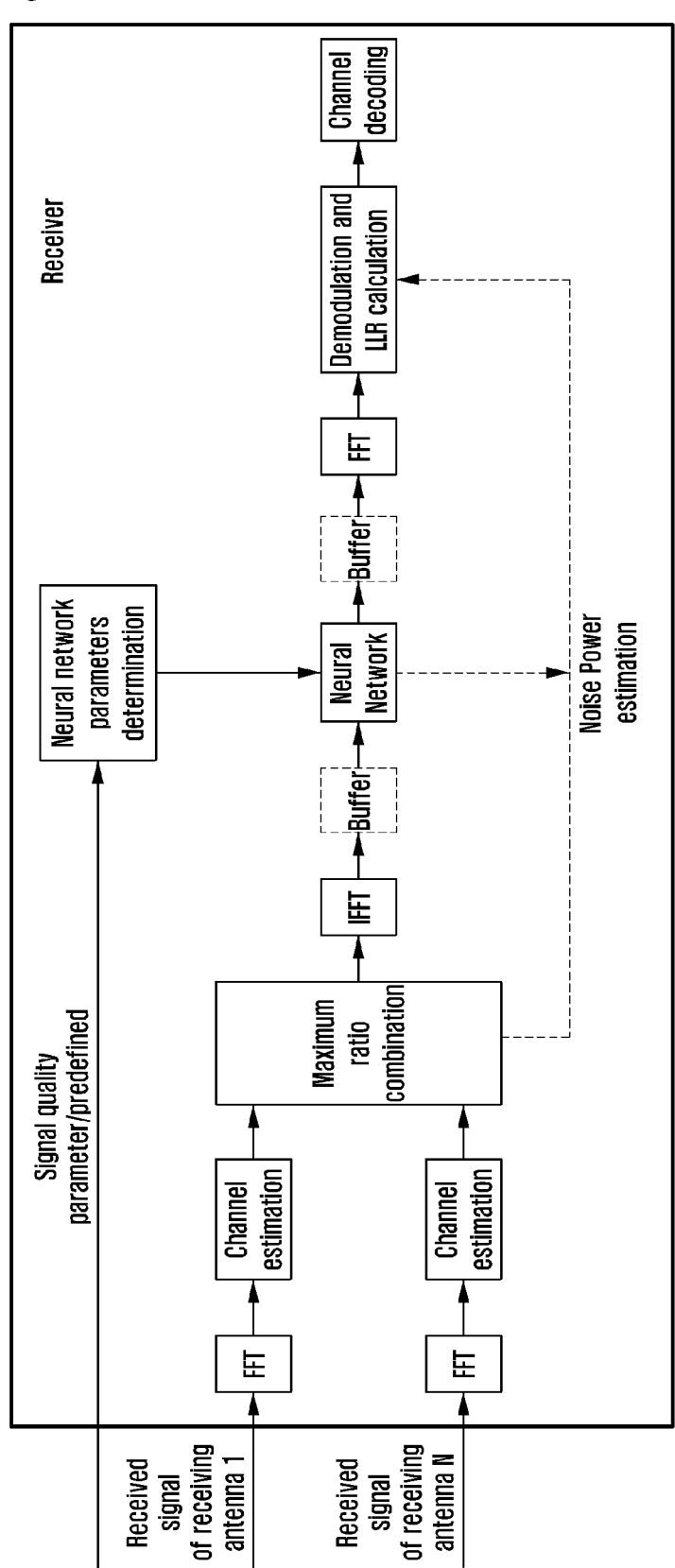

[Fig. 40]
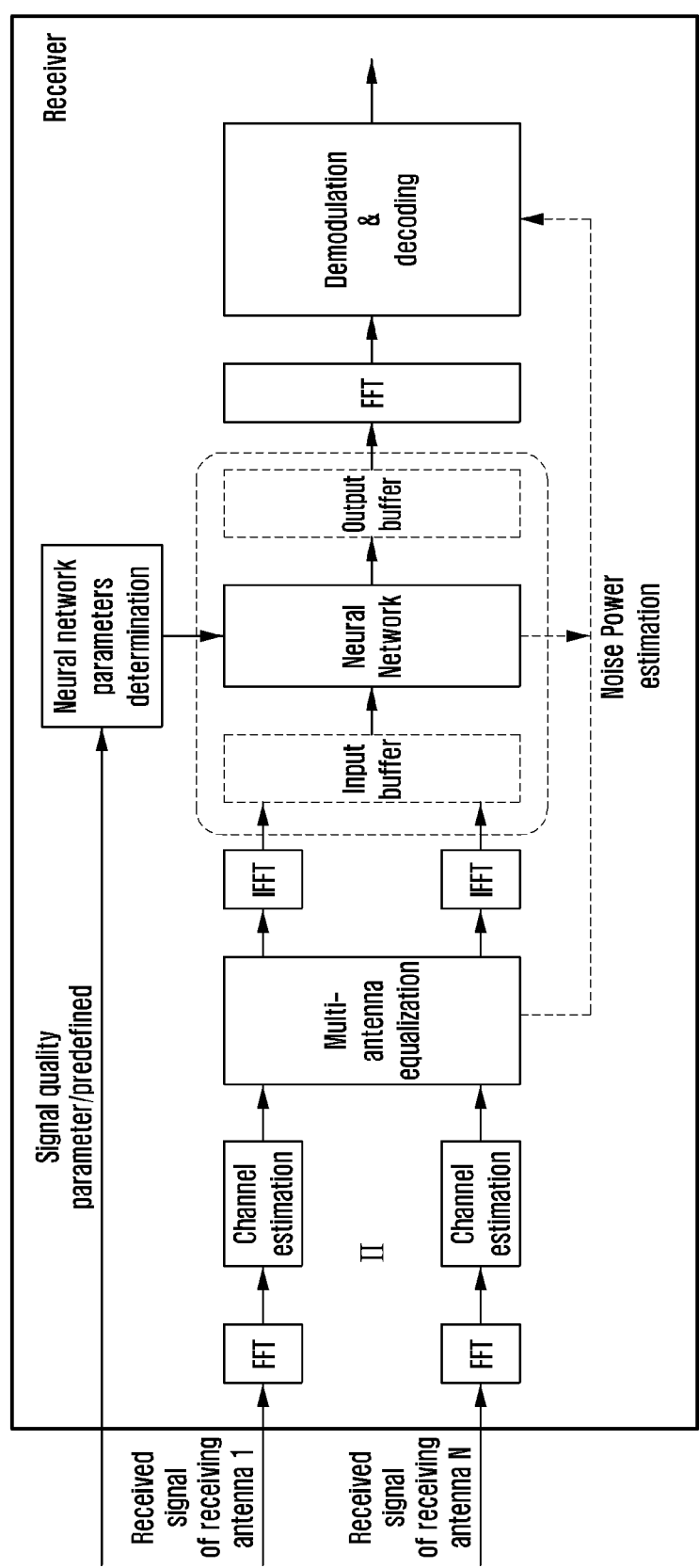

[Fig. 41]
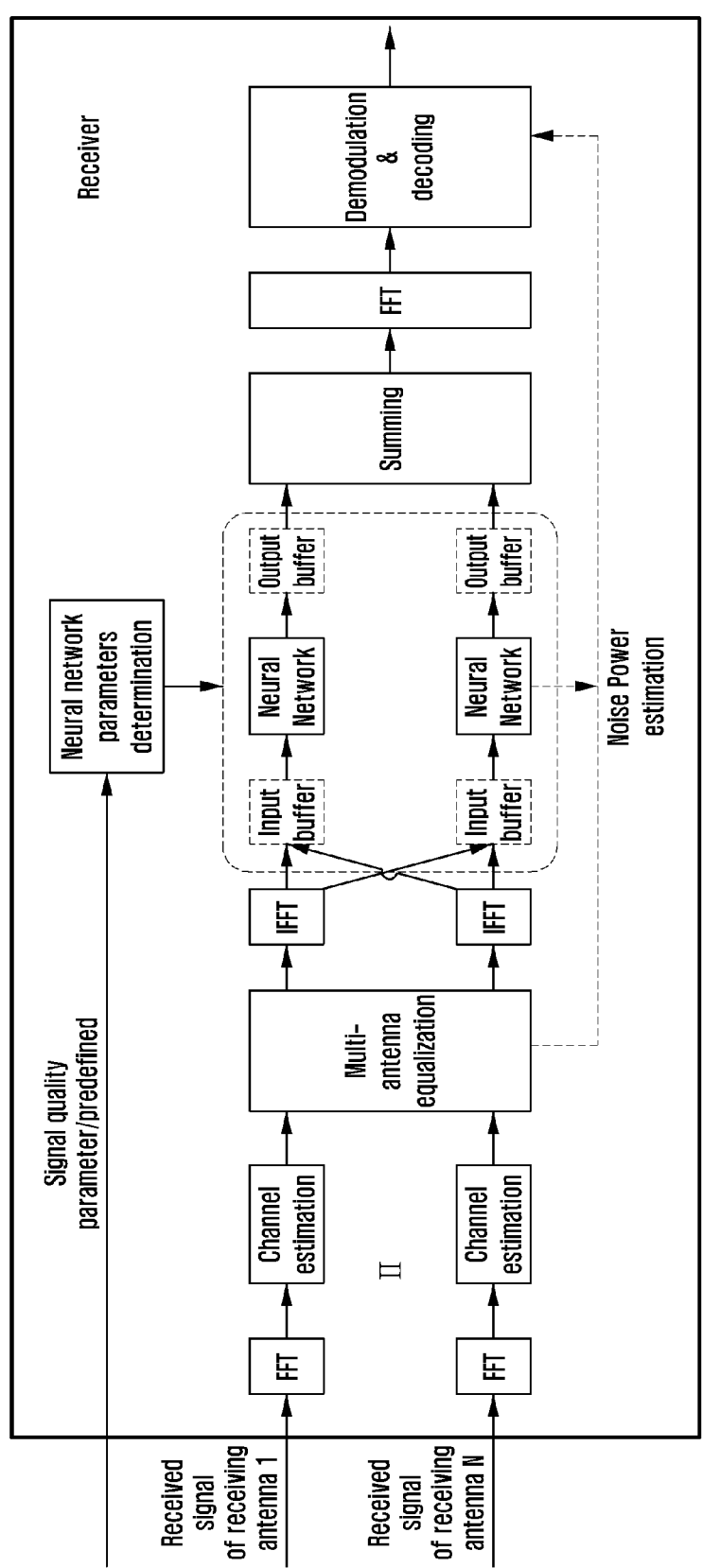

[Fig. 42]
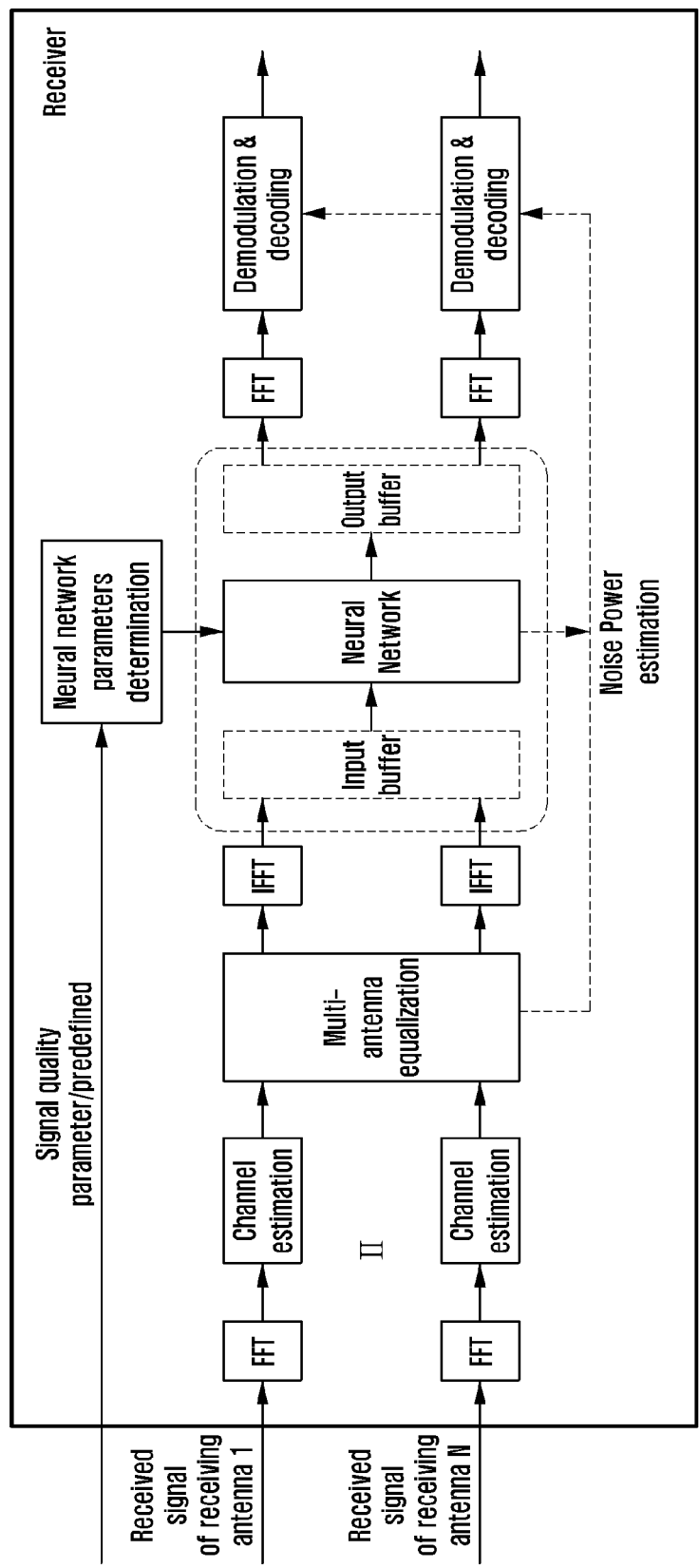

[Fig. 43]

[Fig. 44]
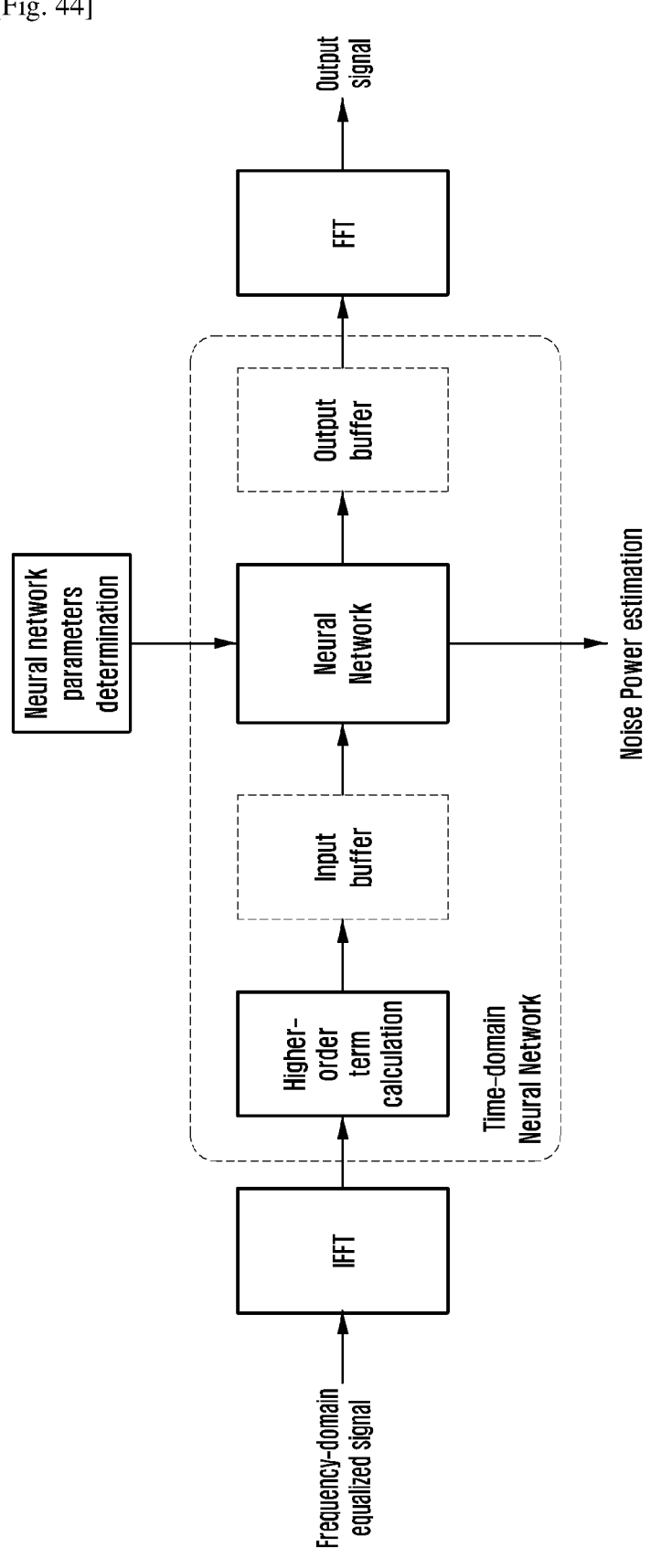

METHOD FOR SIGNAL TRANSMISSION AND APPARATUS THEREOF

TECHNICAL FIELD

The present disclosure relates to the technical field of wireless communication, and more particularly relates to a method and apparatus for signal transmission in a wireless communication system.

BACKGROUND ART

In order to meet the increasing demand for wireless data communication services since the deployment of a 4G communication system, efforts have been made to develop an improved 5G or quasi-5G communication system. Therefore, the 5G or quasi-5G communication system is also called a "super 4G network" or "post-LTE system".

The 5G communication system is implemented in a higher-frequency (millimeter wave, mmWave) frequency band, such as a 60 GHz frequency band, to achieve a higher data rate. In order to reduce transmission losses of radio waves and increase the transmission distance, beamforming, massive Multiple Input Multiple Output (MIMO), Full-Dimensional MIMO (FD-MIMO), an array antenna, analog beamforming, and a massive antenna technology are discussed in the 5G communication system.

In addition, in the 5G communication system, based on an advanced small cell, a cloud Radio Access Network (RAN), an ultra-dense network, Device-To-Device (D2D) communication, wireless backhaul, a mobile network, cooperative communication, Cooperative Multipoint (CoMP), receiving end interference elimination, etc., the development for improvements of the system network is in progress.

In the 5G system, hybrid FSK and QAM modulation (FQAM) and Sliding Window Superposition Coding (SWSC) as Advanced Coded Modulation (ACM), as well as Filter Bank Multi Carrier (FBMC), Non Orthogonal Multiple Access (NOMA) and Sparse Code Multiple Access (SCMA) as advanced access technologies have been developed.

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the $\frac{1}{10}$ radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collison avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyperconnectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

DISCLOSURE OF INVENTION

Technical Problem

The disclosure provides a method and apparatus for signal transmission in a wireless communication system.

Solution to Problem

According to one aspect of the present disclosure, there is provided an uplink signal transmission method, comprising: reporting parameters of signal transmission quality in a specific modulation mode; acquiring configuration parameters of an uplink physical channel and/or a physical signal; and transmitting an uplink signal according to the configuration parameters of the uplink physical channel and/or the physical signal.

Optionally, the specific modulation mode is at least one of 256 quadrature amplitude modulation (QAM), 1024 QAM, amplitude-phase keying modulation or star-QAM.

Optionally, the parameters of the signal transmission quality in the specific modulation mode include at least one of: a first quality parameter, used to indicate whether a terminal is of the capability to transmit signal that does not satisfy the preset signal transmission quality requirement in the specific modulation mode; a second quality parameter, comprising one or more signal transmission quality levels, and used to indicate a signal transmission quality level that the terminal can support; a third quality parameter, comprising at least one of a time-frequency resource pattern indicator and a reference signal sequence indicator, and used to indicate a reference signal type that the terminal can support; a fourth quality parameter, used to indicate an uplink power adjustment level that the terminal can support; and a fifth quality parameter, used to indicate signal transmission quality character of the signal transmitted by the terminal.

Optionally, the signal transmission quality in the first quality parameter is measured by error vector magnitude (EVM), and the first quality parameter is represented by 1 bit.

Optionally, the reporting the second quality parameter comprises: when reporting a signal transmission quality level, indicating the highest quality level, the lowest quality level, or a predetermined quality level that is achieved by the signal transmitted by the terminal; when reporting a plurality of signal transmission quality levels, indicating that the terminal supports each of the plurality of signal transmission quality levels.

Optionally, the configuration parameters include at least one of: a signal transmission quality level indicator, used to determine a signal transmission quality level required to be satisfied to transmit uplink signal; a reference signal sequence indicator, used to determine a sequence of a reference signal; a reference signal time-frequency resource pattern indicator; and a power adjustment level indicator, used to determine the uplink power adjustment level to calculate transmission power.

Optionally, the time-frequency resource pattern indicator represents a design when there are one or more reference symbols in a transmission time slot and/or when one reference symbol occupies one or more frequency domain sub-carriers, wherein the design comprises one of: a plurality of adjacent reference symbols are located in a start position of the transmission time slot, frequency domain is continuous; a plurality of adjacent reference symbols are located in the middle position of the transmission time slot, frequency domain is continuous; a plurality of separate reference symbols are located in the start position and middle position of the transmission time slot, frequency domain is continuous; a plurality of adjacent reference symbols are located in the start position of the transmission time slot, frequency domain is discrete; a plurality of adjacent reference symbols are located in the middle position of the transmission time slot, frequency domain is discrete; a plurality of separate reference symbols are located in the start position and middle position of the transmission time slot, frequency domain is discrete.

Optionally, the reference signal sequence indicator represents a design of a reference signal sequence that makes the reference signal and data have similar signal transmission quality, wherein the design comprises at least one of: a power-boosted low-peak-to-average power ratio sequence, a zero-inserted low-peak-to-average power ratio sequence, a scrambled low-peak-to-average power ratio sequence, or a quadrature amplitude-modulated pseudo-random sequence.

Optionally, the scrambled low-peak-to-average power ratio sequence is generated using the following formula:

$$r_{RS}(n) = \bar{r}_{u,v}(n) * (1 - 2c(n)), \text{ or } r_{RS}(n) = \bar{r}_{u,v}(n) * (2c(n) - 1)$$

Where $\bar{r}_{u,v}(n)$ is the low-peak-to-average power ratio sequence, and $c(n)$ is the scrambled sequence.

Optionally, the fourth quality parameter comprises a power adjustment level indicator, the power adjustment level indicator comprising at least one of a maximum transmission power adjustment level indicator, a power headroom PH adjustment level indicator, and a transmission power adjustment level indicator.

Optionally, the acquiring the configuration parameters of the uplink physical channel and/or the physical signal comprises: acquiring the configuration parameters by at least one of analyzing media access control (MAC) information of a downlink control channel, analyzing MAC information of high-layer signaling, analyzing MAC information of a downlink shared channel, or using a preset value.

Optionally, the acquiring the configuration parameters of the uplink physical channel and/or the physical signal comprises: after acquiring at least one of the signal transmission quality level indicator, the reference signal sequence indicator, and the power adjustment level indicator, acquiring remaining configuration parameters according to the corresponding relationship between the signal transmission quality level indicator, the reference signal sequence indicator, and the power adjustment level indicator.

Optionally, when the power adjustment level indicator is the maximum transmission power adjustment level indicator, the terminal determines the transmission power according to an adjustment value δ corresponding to the maximum transmission power adjustment level indicator.

Optionally, before reporting the parameters of the signal transmission quality in the specific modulation mode, a request of reporting the capability is transmitted, and an indicator of reporting the capability is obtained from a base station.

According to one aspect of the present disclosure, a method for receiving uplink signal transmission is provided, comprising: receiving parameters of signal transmission quality in a specific modulation mode from a terminal; transmitting configuration parameters to the terminal; and receiving an uplink signal according to the configuration parameters.

Optionally, the specific modulation mode is at least one of 256 quadrature amplitude modulation (QAM), 1024 QAM, amplitude-phase keying modulation, or star-QAM.

Optionally, the parameters of the signal transmission quality in the specific modulation mode include at least one of: a first quality parameter, used to indicate whether the terminal is of the capability to transmit signal that does not satisfy the preset signal transmission quality requirement in the specific modulation mode; a second quality parameter, comprising one or more signal transmission quality levels, and used to indicate a signal transmission quality level that the terminal can support; a third quality parameter, comprising at least one of a time-frequency resource pattern indicator and a reference signal sequence indicator, and used to indicate a reference signal type that the terminal can support; a fourth quality parameter, used to indicate an uplink power adjustment level that the terminal can support; and a fifth quality parameter, used to indicate signal transmission quality character of a signal transmitted by the terminal.

Optionally, the second quality parameter comprises: when receiving a signal transmission quality level, indicating the highest quality level, the lowest quality level, or a predetermined quality level that is achieved by the signal transmitted by the terminal; when reporting a plurality of signal transmission quality levels, indicating that the terminal supports each of the plurality of signal transmission quality levels.

Optionally, the configuration parameters include at least one of: a signal transmission quality level indicator, used to determine the signal transmission quality level required to be satisfied to transmit uplink signal; a reference signal sequence indicator, used to determine a sequence of a reference signal; a reference signal time-frequency resource pattern indicator; and a power adjustment level indicator, used to determine the uplink power adjustment level to calculate transmission power.

Optionally, the time-frequency resource pattern indicator indicates a design when there are one or more reference symbols in a transmission time slot and/or when one reference symbol occupies one or more frequency domain subcarriers, wherein the design comprises one of: a plurality of adjacent reference symbols are located in a start position of the transmission time slot, frequency domain is continuous; a plurality of adjacent reference symbols are located in the middle position of the transmission time slot, frequency domain is continuous; a plurality of separate references symbols are located in the start position and middle position of the transmission time slot, frequency domain is continuous; a plurality of adjacent reference symbols are located in the start position of the transmission time slot, frequency domain is discrete; when the plurality of adjacent reference symbols are located in the middle position of the transmission time slot, the frequency domain is discrete; and a plurality of separate reference symbols are located in the start position and middle position of the transmission time slot, frequency domain is discrete.

Optionally, the reference signal sequence indicator represents a design of a reference signal sequence that makes the reference signal and data have similar signal transmission quality, wherein the design comprises at least one of: a power-boosted low-peak-to-average power ratio sequence, a zero-inserted low-peak-to-average power ratio sequence, a scrambled low-peak-to-average power ratio sequence, or a quadrature amplitude-modulated pseudo-random sequence.

Optionally, the scrambled low-peak-to-average power ratio sequence is generated using the following formula:

$$r_{RS}(n) = \bar{r}_{u,v}(n) * (1 - 2c(n)), \text{ or } r_{RS}(n) = \bar{r}_{u,v}(n) * (2c(n) - 1)$$

Where $\bar{r}_{u,v}(n)$ is the low-peak-to-average power ratio sequence, and $c(n)$ is the scrambled sequence.

Optionally, the fourth quality parameter comprises a power adjustment level indicator, and the power adjustment level indicator comprising at least one of a maximum transmission power adjustment level indicator, a power headroom PH adjustment level indicator, and a transmission power adjustment level indicator.

Optionally, before receiving the parameters of the signal transmission quality in the specific modulation mode from the terminal, a request of reporting the capability is received from the terminal, and an indicator of the reporting the capability is transmitted to the terminal.

Optionally, further comprising: configuring a neural network, and enabling the neural network, wherein the enabling the neural network comprises: always enabling the neural network enabled, or enabling the neural network only when receiving a signal that does not satisfy the preset signal transmission quality requirement.

According to one aspect of the present disclosure, a method for receiving downlink signal transmission is provided, comprising: reporting parameters for receiving signal transmission quality of a downlink signal in a specific modulation mode; acquiring configuration parameters in the specific modulation mode; and receiving the downlink signal according to the configuration parameters.

Optionally, the specific modulation mode is at least one of 256 quadrature amplitude modulation (QAM), 1024 QAM, amplitude-phase keying modulation, or star-QAM.

Optionally, the parameters for receiving the signal transmission quality of the downlink signal in the specific modulation mode comprises at least one of: a first quality parameter, used to indicate whether the terminal is of the capability to receive signal that does not satisfy the preset signal transmission quality requirement in the specific modulation mode; a second quality parameter, comprising one or more signal transmission quality levels, and used to indicate a signal transmission quality level that the terminal can receive; and a third quality parameter, comprising at least one of a time-frequency resource pattern indicator and a reference signal sequence indicator, and used to indicate a reference signal type that the terminal can support.

Optionally, the first quality parameter is represented by 1 bit, and indicates whether the terminal is of the capability to receive the signal that does not satisfy the preset signal transmission quality requirement in the specific modulation mode.

Optionally, the second quality parameter comprises: when reporting a signal transmission quality level, indicating the highest quality level, the lowest quality level, or a predetermined quality level that is achieved by the signal received by the terminal; when reporting a plurality of signal transmission quality levels, indicating that the terminal supports each of the plurality of signal transmission quality levels.

Optionally, the configuration parameters include at least one of: a signal transmission quality level indicator, used to determine a signal transmission quality level required to be satisfied to receive signal; a reference signal sequence indicator, used to determine a sequence of a reference signal; a reference signal time-frequency resource pattern indicator; and a signal transmission quality character indicator.

Optionally, the time-frequency resource pattern indicator represents a design when there are one or more reference symbols in a transmission time slot and/or when one reference symbol occupies one or more frequency domain subcarriers, wherein the design comprises one of: a plurality of adjacent reference symbols are located in the start position of the transmission time slot, frequency domain is continuous; a plurality of adjacent reference symbols are located in the middle position of the transmission time slot, frequency domain is continuous; a plurality of separate references symbols are located in the start position and middle position of the transmission time slot, frequency domain is continuous; a plurality of adjacent reference symbols are located in the start position of the transmission time slot, frequency domain is discrete; a plurality of adjacent reference symbols are located in the middle position of the transmission time slot, frequency domain is discrete; and a plurality of separate reference symbols are located in the start position and middle position of the transmission time slot, frequency domain is discrete.

Optionally, the reference signal sequence indicator represents a design of a reference signal sequence that makes the reference signal and data have similar signal transmission quality, wherein the design comprises at least one of: a power-boosted low-peak-to-average power ratio sequence, a zero-inserted low-peak-to-average power ratio sequence, a scrambled low-peak-to-average power ratio sequence, or a quadrature amplitude-modulated pseudo-random sequence.

Optionally, the scrambled low-peak-to-average power ratio sequence is generated using the following formula:

$$r_{RS}(n) = \bar{r}_{u,v}(n) * (1 - 2c(n)), \text{ or } r_{RS}(n) = \bar{r}_{u,v}(n) * (2c(n) - 1)$$

Where $\bar{r}_{u,v}(n)$ is the low-peak-to-average power ratio sequence, and $c(n)$ is the scrambled sequence.

Optionally, the acquiring the configuration parameters of the base station in the specific modulation mode comprises: acquiring the configuration parameters by at least one of analyzing media access control MAC information of a downlink control channel, analyzing MAC information of high-level signaling, and analyzing MAC information of a downlink shared channel, or using a preset value, or estimating the reference signal.

Optionally, before reporting the parameters of the signal transmission quality in the specific modulation mode, a request of reporting the capability is transmitted, and acquiring an indicator for reporting the capability from the base station.

Optionally, further comprising: configuring a neural network, and enabling the neural network, wherein the enabling the neural network comprises: always enabling the neural network enabled, or enabling the neural network only when receiving a signal that does not satisfy the preset signal transmission quality requirement.

According to one aspect of the present disclosure, a method for transmitting downlink signal is provided, comprising: receiving parameters for receiving the signal transmission quality of a downlink signal in a specific modulation mode from a terminal; transmitting configuration parameters in the specific modulation mode to the terminal; and transmitting the downlink signal.

Optionally, the specific modulation mode is at least one of 256 quadrature amplitude modulation (QAM), 1024 QAM, amplitude-phase keying modulation, or star-QAM.

Optionally, the parameters for receiving the signal transmission quality of the downlink signal in the specific modulation mode comprises at least one of: a first quality parameter, used to indicate whether the terminal is of the capability to receive signal that does not satisfy the preset signal transmission quality requirement in specific modulation mode; a second quality parameter, comprising one or more signal transmission quality levels, and used to indicate a signal transmission quality level that the terminal can receive; a third quality parameter, comprising at least one of a time-frequency resource pattern indicator and a reference signal sequence indicator, and used to indicate a reference signal type that the terminal can support.

Optionally, the first quality parameter is represented by 1 bit, and indicates whether the terminal is of the capability to receive the signal that does not satisfy the preset signal transmission quality requirement in the specific modulation mode.

Optionally, the second quality parameter comprises: when receiving a signal transmission quality level, indicating the highest quality level, the lowest quality level, or a predetermined quality level that is achieved by the signal received by the terminal; when receiving a plurality of signal transmission quality levels, indicating that the terminal supports each of the plurality of signal transmission quality levels.

Optionally, the configuration parameters include at least one of: a signal transmission quality level indicator, used to determine a signal transmission quality level required to be satisfied by the received signal; a reference signal sequence indicator, used to determine a sequence of a reference signal; a reference signal time-frequency resource pattern indicator; and a signal transmission quality character indicator.

Optionally, the time-frequency resource pattern indicator represents a design when there are one or more reference symbols in a transmission slot and/or when one reference symbol occupies one or more frequency domain subcarriers, wherein the design comprises one of: a plurality of adjacent reference symbols are located in a start position of the transmission time slot, frequency domain is continuous; the plurality of adjacent reference symbols are located in the middle position of the transmission time slot, frequency domain is continuous; a plurality of separate reference symbols are located in the start position and middle position of the transmission time slot, the frequency domain is continuous; a plurality of adjacent reference symbols are located in the start position of the transmission time slot, frequency domain is discrete; a plurality of adjacent reference symbols are located in the middle position of the transmission time slot, frequency domain is discrete; and a plurality of separate reference symbols are located in the start position and middle position of the transmission time slot, frequency domain is discrete.

Optionally, the reference signal sequence indicator represents a design of a reference signal sequence that makes the reference signal and data to have similar signal transmission quality, wherein the design comprises at least one of: a power-boosted low-peak-to-average power ratio sequence, a zero-inserted low-peak-to-average power ratio sequence, a scrambled low-peak-to-average power ratio sequence, or a quadrature amplitude-modulated pseudo-random sequence.

Optionally, the scrambled low-peak-to-average power ratio sequence is generated using the following formula:

$$r_{RS}(n) = \bar{r}_{u,v}(n) * (1 - 2c(n)), \text{ or } r_{RS}(n) = \bar{r}_{u,v}(n) * (2c(n) - 1)$$

Where $\bar{r}_{u,v}(n)$ is the low peak-to-average power ratio sequence, and $c(n)$ is the scrambling sequence.

Optionally, before receiving the parameters of the signal transmission quality in the specific modulation mode from the terminal, the request of reporting the capability is received from the terminal, and an indicator of the reporting the capability is transmitted to the terminal.

According to one aspect of the present disclosure, an apparatus for transmitting uplink signal transmission is provided, comprising: a receiver, configured to receive signal under the control of a controller; a transmitter, configured to transmit signal under the control of the controller; and the controller, configured to control the apparatus to perform the above method for transmitting uplink signal.

According to one aspect of the present disclosure, a receiving apparatus is provided, comprising: a receiver, comprising a neural network, configured to receive and process signal under the control of a controller; a transmitter, configured to transmit signal under the control of the controller; and the controller, configured to control the receiving apparatus to perform the above method for receiving.

Optionally, the neural network has configuration parameters, wherein the configuration parameters include at least one of: a first parameter: a neural network structure, used to determine a selected neural network; a second parameter: the number of nodes in input layer of the neural network, used to represent the number of inputting into the neural network each time; a third parameter: a parameter for the number of neurons in hidden layer of the neural network, used to represent the number of neurons included in the hidden layer; a fourth parameter: character of hidden layers of the neural network, used to determine a Jacobian matrix of the state transition in the hidden layer and/or the memory of the neural network; a fifth parameter: the number of nodes in output layer of the neural network, used to represent the number of outputting out of the neural network each time; a sixth parameter: an activation function of neurons of the neural network, used to learn the nonlinearity of an input signal; and a seventh parameter: the layer number of the hidden layers of the neural network, used to represent the learning depth of the neural network.

Optionally, the configuration parameters are determined by parameters of signal transmission quality or predefined parameters.

Optionally, the character of the hidden layer of the neural network is an iterative character, and wherein the iterative character is a spectral radius.

Optionally, the neural network structure is one of a feed-forward neural network, a convolutional neural network, a recurrent neural network, and an echo state network.

Optionally, the activation function of the neuron is a tanh function, a ReLU function, or an eLU function.

Optionally, the input signal are transmitted signal at a plurality of moments, comprising at least one of a symbol transmitted at the current moment, a transmitted signal at several previous moments, and a transmitted signal at a later moment.

Optionally, the neural network uses the reference signal as training data; and the trained neural network outputs noise power estimation for signal demodulation, and generates a log-likelihood ratio of the signal for channel decoding.

Optionally, the neural network is connected before or after an FFT module in the receiver.

Optionally, the receiver comprises a filter that is provided at the front end of the neural network.

Optionally, the neural network module and the FFT module are integrated into one module.

According to one aspect of the present disclosure, a transmitting apparatus for downlink signal transmission, comprising: a receiver, configured to receive signal under the control of a controller; a transmitter, configured to transmit signal under the control of the controller; and a controller, configured to control a terminal to perform the above method for transmitting downlink signal.

According to at least one embodiment of the present disclosure, there is provided a method performed by a first communication device. The method includes: receiving configuration information from a second communication device, wherein the configuration information indicates one or more resources; and determining, based on the configuration information, not to perform communication with the second communication device on at least one of the one or more resources.

In some embodiments, the not performing communication with the second communication device on at least one of the one or more resources includes: not transmitting physical channel and/or physical signal on the at least one of the one or more resources. For example, the physical channel can include at least one of: a physical uplink shared channel, a physical uplink control channel, or a physical random access channel. For example, the physical signal can include at least one of: a demodulation reference signal of a physical uplink shared channel, a demodulation reference signal of a physical uplink control channel, a sounding reference signal, or a phase tracking reference signal.

In some embodiments, for example, the one or more resources are related to training of a receiver of the second communication device.

In some embodiments, for example, the configuration information includes at least one of: periodic training resource information, periodic training resource indication information, or training activation indication information. The periodic training resource information is used to indicate a location of a periodic resource. The periodic training resource indication information is used to indicate at least one periodic training resource information that is actually applied among the configured one or more periodic training resource information. The training activation indication information is used to indicate whether to activate the at least one periodic training resource information which is actually applied.

In some embodiments, for example, the configuration information includes one or more periodic training resource information, training activation indication information, and periodic training resource indication information. The determining, based on the configuration information, not to perform communication with the second communication device on the at least one of the one or more training resources, includes: determining the at least one periodic training resource information which is actually applied among the one or more periodic training resource information based on the periodic training resource indication information; determining whether a number of the at least one periodic training resource information which is actually applied is equal to a predetermined value; determining whether the training activation indication information activates the at least one periodic training resource information which is actually applied, when the number of the at least one periodic training resource information which is actually applied is equal to the predetermined value; and determining not to perform communication with the second communication device on a periodic resource indicated by the at least one periodic training resource information, when it is determined that the training activation indication information activates the at least one periodic training resource information which is actually applied.

In some embodiments, for example, the predetermined value is 1.

In some embodiments, for example, the periodic training resource information includes at least one of: information on a time domain location of the periodic resource or information on a frequency domain location of the periodic resource.

In some embodiments, for example, the information on the time domain location of the periodic resource includes information on duration of the periodic resource.

In some embodiments, for example, the information on the time domain location of the periodic resource includes information on a bitmap related to the time domain location of the periodic resource.

In some embodiments, for example, the information on the frequency domain location of the periodic training resource includes information on a start resource block number of the periodic training resource in a system bandwidth and a number of occupied resource blocks.

In some embodiments, for example, the information on the frequency domain location of the periodic resource includes information on a bitmap related to the frequency domain location of the periodic resource.

In some embodiments, for example, the configuration information includes aperiodic training resource information, wherein the aperiodic training resource information is used to indicate a location of an aperiodic resource.

In some embodiments, for example, the determining, based on the configuration information, not to perform communication with the second communication device on the at least one of the one or more resources includes: not performing communication with the second communication device on the aperiodic resource indicated by the aperiodic training resource information.

In some embodiments, for example, the aperiodic training resource information includes at least one of: information on a time domain location of the aperiodic resource or information on a frequency domain location of the aperiodic resource.

In some embodiments, for example, the information on the time domain location of the aperiodic resource includes information on a time delay and duration relative to a time when the aperiodic training resource information is received.

In some embodiments, for example, the information on the time domain location of the aperiodic resource includes information on a time domain location and duration of a first half-slot of the aperiodic resource.

In some embodiments, for example, the information on the frequency domain location of the aperiodic resource includes information on a start resource block sequence number of the aperiodic resource in a system bandwidth and a number of occupied resource blocks.

In some embodiments, for example, the information on the frequency domain location of the aperiodic resource includes information on a bitmap related to the frequency domain location of the aperiodic resource.

In some embodiments, for example, the configuration information is received through system information, physical layer signaling or higher-layer signaling.

In some embodiments, for example, the first communication device is a terminal, and the second communication device is a base station.

In some embodiments, for example, the first communication device is an Integrated Access and Backhaul (IAB) node, and the second communication device is an IAB donor.

According to at least one embodiment of the present disclosure, there is further provided a method performed by a second communication device. The method includes: transmitting configuration information to a first communication device, wherein the configuration information indicates one or more resources; and not performing communication with the first communication device on at least one of the one or more resources determined based on the configuration information.

In some embodiments, not performing communication with the first communication device on the at least one of the one or more resources includes: not receiving physical channel and/or physical signal on the at least one of the one or more resources. For example, the physical channel can include at least one of: a physical uplink shared channel, a physical uplink control channel, or a physical random access channel. For example, the physical signal can include at least one of: a demodulation reference signal of a physical uplink shared channel, a demodulation reference signal of a physical uplink control channel, a sounding reference signal, or a phase tracking reference signal.

In some embodiments, for example, the one or more resources are related to training of a receiver of the second communication device.

In some embodiments, for example, the configuration information includes at least one of: periodic training resource information, periodic training resource indication information, or training activation indication information. The periodic training resource information is used to indicate a location of a periodic resource. The periodic training resource indication information is used to indicate at least one periodic training resource information which is actually applied among the configured one or more periodic training resource information. The training activation indication information is used to indicate whether to activate the at least one periodic training resource information which is actually applied.

In some embodiments, for example, the periodic training resource information includes at least one of: information on a time domain location of the periodic resource or information on a frequency domain location of the periodic resource.

In some embodiments, for example, not performing communication with the first communication device on the at least one of the one or more resources determined based on the configuration information includes: not performing communication with the first communication device on the periodic resource indicated by the periodic training resource information.

In some embodiments, for example, the information on the time domain location of the periodic resource includes information on duration of the periodic resource.

In some embodiments, for example, the information on the time domain location of the periodic resource includes information on a bitmap related to the time domain location of the periodic resource.

In some embodiments, for example, the information on the frequency domain location of the periodic resource includes information on a start resource block sequence number of the periodic training resource in a system bandwidth and the number of occupied resource blocks.

In some embodiments, for example, the information on the frequency domain location of the periodic resource includes information on a bitmap related to the frequency domain location of the periodic resource.

In some embodiments, for example, the configuration information includes aperiodic training resource information, wherein the aperiodic training resource information is used to indicate a location of an aperiodic resource related to the training.

In some embodiments, for example, not performing uplink reception from the first communication device on the at least one of the one or more resources determined based on the configuration information includes: not performing the uplink reception from the first communication device on the aperiodic resource indicated by the aperiodic training resource information.

In some embodiments, for example, the aperiodic training resource information includes at least one of: information on a time domain location of the aperiodic resource or information on a frequency domain location of the aperiodic resource.

In some embodiments, for example, the information on the time domain location of the aperiodic resource includes information on a time delay and duration relative to a time when the aperiodic training resource information is received.

In some embodiments, for example, the information on the time domain location of the aperiodic resource includes information on a time domain location and duration of a first half-slot of the aperiodic resource.

In some embodiments, for example, the information on the frequency domain location of the aperiodic resource includes information on a start resource block sequence number of the aperiodic resource in a system bandwidth and a number of occupied resource blocks.

In some embodiments, for example, the information on the frequency domain location of the aperiodic resource includes information on a bitmap related to the frequency domain location of the aperiodic resource.

In some embodiments, for example, the configuration information is transmitted through system information, physical layer signaling or higher-layer signaling.

In some embodiments, for example, the method further includes: obtaining, using a machine learning model, a reconstructed self-interference signal based on a local baseband signal and parameters related to a power amplifier, and obtaining a signal after self-interference cancellation based on the reconstructed self-interference signal and a received signal.

In some embodiments, for example, the first communication device is a terminal, and the second communication device is a base station.

In some embodiments, for example, the first communication device is an Integrated Access and Backhaul (IAB) node, and the second communication device is an IAB donor.

According to some embodiments of the present disclosure, there is further provided a first communication device. The first communication device includes: a transceiver, configured to transmit and receive signals; and a controller, coupled with the transceiver and configured to perform one or more operations in the above-described method performed by the first communication device.

According to some embodiments of the present disclosure, there is further provided a second communication device. The second communication device includes: a transceiver, configured to transmit and receive signals; and a controller, coupled with the transceiver and configured to perform one or more operations in the above-described method performed by the second communication device.

According to some embodiments of the present disclosure, there is also provided a computer-readable storage medium having one or more computer programs stored thereon, wherein the one or more computer programs, when performed by one or more processors, implement any one of the above-described methods.

Advantageous Effects of Invention

According to an embodiment of the present disclosure, signal transmission and reception can be performed in a wireless communication system.

Further, according to an embodiment of the present disclosure, signal transmission quality may be determined.

BRIEF DESCRIPTION OF DRAWINGS

The above and additional aspects and advantages of the present application will become more apparent and easy to understand by the following description in combination with the accompanying drawings, wherein:

FIG. 1 illustrates an example wireless network 100 according to various embodiments of the present disclosure.

FIG. 2A illustrates an example wireless transmission and reception path according to the present disclosure.

FIG. 2B illustrates an example wireless transmission and reception path according to the present disclosure.

FIG. 3A illustrates example UE 116 according to the present disclosure

FIG. 3B illustrates an example gNB 102 according to the present disclosure.

FIG. 4 illustrates a flowchart of a method for uplink signal transmission in a wireless communication system according to an embodiment of the present disclosure.

FIG. 5 illustrates a time-frequency resource pattern according to an embodiment of the present disclosure.

FIG. 6 illustrates a time-frequency resource pattern according to an embodiment of the present disclosure.

FIG. 7 illustrates a time-frequency resource pattern according to an embodiment of the present disclosure.

FIG. 8 illustrates a time-frequency resource pattern according to an embodiment of the present disclosure.

FIG. 9 illustrates a time-frequency resource pattern according to an embodiment of the present disclosure.

FIG. 10 illustrates a time-frequency resource pattern according to an embodiment of the present disclosure.

FIG. 11 illustrates a flowchart of a method for uplink signal reception in a wireless communication system according to an embodiment of the present disclosure.

FIG. 12 illustrates a flowchart of a method for downlink signal reception in a wireless communication system according to an embodiment of the present disclosure.

FIG. 13 illustrates a flowchart of a method for downlink signal transmission in a wireless communication system according to an embodiment of the present disclosure.

FIG. 14 illustrates a receiver comprising a neural network according to an embodiment of the present disclosure.

FIG. 15 illustrates a receiver comprising a neural network according to an embodiment of the present disclosure.

FIG. 16 illustrates a receiver comprising a neural network according to an embodiment of the present disclosure.

FIG. 17 illustrates a receiver comprising a neural network according to an embodiment of the present disclosure.

FIG. 18 illustrates a block diagram of receiving apparatus for uplink signal according to an embodiment of the present disclosure.

FIG. 19 illustrates a block diagram of receiving apparatus for downlink signal according to an embodiment of the present disclosure.

FIG. 20 illustrates a block diagram of transmitting apparatus for uplink signal according to an embodiment of the present disclosure.

FIG. 21 illustrates a block diagram of transmitting apparatus for downlink signal according to an embodiment of the present disclosure.

FIG. 22 illustrates a receiver comprising a neural network according to an embodiment of the present disclosure.

FIG. 23 illustrates a receiver comprising a neural network according to an embodiment of the present disclosure.

FIG. 24 shows a block diagram of configuration of an IAB node according to some embodiments of the present disclosure;

FIG. 25 shows a block diagram of configuration of an IAB donor according to some embodiments of the present disclosure;

FIG. 26 shows a block diagram of configuration of a wireless communication system according to some embodiments of the present disclosure;

FIG. 27 shows a schematic diagram of generation of self-interference of a communication device operating in a full-duplex mode according to some embodiments of the present disclosure;

FIG. 28 shows a flowchart of a UL signal transmission method according to at least one embodiment of the present disclosure;

FIG. 29 shows a flowchart of a UL signal transmission method according to at least one embodiment of the present disclosure;

FIG. 30 shows a structural schematic diagram of a digital domain self-interference cancellation circuit based on a neural network according to at least one embodiment of the present disclosure;

FIG. 31 shows a structural schematic diagram of a neural network preprocessing module according to some embodiments of the present disclosure;

FIG. 32 shows a flowchart of a self-interference cancellation method according to at least one embodiment of the present disclosure;

FIG. 33 shows a flowchart of a method performed by a first communication device according to at least one embodiment of the present disclosure;

FIG. 34 shows a flowchart of a method performed by a second communication device according to at least one embodiment of the present disclosure;

FIG. 35 shows a block diagram of an apparatus for self-interference cancellation according to some embodiments of the present disclosure;

FIG. 36 shows a block diagram of configuration of a terminal according to some embodiments of the present disclosure;

FIG. 37 shows a block diagram of configuration of a base station according to some embodiments of the present disclosure;

FIG. 38 shows a block diagram of configuration of a wireless communication system according to some embodiments of the present disclosure;

FIG. 39 shows a receiver comprising a neural network according to an embodiment of the present disclosure;

FIG. 40 shows a block diagram of receiving apparatus for uplink signal according to an embodiment of the present disclosure;

FIG. 41 shows a block diagram of receiving apparatus for uplink signal according to an embodiment of the present disclosure;

FIG. 42 shows a block diagram of receiving apparatus for uplink signal according to an embodiment of the present disclosure;

Figure 43:
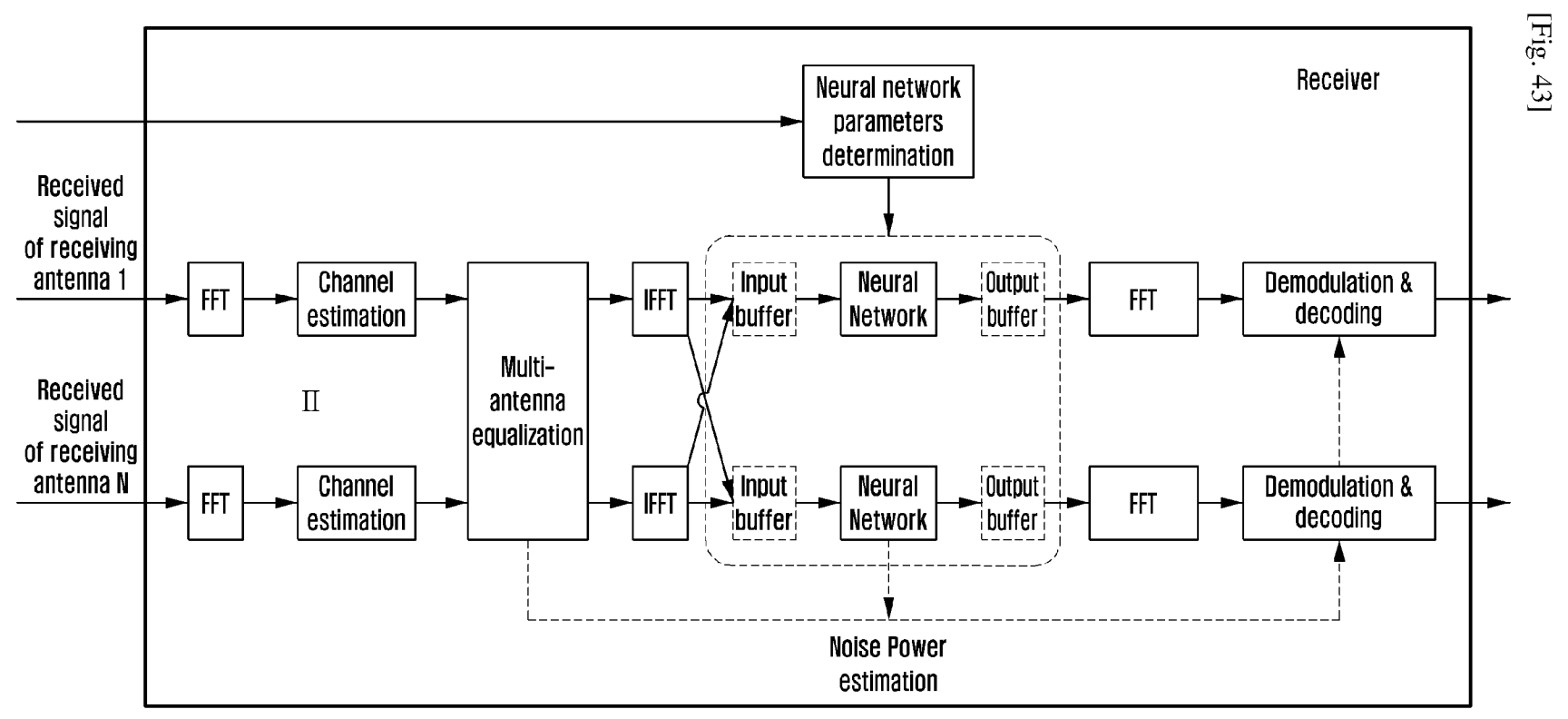

FIG. 43 shows a block diagram of receiving apparatus for uplink signal according to an embodiment of the present disclosure; and FIG. 44 shows a receiver comprising a neural network according to an embodiment of the present disclosure.

MODE FOR THE INVENTION

Hereinafter, embodiments of the present disclosure will be described in detail with reference to the drawings.

When the embodiments of the present disclosure are described herein, descriptions of technologies that are well-known in the technical field to which the present disclosure belongs and have no direct relation to the present disclosure will be omitted. This is to more clearly convey the gist of the present disclosure by omitting unnecessary descriptions.

For the same reason, some components are exaggerated, omitted or schematically shown in the drawings. The size of each component does not fully reflect its actual size. The same reference numbers are assigned to the same or corresponding elements in each figure.

The advantages and features of the present disclosure and the method of realizing them will be apparent from the embodiments of the present disclosure described in detail in conjunction with the accompanying drawings. However, the present disclosure is not limited to the following embodiments, and can be implemented in a variety of different forms. On the contrary, these embodiments are provided so that the present disclosure will be thorough and complete, and will fully convey the concept of the present disclosure to those of ordinary skill in the art. The disclosure should be defined according to the scope of the claims. The same number in the same reference refers to the same component.

In this case, it can be understood that a combination of blocks of each process flowchart and the flowchart can be performed by computer program instructions. The computer program instructions may be installed in a processor of a general-purpose computer, a special-purpose computer, or other programmable data processing devices, such that instructions that can be performed by the processor of the computer or other programmable data are made to produce a means that performs the functions described in the blocks of each flowchart. The computer program instructions may be stored in a computer-oriented or other programmable data processing device-oriented computer available or readable memory in order to implement functions in a particular manner. Thus, the instructions stored in the computer available or readable memory can be made to produce an article of manufacture (comprising the means for performing the functions described in one or more blocks of each flowchart). Since the computer program instructions can be stored in a computer or other programmable data processing devices, the functions of the blocks of each flowchart can be provided by instructions that perform a series of operations in the computer or other programmable data processing devices to generate a computer executable process to generate the computer programmable instructions to operate the computer or other data processing devices.

In addition, each block may represent a module, a segment, or a portion of code (comprising one or more executable instructions for performing a particular logical function). It should be noted that in some alternative embodiments, the functions described in the blocks may be performed in a different order than that described herein. For example, in some cases, two blocks shown consecutively may be performed substantially at the same time or in reverse order according to the functions corresponding to them.

In this case, the term "unit" used in the embodiments described herein refers to a software or hardware component that performs certain functions, such as a Field Programmable Gate Array (FPGA) or an Application Particular Integrated Circuit (ASIC). However, the term "unit" is not limited to software or hardware. The term "unit" may be configured to be stored in an addressable storage medium or reproduce one or more processors. Therefore, the term "unit" may include, for example, components such as a software component, an object-oriented software component, a class component and a task component, a process, a function, a property, a procedure, a subroutine, a program code segment, a driver, firmware, microcode, a circuit, data, a database, a data structure, a table, an array and a parameter. The components and functions provided in the "unit" can be combined into a smaller number of components and "units", or can be divided into subcomponents and "subunits". In addition, the components and the term "unit" can be implemented as performing one or more CPUs in a device or a secure multimedia card. In one embodiment, the term "unit" may include one or more processors.

Hereinafter, the working principle of the present disclosure will be described in detail with reference to the accompanying drawings. In the following description of the present disclosure, when it is determined that a well-known function or configuration will obscure the subject of the present disclosure due to unnecessary details, it will not be described in detail. The terms described below should be defined in consideration of the functions of the present disclosure, but can be changed according to the user or operator's intention, practice, and the like. Therefore, the definition of terms should be based on the overall background of the present disclosure. Hereinafter, a base station is a main body that allocates resources to a terminal, and may include at least one of a gNode B, an eNode B, a Node B, a Base Station (BS), a radio access unit, a base station controller, or a node in the network. Examples of terminals may include UE, a Mobile Station (MS), a cellular phone, a smart phone, a computer, a multimedia system that can perform communication functions, and the like. However, the embodiments are not limited to the above-mentioned examples.

The present disclosure is applicable for 5G communication technology and Internet of Things technology-based Intelligent Services (such as smart home, a smart building, a smart city, a smart car or networking car, medical care, digital education, retail business, security, security-related services, etc.).

In an LTE system as a representative example of a broadband wireless communication system, an Orthogonal Frequency Division Multiplexing (OFDM) solution is adopted in downlink (DL), and the OFDM technology is widely applied to DVB-T, 3GPP LTE/LTE-Advanced and 5G systems due to its characteristics of high anti-fading capability, insensitivity to narrowband interference and narrowband noise, flexible bandwidth expansion, supporting for variable user rates and the like.

At the same time, OFDM is a multi-carrier modulation technology, and its output signal is composed of overlaid channel signals of a plurality of sub-channels, and when the phases of the overlaid signals are the same, the instantaneous power of the obtained output signal will be far greater than the average power of the signal, thereby forming a larger Peak-To-Average Power Ratio (PAPR), and the PAPR will increase with the increasing of the modulation order.

In a communication system, a Power Amplifier (PA) is used to increase the transmission power of a signal to resist a path loss and provide sufficient power headroom for random fading and interference that may be encountered during transmission in a wireless medium. But in actual application, PA is not ideal, because the output power of any PA cannot be infinite. Within the dynamic range of the PA, a ratio of the output power to the input power of the PA is approximately a constant, that is, the output signal and the input signal show a linear relationship. When the input power of the PA continues to increase, it will enter a saturation zone of the PA, and the ratio of the output power to the output power is no longer a constant, that is, the output signal and the input signal show a non-linear relationship. In order to guarantee the output quality of the signal, the PA often uses a power back-off method to work in a dynamic range away from the saturation zone. This is actually improving the linearity of the PA at the expense of DC power consumption. While as one of the largest energy-consuming devices in a wireless communication system, the energy consumption of the PA accounts for 50%-80% of the base station in a cellular network, and thus, the energy efficiency of the PA is of vital importance to reduce the energy consumption of the entire network.

In order to improve the energy efficiency of the PA, the power of the input signal is usually made to be close to the upper limit of the dynamic range of the PA, and at this time, in addition to a linear component that is proportional to the input signal, there will be a certain non-linear component in the output signal. While the high PAPR characteristic of OFDM under high-order modulation will make more input signal power enter the nonlinear region of PA, thus bringing more serious nonlinear distortion, which is a severe test for channel estimation and signal detection at a receiving end.

Generally, in order to solve the problem of non-linear distortion, the transmitting end often uses the Digital Pre-Distortion (DPD) technology for processing or uses a traditional way after mathematical modeling at the receiving end for processing. However, the premise of using DPD technology to perform compensation is to fully grasp an actual PA model and measurement deviation, which is a big challenge in practical application, while the complexity of mathematical modeling at the receiving end will be very high. In view of these problems, the present disclosure uses the AI model to deal with the problem of the nonlinear distortion that cannot be simply modeled.

In the following description, only terms related to broadcast information, terms related to control information, terms related to communication coverage, terms related to state changes (for example, events), terms related to network entities, and terms related to messages, terms related to device components, etc. are provided to serve as examples for ease of explanation. Therefore, the present disclosure is not limited to the terms described below, and other terms having equivalent technical meanings may be used.

In the following description, for ease of explanation, some terms and names defined in the 3rd Generation Partnership Project Long Term Evolution (3GPP LTE) standard can be used. However, the present disclosure is not limited by the terms and names, and is equally applicable to systems that comply with other standards.

Figure 1:
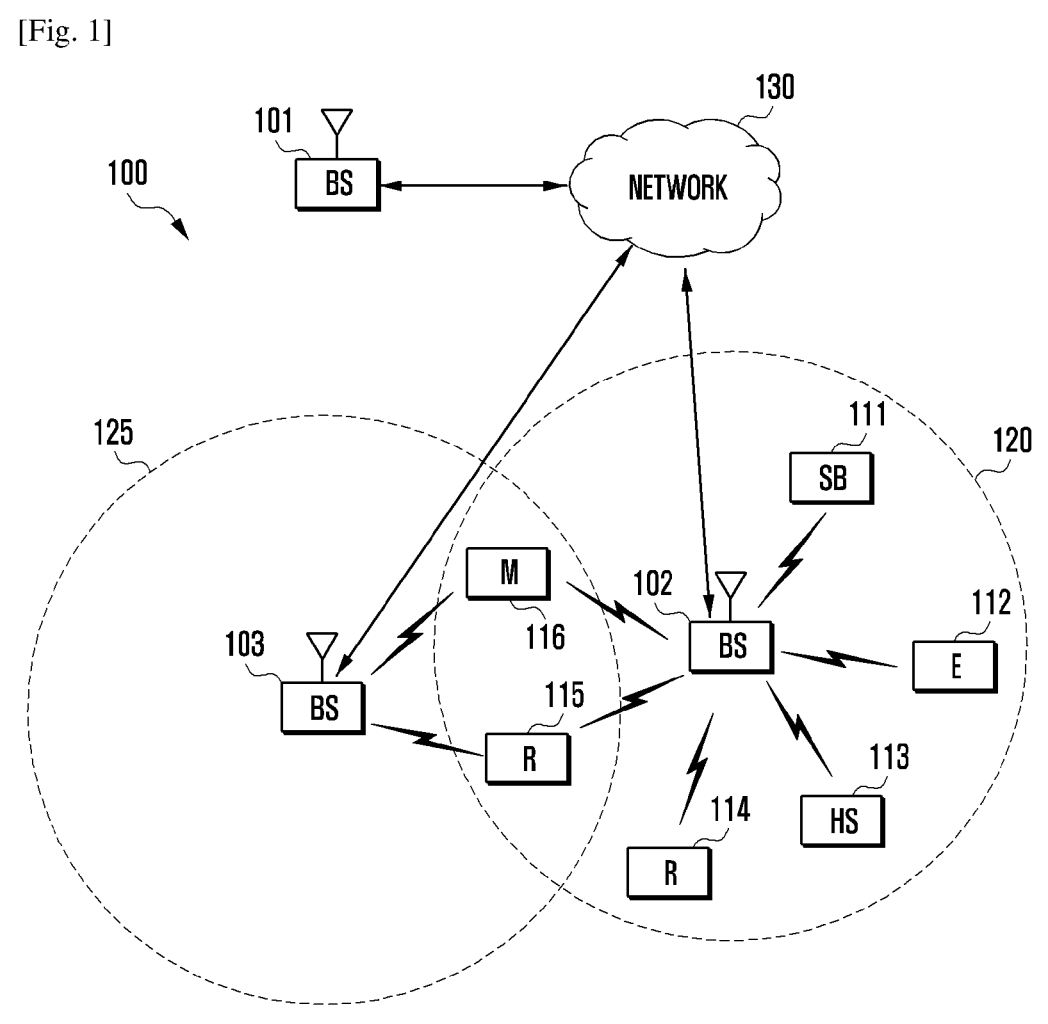

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

FIGS. 2A and 2B illustrate example wireless transmission and reception paths according to the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The upconverter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

FIG. 3A illustrates an example UE 116 according to the present disclosure. The embodiment of UE 116 shown in FIG. 3A is for illustration only, and UEs 111-115 of FIG. 1 can have the same or similar configuration. However, a UE has various configurations, and FIG. 3A does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the capability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

FIG. 3B illustrates an example gNB 102 according to the present disclosure. The embodiment of gNB 102 shown in FIG. 3B is for illustration only, and other gNBs of FIG. 1 can have the same or similar configuration. However, a gNB has various configurations, and FIG. 3B does not limit the scope of the present disclosure to any specific implementation of a gNB. It should be noted that gNB 101 and gNB 103 can include the same or similar structures as gNB 102.

As shown in FIG. 3B, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n downconvert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and upconvert the baseband or IF signal into an RF signal transmitted via antennas 370a-370n.

The controller/processor 378 can include one or more processors or other processing devices that control the overall operation of gNB 102. For example, the controller/ processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/ processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

According to an embodiment of the present disclosure, there are provided an apparatus and method for uplink signal transmission in a wireless communication system, which can be used to perform uplink signal transmission in a case where the preset signal transmission quality is not satisfied, so as to increase transmission power and enlarge coverage radius. The signal transmission quality is measured by Error Vector Magnitude (EVM). For example, when the signal is transmitted in a 256QAM modulation mode, the corresponding EVM requirement is 3.5%. When the EVM is greater than 3.5%, the reception quality of the signal will be seriously influenced.

FIG. 4 illustrates a flowchart of a method for uplink signal transmission in a wireless communication system according to an embodiment of the present disclosure.

Firstly, in step 401, a terminal reports parameters for signal transmission quality of an uplink signal in a particular modulation mode.

In step 402, the terminal obtains configuration parameters of a physical uplink channel and/or a physical signal.

In step 403, the terminal performs uplink signal transmission according to the configuration parameters of the physical uplink channel and/or the physical signal.

Wherein, the modulation mode in the step 401 refers to a mapping mode from a bit group to symbols that is performed according to a preset rule. The particular modulation mode refers to at least one of 256 Quadrature Amplitude Modulation (QAM), 1024 QAM, amplitude-phase keying modulation, or star-QAM, and one of its characteristics is that a modulated transmission signal has a property of a high PAPR after being converted from a frequency domain to a time domain, such as quadrature amplitude high-order modulation, while one of the beneficial effects of using the high-order modulation is that data throughput can be improved.

It will be appreciated that the terms "report", "indicate" and similar words used in the context for describing the present disclosure can be used interchangeably, and can all be interpreted as uplink or downlink communication in a wireless communication network. In addition, depending on the network type, other well-known terms than "report", "indicate" and so on can be used.

A particular implementation for the terminal reporting the parameters of the signal transmission quality in the particular modulation mode can be the terminal reporting the transmission capability related to the particular modulation mode, to facilitate a base station to schedule the particular modulation mode. The parameters of the signal transmission quality in the particular modulation mode include at least one of the following:

a first quality parameter: used to indicate whether a terminal is of the capability to transmit signal that does not satisfy the preset signal transmission quality requirement in the particular modulation mode, to facilitate the base station to decide whether to schedule the particular modulation mode for transmission according to the capability indicator.

If the first quality parameter indicates that the terminal has no capability to transmit the signal that does not satisfy the preset signal transmission quality requirement in the particular modulation mode, the terminal can only perform signal transmission according to a preset signal transmission mode.

If the first quality parameter indicates that the terminal is of the capability to transmit the signal that does not satisfy the preset requirement of signal transmission quality in the particular modulation mode, the terminal can be scheduled to perform transmission in the particular modulation mode, wherein the signal transmission quality does not satisfy the preset signal transmission quality requirement.

One particular implementation of the first quality parameter indicator information can be represented by 1 bit, with 0 representing that the terminal has no capability to transmit the signal that does not satisfy the preset signal transmission quality requirement in the particular modulation mode, 1 representing that the terminal is of the capability to transmit the signal that does not satisfy the preset signal transmission quality requirement in the particular modulation mode; or 1 representing that the terminal has no capability to transmit the signal that does not satisfy the preset signal transmission quality requirement in the particular modulation mode, and 0 representing that the terminal is of the capability to transmit the signal that does not satisfy the preset signal transmission quality requirement in the particular modulation mode.

A specific implementation of the first quality parameter indicator information can also be to report a transmission power adjustment parameter that can be supported in a particular modulation mode. For example, the specific content reported can be the group index supported in a plurality of transmission power adjustment parameter groups, and/or whether a plurality of transmission power adjustment parameter groups are supported, etc. Preferably, the parameters included in the transmission power adjustment parameter group can be used to adjust the calculation of the maximum uplink transmission power. For example, the parameters included in the power adjustment parameter group can be at least one of the following: maximum output power back-off (MPR) value (or MPR offset), the received configured maximum transmission power offset, the maximum power offset corresponding to the power level, and the offset related to the signal transmission quality when calculating the maximum transmission power.

When the terminal reports that transmission power adjustment parameter group that can be supported is one group, and/or the terminal does not support a plurality of transmission power adjustment parameter groups, it means that the terminal has no capability to transmit the signal that does not satisfy the preset signal transmission quality requirement in the particular modulation mode, the terminal uses the preset transmission power adjustment parameter to calculate the uplink maximum transmission power. When the terminal reports that the transmission power adjustment parameter group than can be supported is greater than one group, and/or the terminal supports a plurality of transmission power adjustment parameter groups, it means that the terminal is of the capability to transmit the signal that does not satisfy the preset signal transmission quality requirement in the particular modulation mode, then the terminal determines the transmission power adjustment parameter according to the downlink indicator to calculate the uplink maximum transmission power.

Wherein, the maximum output power back-off (MPR) value refers to the back-off value of the allowable maximum output power, and the value may be different according to modulation mode and/or transmission bandwidth configuration. The modulation mode includes the modulation order and/or the waveform of the transmission signal and/or mapping mode on the constellation diagram. The transmission bandwidth configuration refers to the location allocation of resource blocks within a given channel bandwidth.

Preferably, when the terminal reports that the transmission power adjustment parameter group than can be supported is greater than one group and/or the terminal supports a plurality of transmission power adjustment parameter groups, and each of the supported transmission power adjustment parameter groups includes the parameter MPR (or MPR offset), the terminal determines the transmission power adjustment parameter group used for uplink maximum transmission power calculation according to the downlink indicator and determines the MPR value, where the MPR is the parameter included in the transmission power adjustment parameter group, or is calculated by the terminal according to the MPR offset included in the transmission power adjustment parameter group and the default MPR value (for example, the sum of the two).

Preferably, the received configured maximum transmission power offset by the received configured maximum transmission power offset refers to the offset of the maximum transmission power allowed to be transmitted determined by the terminal according to the received downlink indicator configuration. When the terminal reports that the transmission power adjustment parameter group that can be supported is greater than one group and/or the terminal supports a plurality of transmission power adjustment parameter groups, and each of the supported transmission power adjustment parameter groups includes the received configured maximum transmission power offset, the terminal determines the calculation value of the received configured maximum transmission power according to the transmission power adjustment parameter groups used for uplink transmission power calculation determined according to the downlink indicator, where the calculation value of the received configured maximum transmission power is obtained from the configured maximum transmission power offset received according to the parameters contained in the transmission power adjustment parameter group and the received configured maximum transmission power value (for example, the sum of the two).

Wherein, the maximum power offset corresponding to the power level refers to the maximum power offset corresponding to a specific power level of the terminal, and is represented by $\Delta P$PowerClass. Preferably, when the terminal reports that the transmission power adjustment parameter group that can be supported is greater than one group and/or the terminal supports a plurality of transmission power adjustment parameter groups, and each of the supported transmission power adjustment parameter groups includes the parameter $\Delta P$PowerClass, the terminal determines the value of $\Delta P$PowerClass according to the transmission power adjustment parameter groups used for the uplink miximum transmission power determined by the downlink indicator and calculate the uplink maximum transmission power.

Preferably, the offset value related to the signal transmission quality in the calculation of the maximum transmission power refers to the offset value related to the signal transmission quality in the calculation formula adopted when the terminal calculates the maximum transmission power, and is represented by $\Delta T_E$. When the terminal reports that the transmission power adjustment parameter group that can be supported is greater than one group and/or the terminal supports a plurality of transmission power adjustment parameter groups, and each of the supported transmission power adjustment parameter groups includes the parameter $\Delta T_E$, the terminal determines the value of $\Delta T_E$ according to the transmission power adjustment parameter groups used for the uplink maximum transmission power determined by the downlink indicator and calculate the uplink maximum transmission power.

A second quality parameter: used to indicate signal transmission quality level(s) that the terminal can support. The terminal reporting the second quality parameter can make the base station configure the transmission quality of the signal in the particular modulation mode according to the signal transmission quality level indicator, which facilitates the terminal to adjust the transmission power in different application scenarios, and the coverage radius of the terminal in the particular modulation mode can be increased.

One particular implementation of the second quality parameter can be reporting one or more signal transmission quality levels.

There are two ways to interpret the signal transmission quality level: (I) from the perspective of the terminal transmitting data, when quality level(s) is(are) reported, it can indicate a highest quality level that can be achieved by a signal transmitted in the particular modulation mode. At this time, signal transmission quality level that the terminal can transmit is any quality level that is not higher than the highest quality level; (II) from the perspective of the base station receiving data, the data transmitted by the terminal needs to be correctly received by the base station. If the base station can receive a signal with a low-quality level, the base station must be able to receive a signal with a high-quality level. Therefore, when a signal transmission quality level is reported, the level can indicate a lowest quality level that can be achieved by a signal transmitted in the particular modulation mode. At this time, signal transmission quality levels that the terminal can transmit are all quality levels that are not lower than the lowest quality level. The second interpretation way is adapted in this application. Thus, the base station can configure the terminal to transmit signals of different transmission quality according to its own capability, to further improve the coverage radius of the terminal in the particular modulation mode.

In addition, when a quality level is reported, the level can also be a determined quality level that can be achieved by a signal transmitted in the particular modulation mode. When the terminal reports a plurality of levels, it represents that the terminal can support each of the reported signal transmission quality levels.

Table 1 shows an example of signal transmission quality level indicator of transmission signal reported by the terminal. As shown in Table 1, when the terminal reports that the signal transmission quality level indicator is C, it represents that the transmission quality of the signal transmitted by the terminal at this time can satisfy the level indicator C at least, that is, a signal with the EVM of the transmission quality not exceeding 8.5% can be transmitted. In addition, the signal transmission quality of the terminal can further satisfy both level indicators A and B, that is, the terminal can not only transmit the signal with the EVM of signal transmission quality not exceeding 8.5%, but can also transmit a signal with the EVM of signal transmission quality not exceeding 5% or 7%. Alternatively, when the terminal reports that the signal transmission quality level indicator is C, it represents that the transmission quality of the signal transmitted by the terminal can only satisfy the level indicator C, that is, only the signal with the EVM of signal transmission quality not exceeding 8.5% can be transmitted.

TABLE 1

| Signal transmission quality level indicator | EVM of transmission signal |
|---|---|
| A | ≤5% |
| B | ≤7% |
| C | ≤8.5% |

A third quality parameter: used to indicate reference signal type(s) that the terminal can support. The reference signal includes a demodulation reference signal of a physical uplink channel, the physical uplink channel includes a Physical Uplink Shared Channel (PUSCH) and a Physical Uplink Control Channel (PUCCH). Furthermore, the reference signal type indicator can represent the reference signal type(s) that can be supported in the particular modulation mode, and at least include a time-frequency resource pattern indicator and/or a reference signal sequence indicator, etc. The terminal reports the reference signal type indicator, to facilitate the base station to configure different reference signal types according to different application scenarios in the particular modulation mode, so that the configured reference signal types satisfy the requirement, to facilitate processing at a receiving end.

Preferably, the time-frequency resource pattern indicator can represent a design when there are one or more reference symbols in one transmission occasion slot. One of the characteristics is that when there is a plurality of reference symbols in one transmission occasion slot, the reference symbols can be adjacent or separated. When being adjacent in one transmission occasion slot, the plurality of reference symbols can be used to handle a case where a nonlinear distortion factor of a signal changes slowly. When being separated in one transmission occasion slot, the plurality of reference symbols can be used to handle a case where the nonlinear distortion factor of the signal changes rapidly.

Preferably, the time-frequency resource pattern indicator can represent a design when one reference symbol occupies one or more frequency domain subcarriers. One of the characteristics is that when one reference symbol occupies a plurality of frequency domain subcarriers, the frequency domain subcarriers can be adjacent or discrete. Preferably, frequency domain subcarriers of a reference symbol occupy an entire bandwidth. When the frequency domain subcarriers of a reference symbol occupy the entire bandwidth, after being converted into a time-domain signal, the reference symbol can more accurately characterize the nonlinear distortion factor subjected by data. Preferably, the frequency domain subcarriers of the reference symbol can be placed discretely. The discrete placement of frequency domain subcarriers means to insert one or more non-reference signal subcarriers between two frequency domain subcarriers of one reference symbol. Such design can allow more bandwidths to be used to transmit the data, thus improving bandwidth utilization.

Table 2 shows an example of reference signal time-frequency resource pattern indicators reported by terminal. As shown in Table 2, reference signal time-frequency resource pattern indicator 1 represents that a plurality of adjacent reference symbols are located in the start position in the transmission occasion slot, frequency domain is continuous; a reference signal time-frequency resource pattern indicator 2 represents that a plurality of adjacent references symbols are located in the middle position in the transmission occasion slot, frequency domain is continuous; a reference signal time-frequency resource pattern indicator 3 represents a plurality of separate reference symbols are located in the start position and middle position in the transmission occasion slot, frequency domain is continuous; a reference signal time-frequency resource pattern indicator 4 represents that a plurality of adjacent reference symbols are located in the start position in the transmission occasion slot, frequency domain is discrete; a reference signal time-frequency resource pattern indicator 5 represents that a plurality of adjacent reference symbols are located in the middle position in the transmission occasion slot, frequency domain is discrete; a reference signal time-frequency resource pattern indicator 6 represents that a plurality of separate reference symbols are located in the start position and middle position in the transmission occasion slot, frequency domain is discrete.

TABLE 2

| reference signal time-frequency resource pattern indicators | reference signal time-frequency resource pattern |
|---|---|
| 1 | Adjacent reference symbols are located in the start position in the transmission occasion slot, frequency domain is continuous |
| 2 | Adjacent reference symbols are located in the middle position in the transmission occasion slot, frequency domain is continuous |
| 3 | Separate reference symbols are located in the start position and middle position in the transmission occasion slot, frequency domain is continuous |
| 4 | Adjacent reference symbols are located in the start position in the transmission occasion slot, frequency domain is discrete |
| 5 | Adjacent reference symbols are located in the middle position in the transmission occasion slot, frequency domain is discrete |
| 6 | Separate reference symbols are located in the start position and middle position in the transmission occasion slot, frequency domain is discrete |

Different from the preset pursuit of a constant envelope design of a reference signal sequence, a design of the reference signal sequence in this application needs to satisfy that the reference signal and data have similar signal transmission quality; in addition, interference randomization can be realized for reference signals of different cells. A particular implementation of generating a reference signal sequence can be to generate the reference signal sequence by boosting the power of a sequence with a low PAPR; or, to generate the reference signal sequence by scrambling a sequence with a low PAPR; or, to generate the reference signal sequence by adding a plurality of points with value 0 to a sequence with a low PAPR; or, to generate the reference signal sequence by changing values of a plurality of points into zero in a sequence with a low PAPR; or, to generate the reference signal sequence by a pseudo-random sequence plus any modulation mode. Wherein, the sequence with a low PAPR can be a Zadoffchu (ZC) sequence or a sequence that uses transform precoding, and a base sequence for the reference signals can be generated for different cells according to cell identities of the different cells, so to realize interference randomization.

The reference signal sequence indicator is used to represent a way to generate one or more types of reference signal sequences. Wherein the one or more types of reference signals can be generated by the supportable way recommended by the terminal, or each reference signal sequence corresponds to a different signal transmission quality. When a plurality of reference signal sequences are reported, it can represent that each reference signal sequence can be supported. When one reference signal sequence is reported, it can represent that only the reference signal sequence is supported, or it can represent that all of other reference signal sequences whose transmission quality levels are not lower than that of the reference signal sequence can be supported.

Table 3 shows an example of reference signal sequence indicators reported by terminal. As shown in Table 3, a reference signal sequence indicator 1 represents that the reference signal sequence is a power-boosted ZC sequence, with corresponding signal transmission quality being EVM 5%, a reference signal sequence indicator 2 represents that the reference signal sequence is generated by inserting zero into the ZC sequence, with corresponding signal transmission quality being EVM 7.5%, and the reference signal sequence indicator 4 represents that the reference signal sequence is generated by modulating a pseudo-random sequence by Quadrature Phase Shift Keying (QPSK), with corresponding signal transmission quality being EVM 8%. When a reported reference signal sequence indicator is 4, it represents that not only can a sequence generated by modulating the pseudo-random sequence by the QPSK be supported, but also a sequence generated by inserting zero into the ZC sequence, a power-boosted ZC sequence, and a scrambled ZC sequence can be supported at this time. Alternatively, when the reported reference signal sequence indicator is 4, it can represent that only a sequence generated by modulating the pseudo-random sequence by the QPSK is supported now. Alternatively, when a reported reference signal sequence indicator is 5, it can represent that the pseudo-random sequence is modulated by 256QAM at this time, wherein, compared with a QPSK modulation mode, the 256QAM is a high-order modulation mode.

The advantage of this design is that the way to generate each reference signal sequence corresponds to different PAPRs, and thus the reference signal sequences after PA have different signal transmission qualities, so that the base station can select different reference signals for transmission according to the application scenarios in the particular modulation mode.

TABLE 3

| Reference signal sequence indicators | Reference signal sequences |
|---|---|
| 1 | Power-boosted ZC sequence |
| 2 | Zero-inserted ZC sequence |
| 3 | Scrambled ZC sequence |
| 4 | QPSK-modulated pseudorandom sequence |
| 5 | 256QAM-modulated pseudorandom sequence |

A fourth quality parameter: used to indicate uplink power adjustment level(s) that the terminal can support. Further, the uplink power adjustment level indicator can represent the transmission power adjustment level(s) that can be supported in a particular modulation mode. Particularly, the uplink power adjustment level indicator is used to represent adjustment value(s) of the maximum uplink transmission power and/or uplink Power Headroom (PH) and/or uplink transmission power of the terminal.

Thus, it is convenient for the base station to adjust the maximum transmission power and/or uplink transmission power in the particular modulation mode, and the effective coverage area is improved by the adjustment of the power.

One particular implementation of the uplink power adjustment level indicator is to report one or more maximum transmission power adjustment levels. When one maximum transmission power adjustment level is reported, the level can be a maximum adjustment value that can be achieved by the transmission signal in the particular modulation mode. At this time, the maximum transmission power adjustment value of the terminal is any level that is not higher than the highest adjustment level. Alternatively, when one maximum transmission power adjustment level is reported, the level can also be an adjustment value that can be achieved by the transmission signal in the particular modulation mode. When a plurality of maximum transmission power adjustment levels are reported, it represents that all power adjustment values reported in the particular modulation mode can be supported. Thus, an option is provided to the base station to allow it configuring the transmission power according to its own capability, to adapt to different application scenarios, and meanwhile, signaling overhead is reduced.

Table 4 shows an example of maximum transmission power adjustment level indicators reported by the terminal. As shown in Table 4, when a maximum transmission power adjustment level indicator is A, the maximum transmission power adjustment value is 0.5 dB, with the maximum transmission power is adjusted up by 0.5 dB by the terminal; when a maximum transmission power adjustment level indicator is B, the maximum transmission power adjustment value is 1 dB, with the maximum transmission power is adjusted up by 1 dB when calculated by the terminal, and so on. When only one power adjustment value is reported, for example when the maximum transmission power adjustment level indicator reported by the terminal is C, it can represent that the maximum power adjustment for signal transmission by the terminal at this time can satisfy the level indicator C, that is, the maximum transmission power can be adjusted up by 1.5 dB at the most when calculated by the terminal. In addition, the power adjustment of the terminal can also satisfy the level indicator A or B, that is, the power adjustment not only can be adjusted up by 1.5 dB, but also can be adjusted up by 0.5 dB or 1 dB by the terminal. Alternatively, when only one power adjustment value is reported, for example, when the maximum transmission power adjustment level indicator reported by the terminal is C, it can represent that the power adjustment for signal transmitted by the terminal at this time can only satisfy the level indicator C, that is, the power adjustment value is 1.5 dB.

TABLE 4

| Maximum transmission power adjustment level indicators | Maximum transmission power adjustment values |
|---|---|
| A | 0.5 dB |
| B | 1 dB |
| C | 1.5 dB |
| . . . | . . . |

One particular implementation of the uplink power adjustment level indicator can also be to report one or more power headroom adjustment levels. When one power headroom adjustment level is reported, the level can be the maximum adjustment value that can be achieved by the transmission signal in the particular modulation mode. At this time, a power headroom adjustment value of the terminal is any level that is not higher than the highest adjustment level. When one power headroom adjustment level is reported, the level can also be a corresponding power headroom adjustment value in the particular modulation mode. When a plurality of power headroom adjustment levels are reported, it represents that each power headroom value reported in the particular modulation mode can be supported. Thus, an option can be provided to the base station to allow it configuring the transmission power according to its own capability, to adapt to different application scenarios, and meanwhile, signaling overhead is reduced.

Table 5 shows an example of power headroom adjustment level indicator reported by the terminal. As shown in Table 5, when a power headroom adjustment level indicator is A, the power headroom adjustment value is 0.5 dB, with the power headroom can be adjusted by 0.5 dB by the terminal; when the power headroom adjustment level indicator is B, the power headroom adjustment value is 1 dB, with power headroom can be adjusted by 1 dB by the terminal, and so on. When only one power adjustment value is reported, for example, when the power adjustment level indicator reported by the terminal is C, it represents that the power adjustment for signal transmitted by the terminal at this time can satisfy the level indicator C at the most, that is, the power value that can be adjusted can reach 1.5 dB at the most, and in addition, the power adjustment by the terminal can also satisfy the level indicator A or B, that is, the power adjustment by the terminal not only can be 1.5 dB, but also can be 0.5 dB or 1 dB. Alternatively, when only one power adjustment value is reported, for example, when the power adjustment level indicator reported by the terminal is C, it can represent that the power adjustment for signal transmitted by the terminal at this time can only satisfy the level indicator C, that is, the adjusted power value is 1.5 dB.

TABLE 5

| Power headroom adjustment level indicator | Power headroom adjustment value |
|---|---|
| A | 0.5 dB |
| B | 1 dB |
| C | 1.5 dB |
| . . . | . . . |

One particular implementation of the uplink power adjustment level indicator can also be reporting one or more uplink transmission power adjustment levels. When one uplink transmission power adjustment level is reported, the level can be the maximum adjustment value that can be achieved by the transmission signal in the particular modulation mode. At this time, the adjustment value of the uplink transmission power of the terminal is any level that is not higher than the highest adjustment level. When one uplink transmission power adjustment level is reported, the level can also be a corresponding uplink transmission power adjustment value in the particular modulation mode. When a plurality of uplink transmission power adjustment levels are reported, it represents that each uplink transmission power value reported in the particular modulation mode can be supported. Thus, an option is provided to the base station to allow it configuring the transmission power according to its own capability, to adapt to different application scenarios, and meanwhile, signal overhead is reduced.

Table 6 shows an example of uplink transmission power adjustment level indicator reported by the terminal. As shown in Table 6, when an uplink transmission power adjustment level indicator is A, the uplink transmission power adjustment value is 0.5 dB, with the uplink transmission power can be adjusted by 0.5 dB by the terminal; when the uplink transmission power adjustment level indicator is B, the uplink transmission power adjustment value is 1 dB, with uplink transmission power can be adjusted by 1 dB by the terminal, and so on. When only one power adjustment value is reported, for example, when the power adjustment level indicator reported by the terminal is C, it represents that the power adjustment for signal transmitted by the terminal at this time can satisfy the level indicator C at the most, that is, the power value that can be adjusted can reach 1.5 dB at the most, and in addition, the power adjustment by the terminal can also satisfy the level indicator A or B, that is, the power adjustment by the terminal not only can be 1.5 dB, but also can be 0.5 dB or 1 dB. Alternatively, when only one power adjustment value is reported, for example, when the power adjustment level indicator reported by the terminal is C, it can represent that the power adjustment for signal transmitted by the terminal at this time can only satisfy the level indicator C, that is, the adjusted power value is 1.5 dB.

TABLE 6

| Uplink transmission power adjustment level indicator | Uplink transmission power adjustment value |
|---|---|
| A | 0.5 dB |
| B | 1 dB |
| C | 1.5 dB |
| . . . | . . . |

A fifth quality parameter: used to indicate the signal transmission quality characteristic of the signal transmitted by the terminal. The signal transmission quality characteristic includes a nonlinear characteristic of the signal. Preferably, the signal transmission quality characteristic indicator can represent the mathematical feature of the nonlinear characteristic of the signal, for example, the signal transmission quality characteristic indicator includes a model type indicator and/or model parameter indicator of the nonlinear characteristic of the signal. The signal transmission quality characteristic is reported by the terminal, so that the base station can configure a receiver according to the mathematical feature of the nonlinear characteristic of the signal, thereby achieving the effect of better processing of the signal.

Preferably, the model type indicator of the nonlinear characteristic of the signal can be expressed as a nonlinear model type obtained by modeling the nonlinear characteristic of the signal with a mathematical method, for example, the nonlinear model type includes at least one of the following: a Rapp model, a Saleh model, a Ghorbani model, a Taylor (polynomial) series model, a Hammerstein model, a Wiener model, a Volterra series expansion model, a memory polynomial model, and a generalized memory polynomial model. The model parameter indicator of the nonlinear characteristic of the signal can also refer to a nonlinear model parameter obtained based on the obtained nonlinear model type. For example, the model parameter include at least one of the following: a Rapp model parameter 1, a Rapp model parameter 2, a 2.1 GHz memory polynomial nonlinear model parameter, a 2.1 GHz memoryless polynomial nonlinear model parameter, a 2 GHz memory polynomial nonlinear model parameter, a 2 GHz memoryless polynomial nonlinear model parameter, a 28 GHz memory polynomial CMOS nonlinear model parameter, a 28 GHz memoryless polynomial CMOS nonlinear model parameter, a 28 GHz memory polynomial GaN nonlinear model parameter, and a 28 GHz memoryless polynomial GaN nonlinear model parameter. The model type indicator and/or model parameter indicator of the nonlinear characteristic of the signal describe the mathematical expression of a relationship between variables after the signal undergoing nonlinear distortion; and by using the prior knowledge. The receiving end of the base station can be set to match to recover the signal from nonlinear distortion.

One particular implementation of the signal transmission quality characteristic indicator is to report a model type of the nonlinear characteristic of the signal by the terminal. Table 7 shows an example of model type indicator of nonlinear characteristic of signal reported by the terminal. As shown in Table 7, when the model type indicator of the nonlinear characteristic of the signal is 1, it represents that the nonlinear characteristic of the signal can be characterized by the Rapp model, when the model type indicator of the nonlinear characteristic of the signal is 2, it represents that the nonlinear characteristic of the signal can be characterized by the Saleh model, when the model type indicator of the nonlinear characteristic of the signal is 3, it represents that the nonlinear characteristic of the signal can be characterized by the Ghorbani model, and so on. By reporting the model type of the nonlinear characteristic of the signal, the receiving end of the base station can set different signal processing modes for different model types to perform signal recovery.

TABLE 7

| Model type indicator domain of nonlinear characteristic of signal | Model type of nonlinear characteristic of signal |
|---|---|
| 1 | Rapp model |
| 2 | Saleh model |
| 3 | Ghorbani model |
| 4 | Taylor (polynomial) series model |
| 5 | Hammerstein model |
| 6 | Wiener model |
| 7 | Volterra series expansion model |
| 8 | Memory polynomial model |
| 9 | Generalized memory polynomial model |
| . . . | . . . |

One particular implementation of the signal transmission quality characteristic indicator can also be that, based on determining the nonlinear characteristic model type of the signal by predefined or other ways, the terminal reports model parameters of the nonlinear characteristic of the signal. Wherein the other ways of determining the nonlinear characteristic model type of the signal can be that the terminal reports the model type of the nonlinear characteristic through signaling or an uplink channel. At this time, according to the model parameters, the receiving end of the base station can further optimize configuration parameters of a neural network to improve reception performance.

Optionally, one particular implementation of reporting the parameters by the terminal can be to determine the model type of the nonlinear characteristic of the signal as the Rapp model through predefined or other ways, and the amplitude distortion (AM-AM) of its output signal to input signal and the phase distortion (AM-PM) of its output signal to input signal can be expressed as follows:

$$F_{AM-AM}(x) = \frac{Gx}{(1 + \left|\frac{Gx}{V_{sat}}\right|^{2p})^{\frac{1}{2P}}}$$

-continued $$F_{AM\,PM}(x) = \frac{Ax^q}{1 + \left(\frac{x}{B}\right)^q}$$

where, x is a complex input signal, G, $V_{sat}$, P, A, B and q are parameters, and G is a linear gain, $V_{sat}$ is a saturation level, P is a smooth factor, and A, B and q are quantization coefficients.

The terminal reports a model parameter indicator, wherein the model parameter indicator is related to the values of particular parameters in Rapp model, as shown in Table 8. Table 8 shows an example of Rapp model parameter indicator reported by the terminal.

TABLE 8

| Rapp model parameter indicator field | Rapp model parameter |
|---|---|
| 1 | Rapp model parameter 1 |
| 2 | Rapp model parameter 2 |
| . . . | . . . |

When the Rapp model parameter indicator is 1, the corresponding Rapp model uses a first set of parameters, wherein:

| Parameter | Value |
|---|---|
| G | 44.6 dB |
| $V_{sat}$ | 57.6 dBm |
| P | 1 |
| A | −0.14 |
| B | 1.2 |
| q | 5 |

When the Rapp model parameter indicator is 2, the corresponding Rapp model uses a second set of parameters, wherein:

| Parameter | Value |
|---|---|
| G | 31.6228 dB |
| $V_{sat}$ | 7.9339 dBm |
| P | 3 |
| A | −15601 |
| B | 0.228 |
| q | 4.7 |

Optionally, one particular implementation of reporting the parameters by the terminal can be to determine the model type of the nonlinear characteristic of the signal as the generalized memory polynomial model through predefined or other ways, and when the model of the nonlinear characteristic of the signal is characterized using the generalized memory polynomial model, the relationship between the output signal and the input signal can be expressed as follows:

$$y(n) = \sum_{k \in K_a} \sum_{l \in L_a} a_{kl} x(n-l)|x(n-l)|^{2k} + \sum_{k \in K_b} \sum_{l \in L_b} \sum_{m \in M} b_{klm} x(n-l)|x(n-m)|^{2k}$$

where, y(n) and x(n) respectively represent the complex output signal and the input signal, 1 time offset, and $a_{kl}$ and $b_{klm}$ are parameters.

As a supplement to the above equation, the memoryless polynomial model can be expressed as:

$$y(n) = \sum_{k \in K} a_k x(n)|x(n)|^{2k}$$

The terminal reports a model parameter indicator, wherein the model parameter indicator is related to the values of particular parameters in the generalized memory polynomial model, and the particular indicators can be as shown in Table 9. Table 9 shows an example of generalized memory polynomial model parameter indicator reported by the terminal.

TABLE 9

| Generalized memory polynomial model parameter indicator field | Generalized memory polynomial model parameter |
|---|---|
| 1 | 2.1 GHz memory polynomial nonlinear model parameter (based on measurement of commercial GaAs PA) |
| 2 | 2.1 GHz memoryless polynomial nonlinear model parameter (based on measurement of commercial GaAs PA) |
| 3 | 2 GHz memory polynomial nonlinear model parameter (based on measurement of GAn PA) |
| 4 | 2 GHz memoryless polynomial nonlinear model parameter (based on measurement of GAn PA) |
| 5 | 28 GHz memory polynomial CMOS nonlinear model parameter (based on circuit simulation of design PA) |
| 6 | 28 GHz memoryless polynomial CMOS nonlinear model parameter (based on circuit simulation of design PA) |
| 7 | 28 GHz memory polynomial GaN nonlinear model parameter (based on circuit simulation) |
| 8 | 28 GHz memoryless polynomial GaN nonlinear model parameter (based on circuit simulation) |
| . . . | . . . |

When the generalized memory polynomial model parameter indicator is 1, the corresponding generalized memory polynomial model uses the 2.1 GHz memory polynomial nonlinear model parameter (based on the measurement of commercial GaAs PA); when the generalized memory polynomial model parameter indicator is 2, the corresponding generalized memory polynomial model uses the 2.1 GHz memoryless polynomial nonlinear model parameter (based on the measurement of the commercial GaAs PA); and so on.

One particular implementation of the signal transmission quality characteristic indicator can also be that the terminal reports the model type indicator and the model parameter indicator of the nonlinear characteristic of the signal simultaneously. The model type and model parameters of the nonlinear characteristic are simultaneously determined according to one indicator field. By adopting a method of simultaneously reporting the model type and model parameters of the nonlinear characteristic of the signal, the transmission quality characteristics of the signal can be completely characterized using one table, so that the signaling overhead can be reduced.

Table 10 gives one example of signal transmission quality characteristic indicator reported by the terminal. If the signal transmission quality characteristic indicator field is represented by N bits, the higher $N_1$ bits are for the nonlinear model type indicator of the signal, and the lower $N_2$ bits are for the nonlinear model parameter indicator, where $1 \leq N_1 \leq N-1$, $N_2 = N-N_1$, the number of nonlinear model types that can be indicated is at most $2^{N1}$, and the number of nonlinear model parameter types that can be indicated is at most $2^{N2}$. For example, when the higher $N_1$ bits of the signal transmission quality characteristic indicator field are 0 . . . 01, and the lower $N_2$ bits are 0 . . . 01, the nonlinear characteristic of the signal can be characterized by the Rapp model at this time, and the first set of parameters of the Rapp model is used; when the higher $N_1$ bits of the signal transmission quality characteristic indicator domain are 0 . . . 01, and the lower $N_2$ bit are 0 . . . 010, the nonlinear characteristic of the signal can be characterized by the Rapp model, and the second set of parameters of the Rapp model is used; when the higher $N_1$ bit of the signal transmission quality characteristic indicator domain are 0 . . . 010, and the lower $N_2$ bit are 0 . . . 01, the nonlinear characteristic of the signal can be characterized by the generalized memory polynomial model at this time, and the 2.1 GHz memory polynomial nonlinear model parameter (based on the measurement of commercial GaAs PA) is used; when the higher $N_1$ bits of the signal transmission quality characteristic indicator domain are 0 . . . 010, and the lower $N_2$ bit are 0 . . . 010, the nonlinear characteristic of the signal can be characterized by the generalized memory polynomial model, and the 2.1 GHz memoryless polynomial nonlinear model parameter (based on the measurement of commercial GaAs PA) is used, and so on.

TABLE 10

| Signal transmission quality characteristic indicator field | | Model parameters of nonlinear |
|---|---|---|
| Higher $N_1$ bits | Lower $N_2$ bits | characteristic of signal |
| 0 . . . 01 | 0 . . . 01 | Rapp model parameter1 |
| 0 . . . 01 | 0 . . . 010 | Rapp model parameter 2 |
| . . . | . . . | . . . |
| 0 . . . 010 | 0 . . . 01 | 2.1 GHz memory polynomial nonlinear model parameters (based on measurement of commercial GaAs PA |
| 0 . . . 010 | 0 . . . 010 | 2.1 GHz memoryless polynomial nonlinear model parameters (based on measurement of commercial GaAs PA |
| | . . . | . . . |

Optionally, the terminal can transmit a request of reporting its terminal capability to the base station before step 101, and an indicator for reporting the terminal capability is obtained from the base station.

Wherein, the method of obtaining the configuration parameters by the terminal in step 402 includes at least one of the following: obtaining the configuration parameters by analyzing the physical downlink control channel, obtaining the configuration parameters by analyzing the higher-level signaling, and obtaining the configuration parameters by analyzing the Media Access Control (MAC) information of the physical downlink shared channel. Optionally, the configuration parameters can be configured through dynamic setting of DCI or semi-static setting of RRC signaling. When being not configured with the parameters, the terminal can use a preset value to obtain the configuration parameters. The configuration parameters include at least one of the following:

An Indicator of Signal Transmission Quality Level(s) Required to be Satisfied for Transmitting Uplink Signal;

When being required to use the particular modulation mode for transmission without satisfying the preset signal transmission quality requirement, the terminal performs uplink signal transmission according to the configured signal transmission quality requirement. Wherein, the way of acquiring the configuration parameters can be explicit or implicit. For example, one particular implementation of explicitly acquiring the configuration parameters can be directly reading the signal transmission quality level indicator. One particular implementation of implicitly acquiring the configuration parameters can be the terminal reading the reference signal type indicator and/or the power adjustment level indicator, wherein the signal transmission quality level indicator is associated with the reference signal type indicator and/or the power adjustment level indicator. One particular implementation of implicitly acquiring the configuration parameters can also be using the preset value by the terminal.

An Indicator for Reference Signal Type(s);

An indicator for reference signal type(s) includes at least one of a time-frequency resource pattern indicator and a reference signal sequence indicator, and is used to indicate reference signal type(s) that the terminal can support. When being required to use the particular modulation mode for transmission without satisfying the preset signal transmission quality requirement, the terminal performs uplink signal transmission according to the configured reference signal type indicator. Wherein, the way of acquiring the configuration parameters can be explicit or implicit. For example, one particular implementation of explicitly acquiring the configuration parameters can be directly reading the reference signal type indicator. One particular implementation of implicitly acquiring the configuration parameters can be the terminal reading the signal transmission quality level indicator and/or the power adjustment level indicator, wherein the reference signal type indicator is associated with the signal transmission quality level indicator and/or the power adjustment level indicator. One particular implementation of implicitly acquiring the configuration parameters can also be using the preset value by the terminal.

An Indicator for Power Adjustment Level(s);

When being required to use the particular modulation mode for transmission without satisfying the preset signal transmission quality requirement, the terminal adjusts the transmission power range according to the configured power adjustment level. Wherein, the way of acquiring the configuration parameters can be explicit or implicit. For example, one particular implementation of explicitly acquiring the configuration parameters can be directly reading the power adjustment level indicator. One particular implementation of implicitly acquiring the configuration parameters can be the terminal reading the signal transmission quality level indicator and/or the reference signal type indicator, wherein the power adjustment level indicator is associated with the signal transmission quality level indicator and/or the reference signal type indicator. One particular implementation of implicitly acquiring the configuration parameters can also be using the preset value by the terminal.

An Indicator for Power Adjustment Parameter:

The terminal selects the power adjustment parameter for calculating the maximum transmission power according to the obtained the indicator for power adjustment parameter. Preferably, the selection method can be to obtain the corresponding power adjustment parameter according to the power adjustment parameter group index. Wherein, the way of obtaining the configuration parameters may be explicit or implicit. For example, a particular implementation for explicitly acquiring the configuration parameter may be to directly read the indicator for power adjustment parameter. A particular implementation manner for implicitly acquiring the configuration parameters may be that the terminal reads the signal transmission quality level indicator and/or the indicator for reference signal type(s) and/or the indicator for power adjustment level(s), the indicator for power adjustment parameter and signal transmission quality level indicator and/or the indicator for reference signal type(s) and/or the indicator for power adjustment level(s) are associated. A specific implementation manner for implicitly obtaining the configuration parameter may also be that the terminal adopts a preset value.

An Indicator for Reporting Power Headroom:

The terminal selects the content of the power headroom report according to the obtained power headroom report indicator. Preferably, the selection method can be to select to report the power headroom calculated in a preset manner and/or the power headroom calculated in a non-preset manner based on the power headroom report indicator. Wherein, the non-preset manner includes at least one of the following: the power headroom calculated according to the power adjustment level indicator, and the power headroom calculated according to the power adjustment parameter indicator. Wherein, the manner of obtaining the configuration parameters may be explicit or implicit. For example, a particular implementation of explicitly acquiring the configuration parameters may be to directly read the power headroom report indicator. A particular implementation of implicitly obtaining the configuration parameters may be that the terminal adopts a preset value.

Wherein one particular implementation of the implicit relationship among signal transmission quality level indicator, the reference signal sequence indicator, power adjustment level(s) indicator and the power adjustment parameter is that, there is a corresponding relationship among the four indicators. As shown in Table 11, Table 12, Table 13 and Table 14, after acquiring at least one of the signal transmission quality level indicator and/or the reference signal sequence indicator and/or the power adjustment level indicator and/or power adjustment parameter indicator, the terminal can acquire other unknown parameters through the implicit relationship. In Table 14, the power adjustment parameter indicator is greater than 1, indicating that the terminal is required to use the particular modulation mode for transmission without satisfying the preset signal transmission quality requirement.

TABLE 11

| Implicit relationship (I) among quality parameters | | | |
|---|---|---|---|
| Signal transmission quality level indicator | EVM of transmission signal | Reference signal sequence | Maximum transmission power adjustment value |
| A | 5% | Power-boosted ZC sequence | 0.5 dB |
| B | 7% | Zero-inserted ZC sequence | 1 dB |
| C | 8.5% | QPSK-modulated pseudorandom sequence | 1.5 dB |

TABLE 12

| Implicit relationship (II) among quality parameters | | | |
|---|---|---|---|
| Reference signal sequence indicator | EVM of transmission signal | Reference signal sequence | Maximum transmission power adjustment value |
| 1 | 5% | Power-boosted ZC sequence | 0.5 dB |
| 2 | 7% | Zero-inserted ZC sequence | 1 dB |
| 3 | 8.5% | QPSK-modulated pseudorandom sequence | 1.5 dB |

TABLE 13

| Implicit relationship (III) among quality parameters | | | |
|---|---|---|---|
| Maximum transmission power adjustment level indicator | EVM of transmission signal | Reference signal sequence | Maximum transmission power adjustment value |
| A | 5% | Power-boosted ZC sequence | 0.5 dB |
| B | 7% | Zero-inserted ZC sequence | 1 dB |
| C | 8.5% | QPSK-modulated pseudorandom sequence | 1.5 dB |

TABLE 14

| Implicit relationship (IV) among quality parameters | | | |
|---|---|---|---|
| power adjustment parametor indicator | EVM of transmission signal | Reference signal sequence | Group number of power adjustment parametor |
| 2 | 5% | Power-boosted ZC sequence | 2 |
| 3 | 7% | Zero-inserted ZC sequence | 3 |
| 4 | 8.5% | QPSK-modulated pseudorandom sequence | 4 |

The terminal determines the reference signal type and transmission power according to the acquired configuration parameters. Particularly, the terminal obtains the reference signal sequence indicator and power adjustment level indicator explicitly or implicitly or by the preset value. Further, the reference signal sequence indicator will be used to design the transmitted reference signals; and the power adjustment level indicator will be used to calculate the transmission power.

One particular implementation of the time-frequency resource pattern indicator being used to design a time-frequency resource pattern of the transmitted reference signal can be that one or more reference symbols are located at the start position in a transmission occasion slot, and the subcarriers occupied by the reference symbols are continuous in frequency domain, as shown in FIG. 2.

FIG. 5 illustrates a time-frequency resource pattern according to an embodiment of the present disclosure.

The terminal uses the time-frequency resource pattern of the reference signal shown in FIG. 5, so that the base station can use the reference symbols in the start position to acquire the nonlinear distortion experienced by the signal in the current transmission occasion slot, and data symbols subsequently transmitted are processed in real time, and the reference symbol subcarriers occupy the entire bandwidth, so that the nonlinear distortion on the entire symbol can be more accurately estimated.

One particular implementation of the time-frequency resource pattern indicator being used to design a time-frequency resource pattern of the transmitted reference signal can be that one or more reference symbols are located at the middle position in a transmission occasion slot, and the subcarriers occupied by the reference symbols are continuous in frequency domain, as shown in FIG. 3.

FIG. 6 illustrates a time-frequency resource pattern according to an embodiment of the present disclosure.

The terminal uses the time-frequency resource pattern of the reference signal shown in FIG. 6, so that the base station can use the reference symbols in the middle position in the transmission occasion slot to acquire the nonlinear distortion experienced by the signal in the current transmission occasion slot. In the case of no needing to process data in real time, processing can be performed after one complete transmission occasion slot is received. Comparing being in the middle position with being in the start position in the transmission occasion slot, the nonlinear distortion experienced by the signal acquired by the reference symbol is closer to the real situation of the data. The reference symbol subcarriers occupy the entire bandwidth, so that the nonlinear distortion on the entire symbol can be more accurately estimated.

One particular implementation of the time-frequency resource pattern indicator being used to design a time-frequency resource pattern of the transmitted reference signal can be that one or more reference symbols are located separated at the start and middle positions in a transmission occasion slot, and the subcarriers occupied by the reference symbols are continuous in frequency domain, as shown in FIG. 4.

FIG. 7 illustrates a time-frequency resource pattern according to an embodiment of the present disclosure.

The terminal uses the time-frequency resource pattern of the reference signal shown in FIG. 7, which is suitable for a case where the nonlinear distortion of the signal changes rapidly. By increasing the density of the reference symbols in one time slot interval, the reference symbols can more accurately reflect the time-varying situation of the nonlinear distortion of the signal, thereby increasing the reliability of data estimation. The reference symbol subcarriers occupy the entire bandwidth, so that the nonlinear distortion on the entire symbol can be more accurately estimated.

One particular implementation of the time-frequency resource pattern indicator being used to design a time-frequency resource pattern of the transmitted reference signal can be that one or more reference symbols are located at the start position in a transmission occasion slot, and the subcarriers occupied by the reference symbols are discrete in frequency domain, as shown in FIG. 5.

FIG. 8 illustrates a time-frequency resource pattern according to an embodiment of the present disclosure.

The terminal uses the time-frequency resource pattern of the reference signal shown in FIG. 8, which is suitable for a case where the nonlinear distortion of the signal changes slowly, and the base station can use the reference symbols in the start position to acquire the nonlinear distortion experienced by the signal in the current transmission occasion slot, and the data symbols subsequently transmitted are processed in real time. The subcarriers of the reference symbols are discontinuous in frequency domain, and the terminal can transmit more data signals within the bandwidth, thus improving the bandwidth utilization.

One particular implementation of the time-frequency resource pattern indicator being used to design a time-frequency resource pattern of the transmitted reference signal can be that one or more reference symbols are located at the middle position in a transmission occasion slot, and the subcarriers occupied by the reference symbols are discrete in frequency domain, as shown in FIG. 6.

FIG. 9 illustrates a time-frequency resource pattern according to an embodiment of the present disclosure.

The terminal uses the time-frequency resource pattern of the reference signal shown in FIG. 9, so that the base station can use the reference symbols in the middle position in the transmission occasion slot to acquire the nonlinear distortion experienced by the signal in the current transmission occasion slot. In the case of no needing to process data in real time, processing can be performed after one complete transmission occasion slot is received. Comparing being in the middle position with being in the start position in the transmission occasion slot, the nonlinear distortion experienced by the signal acquired by the reference symbol is closer to the real situation of the data. Moreover, the subcarriers of the reference symbols in the frequency domain are discontinuous, so the terminal can transmit more data signals in the bandwidth to improve the bandwidth utilization.

One particular implementation of the time-frequency resource pattern indicator being used to design a time-frequency resource pattern of the transmitted reference signal can be that one or more reference symbols are located separated at the start and middle positions in a transmission occasion slot, and the subcarriers occupied by the reference symbols are discrete in frequency domain, as shown in FIG. 7.

FIG. 10 illustrates a time-frequency resource pattern according to an embodiment of the present disclosure.

The terminal uses the time-frequency resource pattern of the reference signal shown in FIG. 10, which is suitable for a case where the nonlinear distortion of the signal changes rapidly. By increasing the density of the reference symbols in one time slot interval, the reference symbols can more accurately reflect the time-varying situation of the nonlinear distortion of the signal, thereby increasing the reliability of data estimation. The subcarriers of the reference symbols are discontinuous in frequency domain, and the terminal can transmit more data signals within the bandwidth, thus improving the bandwidth utilization.

One particular embodiment of the reference signal sequence indicator being used to design a transmitted reference signal sequence can be that when the terminal is configured to use the power-boosted ZC sequence as the reference signal sequence, the used ZC sequence is generated by the following formula:

$$\bar{r}_{u,v}(n) = x_q(n \bmod N_{ZC})$$

$$x_q(m) = e^{-j\frac{\pi q m(m+1)}{N_{ZC}}}$$

$$\text{where } q = \lfloor \bar{q} + 1/2 \rfloor + v \cdot (-1)^{\lfloor 2\bar{q} \rfloor}$$

$$\bar{q} = N_{ZC} \cdot (u+1)/31$$

Where u is a sequence group number, v is a sequence number, $N_{ZC}$ is the length of the ZC sequence, $0 \le n \le M_{ZC}-1$ and $M_{ZC}$ is the length of the reference signal sequence. The power boost of several dBs for the generated sequence is used, and the obtained reference signal sequence especially adapts to a case where the terminal transmits the data undergoing transform precoding. Preferably, the value of power boost can be 3 dBs. A reference signal sequence with a higher PAPR can be obtained using such design, so that the reference signal sequence and the transmitted data have similar signal transmission quality.

One particular embodiment of the reference signal sequence indicator being used to design a transmitted reference signal sequence can be that when the terminal is configured to use a zero-inserted ZC sequence as the reference signal sequence, the used ZC sequence is generated by the following formula:

$$\bar{r}_{u,v}(n) = x_q(n \bmod N_{ZC})$$

$$x_q(m) = e^{-j \frac{\pi q m (m+1)}{N_{ZC}}}$$

$$\text{where } q = \lfloor \bar{q} + 1/2 \rfloor + v \cdot (-1)^{\lfloor 2\bar{q} \rfloor}$$

$$\bar{q} = N_{ZC} \cdot (u+1)/31$$

Where u is a sequence group number, v is a sequence number, $N_{ZC}$ is the length of the ZC sequence, $0 \le n \le M_{ZC}-1$ and $M_{ZC}$ is the length of the reference signal sequence.

The zero-inserted sequence is further obtained by the generated ZC sequence $\bar{r}_{u,v}(n)$, and the method can be as shown in the figure below:

$$\bar{r}_{u,v}(0), \bar{r}_{u,v}(1), \ldots, \bar{r}_{u,v}(a-1), 0, 0, \ldots, 0, \bar{r}_{u,v}(a), \bar{r}_{u,v}(a+1), \ldots$$

One of its characteristics is that one or more zeros are inserted into the generated ZC sequence, wherein the position in which the zero is inserted and the number of the inserted zeros can be determined by a particular application scenario. Preferably, the obtained sequence is suitable for the case where the terminal transmits the data undergoing transform precoding. A reference signal sequence with a higher PAPR can be obtained using such design, so that the reference signal sequence and the transmitted data have similar signal transmission quality.

One particular embodiment of the reference signal sequence indicator being used to design a transmitted reference signal sequence can be that when the terminal is configured to use a scrambled ZC sequence as the reference signal sequence, the used ZC sequence is generated by the following formula:

$$\bar{r}_{u,v}(n) = x_q(n \bmod N_{ZC})$$

$$x_q(m) = e^{-j \frac{\pi q m (m+1)}{N_{ZC}}}$$

$$\text{where}$$

$$q = \lfloor \bar{q} + 1/2 \rfloor + v \cdot (-1)^{\lfloor 2\bar{q} \rfloor}$$

$$\bar{q} = N_{ZC} \cdot (u+1)/31$$

Where u is a sequence group number, v is a sequence number, $N_{ZC}$ is the length of the ZC sequence, $0 \le n \le M_{ZC}-1$ and $M_{ZC}$ is the length of the reference signal sequence.

The scrambled sequence $r_{RS}(n)$ is further obtained by the generated ZC sequence, wherein the method for scrambling the ZC sequence is shown as follows:

$$r_{RS}(n) = \bar{r}_{u,v}(n) * (1 - 2c(n)) \text{ or } r_{RS}(n) = \bar{r}_{u,v}(n) * (2c(n) - 1)$$

Where c(n) is the scrambling sequence. For example, it can be determined in a manner as specified in 3GPP TS38.211. Preferably, the obtained sequence is suitable for the case where the terminal transmits data undergoing transform precoding. A reference signal sequence with a higher PAPR can be obtained using such design, so that the reference signal sequence and the transmitted data have similar signal transmission quality.

One particular embodiment of the reference signal sequence indicator being used to design a transmitted reference signal sequence can be that when the terminal is configured to use a pseudo-random sequence modulated by QPSK as the reference signal sequence, the used reference signal sequence is generated by the following formula:

$$r(n) = \frac{1}{\sqrt{2}}(1 - 2 \cdot c(2n)) + j \frac{1}{\sqrt{2}}(1 - 2 \cdot c(2n+1))$$

Where c(n) is the pseudo-random sequence. For example, it can be determined in a manner as specified in 3GPP TS38.211. Preferably, the obtained sequence is suitable for the case where the terminal transmits data not undergoing transform precoding. A reference signal sequence with a higher PAPR can be obtained using such design, so that the reference signal sequence and the transmitted data have similar signal transmission quality.

One particular embodiment of the reference signal sequence indicator being used to design a transmitted reference signal sequence can be that when the terminal is configured to use a 256QAM-modulated pseudorandom sequence as the reference signal sequence, the used ZC sequence is generated by the following formula:

$$r(n) = \frac{1}{\sqrt{2}}(1 - 2 \cdot c(2n)) + j \frac{1}{\sqrt{2}}(1 - 2 \cdot c(2n+1))$$

Where c(n) is the pseudo-random sequence. For example, it can be determined in a manner as specified in 3GPP TS38.211. Preferably, the obtained sequence is suitable for the case where the terminal transmits data not undergoing transform precoding. A reference signal sequence with a higher PAPR can be obtained using such design, so that the reference signal sequence and the transmitted data have similar signal transmission quality.

One of the particular implementation of the power adjustment level indicator being used to calculate the transmission power can be that, when the power adjustment level indicator acquired by the terminal is the maximum transmission power adjustment level indicator, the terminal finds a corresponding adjustment value δ according to the corresponding relationship of the maximum transmission power adjustment level indicator, and when the transmission power $p_{PUSCH,b,f,c}(i,j,q_d,l)$ of the current physical uplink shared channel is calculated, the following formula is used:

$$P_{PUSCH,b,f,c}(i, j, q_d, l) =$$

$$\min\left\{ \begin{array}{c} P_{CMAX,f,c}(i) + \delta, \\ P_{O\_PUSCH,b,f,c}(j) + 10\log_{10}\left(2^{\mu} \cdot M_{RB,b,f,c}^{PUSCH}(i)\right) + \alpha_{b,f,c}(j) \cdot \\ PL_{b,f,c}(q_d) + \Delta_{TF,b,f,c}(i) + f_{b,f,c}(i, l) \end{array} \right\}$$

[dBm]
where, $P_{CMAX,f,c}(i)$ is the configured maximum output power for carrier f of serving cell c in the PUSCH transmission occasion i.

$P_{O\_PUSCH,b,f,c}(j)$ is an open-loop power parameter. For example, it can be determined in a manner as specified in 3GPP TS 38.213.

$$M_{RB,b,f,c}^{PUSCH}(i)$$

is a bandwidth of the PUSCH for PUSCH transmission occasion i on partial bandwidth b of carrier f of serving cell c, with the unit of RB. It is to be noted that the sub-carrier spacing is μ.

$\alpha_{b,f,c}(j)$ is a adjustment value related to pathloss, for PUSCH transmission occasion i on partial bandwidth b of carrier f of serving cell c, parameter set configuration index j.

$PL_{b,f,c}(q_d)$ is a pathloss related parameter. For example, it can be determined in a manner as specified in 3GPP TS 38.213.

$\Delta_{TF,b,f,c}(i)$ is a PUSCH transmission power adjustment parameters related to modulation coding strategy on partial bandwidth b of carrier f of serving cell c in the PUCCH transmission occasion i. For example, it can be determined in a manner as specified in 3GPP TS 38.213.

$f_{b,f,c}(i,l)$ is a closed-loop power parameter. For example, it can be determined in a manner as specified in 3GPP TS38.213.

One of the particular implementation of the power adjustment level indicator being used to calculate the transmission power can be that, when the power adjustment level indicator acquired by the terminal is the transmission power adjustment level indicator, the terminal finds a corresponding adjustment value 3 according to the corresponding relationship of the transmission power adjustment level indicator, and when the power headroom of the current actual PUSCH channel is calculated, the following formula is used:

$$PH_{Type1,b,f,c}(i, j, q_d, l) =$$

$$P_{CMAX,f,c}(i) - \left\{ P_{O\_PUSCH,b,f,c}(j) + 10\log_{10}\left(2^{\mu} \cdot M_{RB,b,f,c}^{PUSCH}(i)\right) + \right.$$

$$\left. \alpha_{b,f,c}(j) \cdot PL_{b,f,c}(q_d) + \Delta_{TF,b,f,c}(i) + f_{b,f,c}(i, l) \right\} + \delta$$

[dBm}
where, $P_{CMAX,f,c}(i)$ is the configured maximum output power for carrier f of serving cell c in the PUSCH transmission occasion i.

$P_{O\_PUSCH,b,f,c}(j)$ is an open-loop power parameter. For example, it can be determined in a manner as specified in 3GPP TS 38.213.

$$M_{RB,b,f,c}^{PUSCH}(i)$$

is a bandwidth of the PUSCH for PUSCH transmission occasion i on partial bandwidth b of carrier f of serving cell c, with the unit of RB. It is to be noted that the sub-carrier spacing is μ.

$\alpha_{b,f,c}(j)$ is a adjustment value related to pathloss, for PUSCH transmission occasion i on partial bandwidth b of carrier f of serving cell c, parameter set configuration index j.

$PL_{b,f,c}(q_d)$ is a pathloss related parameter. For example, it can be determined in a manner as specified in 3GPP TS 38.213.

$\Delta_{TF,b,f,c}(i)$ is a PUSCH transmit power adjustment parameters related to modulation coding strategy on partial bandwidth b of carrier f of serving cell c in the PUCCH transmission occasion i. For example, it can be determined in a manner as specified in 3GPP TS 38.213.

$f_{b,f,c}(i,l)$ is a closed-loop power parameter. For example, it can be determined in a manner as specified in 3GPP TS38.213.

The terminal calculates the transmission power by using the received Transmission Power Control Command (TPC) configured by the base station according to the power headroom.

One of the particular implementation of the power adjustment level indicator being used to calculate the transmission power can be that, when the power adjustment level indicator acquired by the terminal is the transmission power adjustment level indicator, the terminal finds a corresponding adjustment value δ according to the corresponding relationship of the transmission power adjustment level indicator, and when the transmission power $P_{PUSCH,b,f,c}(i,j, q_d,l)$ of the current uplink shared channel is calculated, the following formula is used:

$$P_{PUSCH,b,f,c}(i, j, q_d, l) =$$

$$\min\left\{ \begin{array}{c} P_{CMAX,f,c}(i), \\ P_{O\_PUSCH,b,f,c}(j) + 10\log_{10}\left(2^{\mu} \cdot M_{RB,b,f,c}^{PUSCH}(i)\right) + \alpha_{b,f,c}(j) \cdot \\ PL_{b,f,c}(q_d) + \Delta_{TF,b,f,c}(i) + f_{b,f,c}(i, l) + \delta \end{array} \right\}$$

[dBm]
where, $P_{CMAX,f,c}(i)$ is the configured maximum output power for carrier f of serving cell c in the PUSCH transmission occasion i.

$P_{O\_PUSCH,b,f,c}(j)$ is an open-loop power parameter. For example, it can be determined in a manner as specified in 3GPP TS 38.213.

$$M_{RB,b,f,c}^{PUSCH}(i)$$

is a bandwidth of the PUSCH for PUSCH transmission occasion i on partial bandwidth b of carrier f of serving cell c, with the unit of RB. It is to be noted that the sub-carrier spacing is μ.

$\alpha_{b,f,c}(j)$ is a adjustment value related to pathloss, for PUCCH transmission occasion i on partial bandwidth b of carrier f of serving cell c, parameter set configuration index j.

$PL_{b,f,c}(q_d)$ sis a pathloss related parameter. For example, it can be determined in a manner as specified in 3GPP TS 38.213.

$\Delta_{TF,b,f,c}(i)$ is a PUSCH transmit power adjustment parameters related to modulation coding strategy on partial bandwidth b of carrier f of serving cell c in the PUCCH transmission occasion i. For example, it can be determined in a manner as specified in 3GPP TS 38.213.

$f_{b,f,c}(i,l)$ is a closed-loop power parameter. For example, it can be determined in a manner as specified in 3GPP TS38.213.

A particular implementation for the power adjustment parameter indicator to calculate the maximum transmission power may be that when the power adjustment parameter indicator is 1, it means that the terminal is required to use the particular modulation mode for transmission when satisfying the preset signal transmission quality requirement. The terminal calculates the maximum uplink transmission power in a preset manner. When the power adjustment parameter indicator is greater than 1, it means that the terminal is required to use the particular modulation mode for transmission without satisfying the preset signal transmission quality requirement. The terminal calculates the maximum uplink transmission power according to the configured power adjustment parameters.

Let $P_{CMAX,f,c}$ be the carrier f of the serving cell c, the maximum output power of the terminal in each time slot of PUSCH is set within two bounds: $P_{CMAX\_L,f,c} \leq P_{CMAX,f,c} \leq P_{CMAX\_H,f,c}$, where formulas for calculating the upper bound $P_{CMAX\_L,f,c}$ and the lower bound $P_{CMAX\_H,f,c}$ are respectively:

$$P_{CMAX\_L,f,c} = \text{MIN}\{P_{EMAX,c} - \Delta T_{C,c},$$

$$(P_{PowerClass} - \Delta P_{PowerClass} - \text{MAX}(\text{MAX}(MPR_c + \Delta MPR_c, A-MPR_c) +$$

$$\Delta T_{IB,c} + \Delta T_{C,c} + \Delta T_{RxSRS}, P-MPR_c)\}$$

$$P_{CMAX\_H,f,c} = \text{MIN}\{P_{EMAX,c}, P_{Powerlass} - \Delta P_{PowerClass}\}$$

where, $P_{EMAX,c}$ is the maximum allowable transmission power determined by the terminal in the serving cell c according to the received downlink indicator configuration;

$P_{PowerClass}$ is the maximum power corresponding to the terminal power class without taking into account the tolerance;

$\Delta P_{PowerClass}$ is the maximum power offset corresponding to the terminal power class;

$\Delta T_{IB,c}$ is the additional tolerance related to carrier aggregation or band combinations in the serving cell c;

$\Delta T_{C,c}$ is the tolerance related to the transmission frequency band and transmission bandwidth in the serving cell c;

$MPR_c$ is the maximum output power rollback value related to the high-order modulation mode and transmission bandwidth configuration in the serving cell c;

$A-MPR_c$ is the additional maximum output power rollback value related to the additional transmission requirements in the serving cell c;

$\Delta MRP_C$ is the offset of the maximum output power rollback value related to the relative channel bandwidth in the serving cell c;

$\Delta T_{RxSRS}$ is the power offset related to SRS transmission;

$P-MPR_c$ is the power management maximum power rollback value related to the electromagnetic energy absorption in the serving cell c;

When the power adjustment parameter indicates 1, the terminal calculates the maximum transmission power in a preset manner. The MPR, $P_{EMAX}$ and $\Delta P_{PowerClass}$ are obtained in a preset manner.

When the power adjustment parameter does not indicate 1, the MPR, PEM and $\Delta P_{PowerClass}$ used by the terminal to calculate the maximum transmission power are obtained according to the related parameters determined by the configured power adjustment parameter indicator.

Preferably, the particular implementation for obtaining the MPR may be to determine the corresponding MPR value according to the power adjustment parameter indicator. For example, when the power adjustment parameter indicates 1, under certain conditions, the value of MPR is $X_1$ dB. Wherein, the certain conditions include a specific modulation mode and/or a specific transmission bandwidth configuration. When the power adjustment parameter indicates 2, under certain conditions, the value of MPR is $X_2$ dB; when the power adjustment parameter indicates 3, under certain conditions, the value of MPR is $X_3$ dB. Preferably, $X_1$ is the default MPR value obtained in a preset manner.

Preferably, the particular implementation for obtaining the MPR can also be to select the corresponding MPR offset for calculation according to the power adjustment parameter indicator, and the specific calculation method is the sum of the MPR offset and the default MPR value. For example, when the power adjustment parameter indicates 1, under certain conditions, the MPR offset is $\Delta X_1$ dB, and the value of MPR at this time is $(X_1+\Delta X_1)$ dB, where $X_1$ is the default MPR value obtained in a preset manner; when the power adjustment parameter indicates 2, under certain conditions, the MPR offset is $\Delta X_2$ dB, and the value of MPR at this time is $(X_1+\Delta X_2)$ dB; when the power adjustment parameter indicates 3, under certain conditions, the MPR offset is $\Delta X_3$ dB, and the value of MPR at this time is $(X_1+\Delta X_3)$ dB. Preferably, $\Delta X_1$ is 0 dB, $\Delta X_2$ and $\Delta X_3$ are negative values.

Preferably, the particular implementation for obtaining $P_{EMAX}$ may also be to select the corresponding received configured maximum transmission power offset for calculation according to the power adjustment parameter indicator, and the specific calculation method is the sum of the received configured maximum transmission power offset and the received configured maximum transmission power value. For example, when the power adjustment parameter indicates 1, $P_{EMAX}$ is added by $\Delta Y_1$ dB for a specific terminal. Preferably, the specific terminal has a specific power class. Preferably, the specific terminal has a specific bandwidth and/or a specific modulation mode. When the power adjustment parameter indicates 2, $P_{EMAX}$ is added by $\Delta Y_2$ dB for a specific terminal. When the power adjustment parameter indicates 3, $P_{EMAX}$ is added by $\Delta Y_3$ dB for a specific terminal. Preferably, $\Delta Y_1$ is 0 dB, and $\Delta Y_2$ and $\Delta Y_3$ are positive values.

Preferably, the particular implementation for obtaining $\Delta P_{PowerClass}$ can also be to determine the corresponding value of $\Delta P_{PowerClass}$ according to the power adjustment parameter indicator. For example, when the power adjustment parameter indicates 1, for a specific terminal, $\Delta P_{PowerClass} = \Delta Z_1$ dB. Preferably, the specific terminal has a specific power class. Preferably, the specific terminal has a specific bandwidth and/or a specific modulation mode. When the power adjustment parameter indicates 2, for a specific terminal, $\Delta P_{PowerClass}=\Delta Z_2$ dB. When the power adjustment parameter indicates 3, for a specific terminal, $\Delta P_{PowerClass}=\Delta Z_3$ dB. Preferably, $\Delta Z_1$ is 0 dB, and $\Delta Z_2$ and $\Delta Z_3$ are negative values.

Preferably, one particular implementation of the power adjustment parameter indicator being used to calculate the maximum transmission power can also be that the terminal obtains the value of $\Delta T_E$ and calculates the maximum uplink transmission power.

Preferably, a formula for calculating the maximum uplink transmission power can be that:

$$P_{CMAX\_L,f,c} =$$
$$\mathrm{MIN}\{P_{EMAX,c} - \Delta T_{C,c}, (P_{PowerClass} - \Delta P_{PowerClass} - \mathrm{MAX}(\mathrm{MAX}(MPR_c +$$
$$\Delta MPR_c, A-MPR_c) + \Delta T_{IB,c} + \Delta T_{C,c} + \Delta T_{RxSRS}, P-MPR_c)\} + \Delta T_E$$
$$P_{CMAX\_H,f,c} = \mathrm{MIN}\{P_{EMAX,c}, P_{Powerlass} - \Delta P_{PowerClass}\}$$

Preferably, a formula for calculating the maximum uplink transmission power can also be that:

$$P_{CMAX\_L,f,c} = \mathrm{MIN}\{P_{EMAX,c} - \Delta T_{C,c},$$
$$(P_{PowerClass} - \Delta P_{PowerClass} - \mathrm{MAX}(\mathrm{MAX}(MPR_c + \Delta MPR_c, A-MPR_c) +$$
$$\Delta T_{IB,c} + \Delta T_{C,c} + \Delta T_{RxSRS}, P-MPR_c)\}$$
$$P_{CMAX\_H,f,c} = \mathrm{MIN}\{P_{EMAX,c}, P_{Powerlass} - \Delta P_{PowerClass}\} + \Delta T_E$$

Preferably, a formula for calculating the maximum uplink transmission power can also be that:

$$P_{CMAX\_L,f,c} =$$
$$\mathrm{MIN}\{P_{EMAX,c} - \Delta T_{C,c}, (P_{PowerClass} - \Delta P_{PowerClass} - \mathrm{MAX}(\mathrm{MAX}(MPR_c +$$
$$\Delta MPR_c, A-MPR_c) + \Delta T_{IB,c} + \Delta T_{C,c} + \Delta T_{RxSRS}, P-MPR_c)\} + \Delta T_E$$
$$P_{CMAX\_H,f,c} = \mathrm{MIN}\{P_{EMAX,c}, P_{Powerlass} - \Delta P_{PowerClass}\} + \Delta T_E$$

where:

$P_{EMAX,c}$ is the maximum allowable transmission power determined by the terminal in the serving cell c according to the received downlink indicator configuration;

$P_{PowerClass}$ is the maximum power corresponding to the terminal power class without taking into account the tolerance;

$\Delta P_{PowerClass}$ is the maximum power offset corresponding to the terminal power class;

$\Delta T_{IB,c}$ is the additional tolerance related to carrier aggregation or band combinations in the serving cell c;

$\Delta T_{C,c}$ is the tolerance related to the transmission frequency band and transmission bandwidth in the serving cell c;

$MPR_c$ is the maximum output power rollback value related to the high-order modulation mode and transmission bandwidth configuration in the serving cell c;

$A-MPR_c$ is the additional maximum output power rollback value related to the additional transmission requirements in the serving cell c;

$\Delta MRP_c$ is the offset of the maximum output power rollback value related to the relative channel bandwidth in the serving cell c;

$\Delta T_{RxSRS}$ is the power offset related to SRS transmission;

$P-MPR_c$ is the maximum power rollback value for power management related to the electromagnetic energy absorption in the serving cell c. Preferably, the particular implementation for obtaining $\Delta T_E$ may be to determine the corresponding value of $\Delta T_E$ according to the power adjustment parameter indicator. For example, when the power adjustment parameter indicates 1, $\Delta T_E=\Delta V_1$ dB; when the power adjustment parameter indicates 2, $\Delta T_E=\Delta V_2$ dB; when the power adjustment parameter indicates 3, $\Delta T_E=\Delta V_3$ dB. Preferably, $\Delta V_1$ is 0 dB, and $\Delta V_2$ and $\Delta V_3$ are positive values.

Preferably, the manner of the terminal obtaining the maximum output power rollback (MPR) value (or MPR offset) of the power adjustment parameter may be explicit or implicit. For example, a particular implementation for explicitly obtaining the power adjustment parameter may be to directly obtain the power adjustment parameter according to the power adjustment parameter indicator. A particular implementation for implicitly obtaining the power adjustment parameter may be that the terminal obtains the received configured maximum transmission power offset and/or the maximum power offset $\Delta P_{PowerClass}$ corresponding to the power class, and the maximum output power rollback (MPR) value (or MPR offset) is associated with the received configured maximum transmission power offset and/or the maximum power offset $\Delta P_{PowerClass}$ corresponding to the power class. A particular implementation for implicitly obtaining the power adjustment parameter may also be that the terminal adopts a preset value.

Preferably, the manner of the terminal obtaining the received configured maximum transmission power offset of the power adjustment parameter may be explicit or implicit. For example, a particular implementation for explicitly obtaining the power adjustment parameter may be to directly obtain the power adjustment parameter according to the power adjustment parameter indicator. A particular implementation for implicitly obtaining the power adjustment parameter may be that the terminal obtains the maximum output power rollback (MPR) value (or MPR offset) and/or the maximum power offset $\Delta P_{PowerClass}$ corresponding to the power class, and the received configured maximum transmission power offset is associated with the maximum output power rollback (MPR) value (or MPR offset) and/or the maximum power offset $\Delta P_{PowerClass}$ corresponding to the power class. A particular implementation for implicitly obtaining the power adjustment parameter may also be that the terminal adopts a preset value.

Preferably, the manner of the terminal obtaining the maximum power offset $\Delta P_{PowerClass}$ corresponding to the power class of the power adjustment parameter may be explicit or implicit. For example, a particular implementation for explicitly obtaining the power adjustment parameter may be to directly obtain the power adjustment parameter according to the power adjustment parameter indicator. A particular implementation for implicitly obtaining the power adjustment parameter may be that the terminal obtains the maximum output power rollback (MPR) value (or MPR offset) and/or the received configured maximum transmission power offset, and the maximum power offset corresponding to the power class is associated with the maximum output power rollback (MPR) value (or MPR offset) and/or the received configured maximum transmission power offset. A particular implementation for implicitly obtaining the power adjustment parameter may also be that the terminal adopts a preset value.

Preferably, the correlation between the maximum power offset corresponding to the power class and the received configured maximum transmission power offset is: the sum of the maximum power offset corresponding to the power class and the received configured maximum transmission power offset is zero. For example, when the power adjustment parameter indicates 1, for a specific terminal, $P_{EMAX}$ increases by $\Delta Y_1$ dB, $\Delta P_{PowerClass}=\Delta Z_1$ dB, and $\Delta Y_1+\Delta Z_1=0$; when the power adjustment parameter indicates 2, $P_{EMAX}$ increases by $\Delta Y_2$ dB, $\Delta P_{PowerClass}=\Delta Z_2$ dB, and $\Delta Y_2+\Delta Z_2=0$; when the power adjustment parameter indicates 3, $P_{EMAX}$ increases by $\Delta Y_3$ dB, $\Delta P_{PowerClass}=\Delta Z_3$ dB, and $\Delta Y_3+\Delta Z_3=0$.

Preferably, the terminal determines the power headroom report value according to the power adjustment parameter indicator.

Specifically, let $PH_{type1,b,f,c}(i,j,q_d,l)$ be the power headroom report value for transmission on real PUSCH at occasion i on active uplink partial bandwidth b of carrier f of serving cell c, and its calculation formula is:

$$PH_{type1,b,f,c}(i, j, q_d, l) =$$
$$P_{CMAX,f,c}(i) - \{P_{O\_PUSCH,b,f,c}(j) + 10\log_{10}\left(2^\mu \cdot M_{RB,b,f,c}^{PUSCH}(i)\right) +$$
$$\alpha_{b,f,c}(j) \cdot PL_{b,f,c}(q_d) + \Delta_{TF,b,f,c}(i) + f_{b,f,c}(i, l)\}$$

[dBm]

where, $P_{CMAX,f,c}(i)$ is the configured maximum output power for carrier f of serving cell c in the PUSCH transmission occasion i.

$P_{O\_PUSCH,b,f,c}(j)$ is an open-loop power parameter. For example, it can be determined in a manner as specified in 3GPP TS 38.213.

$$M_{RB,b,f,c}^{PUSCH}(i)$$

is a bandwidth of the PUSCH for PUSCH transmission occasion i on partial bandwidth b of carrier f of serving cell c, with the unit of RB. It is to be noted that the sub-carrier spacing is $\mu$.

$\alpha_{b,f,c}(j)$ is a adjustment value related to pathloss, for PUSCH transmission occasion i on partial bandwidth b of carrier f of serving cell c, parameter set configuration index j.

$PL_{b,f,c}(q_d)$ is a pathloss related parameter. For example, it can be determined in a manner as specified in 3GPP TS 38.213.

$\Delta_{TF,b,f,c}(i)$ is a PUSCH transmission power adjustment parameters related to modulation coding strategy on partial bandwidth b of carrier f of serving cell c in the PUCCH transmission occasion i. For example, it can be determined in a manner as specified in 3GPP TS 38.213.

$f_{b,f,c}(i)$ is a closed-loop power parameter. For example, it can be determined in a manner as specified in 3GPP TS38.213.

When the power adjustment parameter indicates 1, the terminal is required to use a specific modulation mode for transmission while satisfying the preset signal transmission quality requirement, and the terminal calculates the power headroom in a preset manner, wherein $P_{CMAX,f,c}(i)$ is obtained in a preset manner.

When the power adjustment parameter indicator is greater than 1, the terminal is required to use a specific modulation mode for transmission without satisfying the preset signal transmission quality requirements, and a particular implementation for the terminal to calculate the power headroom may be that the terminal calculates according to the parameters determined by the power adjustment parameter indicator, wherein $P_{CMAX,f,c}(i)$ is the maximum uplink transmission power calculated by the terminal according to the configured power adjustment parameter. Preferably, the terminal marks the calculation result as the power headroom calculated according to the power adjustment parameter indicator; and/or, the terminal calculates the power headroom in a preset manner, wherein $P_{CMAX,f,c}(i)$ is obtained in a preset manner, and meanwhile the calculation result is marked as the power headroom obtained in a preset manner.

In step 403, the terminal performs uplink signal transmission according to configuration parameters.

Particularly, the terminal performs uplink signal transmission with the determined reference signal type and transmission power.

Preferably, the terminal will trigger the reporting of the power headroom under certain conditions. The specific condition may be that the terminal receives at least one of the configuration parameters in step 402.

Particularly, when the configuration parameters include a power headroom report indicator, the terminal selects the content of the power headroom report according to the power headroom report indicator. Preferably, the selected content includes to select to report the power headroom calculated in a preset manner and/or the power headroom calculated in a non-preset manner according to the power headroom report indicator. Wherein, the non-preset manner includes at least one of the following: the power headroom calculated according to the power adjustment level indicator, and the power headroom calculated according to the power adjustment parameter indicator.

When the configuration parameters does not include the power headroom report indicator, the terminal reports the power headroom according to the transmission requirements. Particularly, when the terminal is required to use a specific modulation mode for transmission while satisfying the preset signal transmission quality requirement, a particular implementation for the terminal to report the power headroom can be to report a set of power headroom calculated in the preset manner. When the terminal is required to use a specific modulation mode for transmission without satisfying the preset signal transmission quality requirement, the particular implementation for the terminal to report the power headroom may be to report the power headroom calculated according to the power adjustment parameter indicator. Preferably, the terminal marks the calculation result as the power headroom calculated according to the power adjustment parameter indicator; and/or, the terminal reports the power headroom calculated in the preset manner, and meanwhile marks the calculation result as the power headroom calculated in the preset manner. Wherein, the manner of the terminal obtaining the power adjustment parameter indicator is to obtain explicitly or implicitly according to the configuration parameter described in step 402.

FIG. 11 illustrates a flowchart of a method for uplink signal reception in a wireless communication system according to an embodiment of the present disclosure.

Step 1101: a base station receives parameters of signal transmission quality in a particular modulation mode from a terminal.

The base station receives the parameters of the signal transmission quality in the particular modulation mode from the terminal, and analyzes to obtain a transmission capability indicator of the terminal. The parameters of the signal transmission quality including at least one of:

A first quality parameter: used to indicate whether a terminal has the capability to transmit a signal that does not satisfy the preset signal transmission quality requirement in the particular modulation mode, to facilitate the base station to decide whether to schedule the particular modulation mode for transmission according to the capability indicator.

If the first quality parameter indicator information represents that the terminal does not have the capability to transmit the signal that does not satisfy the preset signal transmission quality requirement in the particular modulation mode, the base station decides not to schedule the particular modulation mode for transmission.

If the first quality parameter indicator information indicates that the terminal has the capability to transmit the signal that does not satisfy the preset signal transmission quality requirement in the particular modulation mode, the base station can schedule the particular modulation mode for transmission.

A second quality parameter: used to indicate signal transmission quality level(s) that the terminal can support. Further, the signal transmission quality level indicator can represent the signal transmission quality level(s) that can be supported in the particular modulation mode. The base station configures the transmission quality of the signal in the particular modulation mode according to the signal transmission quality level indicator.

Optionally, the base station determines the transmission quality of the signal according to the signal transmission quality level indicator shown in Table 1.

A third quality parameter: used to indicate reference signal type(s) that the terminal can support. Further, the reference signal type indicators can indicate the reference signal type(s) that can be supported in the particular modulation mode, and at least include a time-frequency resource pattern indicator and/or a reference signal sequence indicator, etc. The base station configures different reference signal types according to the signal transmission quality level indicators.

Optionally, the base station configures a time-frequency resource pattern according to the time-frequency resource pattern indicator of the reference signal as shown in Table 2, and configures a reference signal sequence according to the reference signal sequence indicator as shown in Table 3.

A fourth quality parameter: used to indicate uplink power adjustment level(s) that the terminal can support. Further, the signal transmission quality level indicator can represent uplink power adjustment level(s) that can be supported in the particular modulation mode. Particularly, the uplink power adjustment level indicator is used to represent adjustment value(s) of the maximum uplink transmission power and/or uplink Power Headroom (PH) and/or uplink transmission power of the terminal. The base station configures the maximum uplink transmission power and/or uplink transmission power in the particular modulation mode according to the uplink power adjustment level indicator.

Optionally, the base station configures the maximum uplink transmission power and/or uplink transmission power in the particular modulation mode according to the uplink power adjustment level indicator shown in Tables 4-6.

A fifth quality parameter: used to indicate the signal transmission quality characteristic of the signal transmitted by the terminal. Further, the signal transmission quality characteristic indicator can represent a nonlinear characteristic of the signal. Particularly, the signal transmission quality characteristic indicator is used to represent a model type indicator and/or a model parameter indicator of the nonlinear characteristic of the signal. The base station configures a receiver according to the signal transmission quality characteristic indicator.

Optionally, the base station obtains the transmission quality characteristics of the signal according to the signal transmission quality characteristic indicator shown in Tables 7-10, to set the receiver to match.

Wherein the base station can explicitly obtain the first quality parameter, the second quality parameter, the third quality parameter, and the fourth quality parameter; or after at least one parameter is explicitly obtained, the base station can implicitly obtain other parameters according to the corresponding relationship among four indicators shown in Table 11, Table 12, Table 13, and Table 14, and the corresponding relationship among the obtained parameters and other parameters. A particular implementation for the base station to obtain the first quality parameter may also be to obtain the first quality parameter implicitly after at least one of the second quality parameter, the third quality parameter, and the fourth quality parameter is explicitly obtained. Specifically, the base station explicitly obtains at least one of the second quality parameter, the third quality parameter, and the fourth quality parameter. At this time, the first quality parameter is that the terminal has the capability to transmit a signal that does not satisfy the preset signal transmission quality requirement under a specific modulation mode. The fifth quality parameter is explicitly obtained.

Step 1102: the base station transmits the configuration parameters to the terminal, and configures a neural network.

The base station schedules the terminal for uplink signal transmission depending on a particular application scenario according to whether it has the capability to receive the signal that does not satisfy the preset signal transmission quality requirement as well as the signal transmission quality level that can be processed. Further, the base station can schedule the modulation mode of the terminal, select the signal transmission quality level and/or reference signal type and/or uplink power adjustment level and/or power adjustment parameter of the signal transmitted by the terminal and transmit the same to the terminal through the configuration parameters, and configure the receiver of the base station at the same time.

Particularly, whether the base station has the capability to receive the signal that does not satisfy the preset signal transmission quality requirement can be characterized as whether it includes a receiver including an Artificial Intelligence (AI) model described with reference to FIGS. 14-17.

At least one of a plurality of modules of the receiver can be implemented through AI model. Functions associated with AI can be performed through a non-volatile memory, a volatile memory, and a processor.

The processor can include one or more processors. At this time, the one or more processors may be general-purpose processors, such as a Central Processing Unit (CPU), an Application Processor (AP), etc., or may be a pure graphics processing unit, such as a Graphics Processing Unit (GPU), a Visual Processing Unit (VPU) and/or an AI dedicated processor (such as a Neural Processing Unit (NPU)).

The one or more processors control processing of input data according to a predefined operation rule in the non-volatile memory and the volatile memory or the AI model. The pre-defined operation rule or the AI model is provided by training or learning.

Herein, providing by learning means to make a predefined operation rule or AI model having desired characteristics by applying a learning algorithm to a plurality of learning data. The learning can be performed in an apparatus itself in which the AI according to the embodiment is executed, and/or can be implemented by a standalone server/system.

Herein, the AI model can be a neural network, which can include a plurality of neural network layers. Each layer has a plurality of weight values, and the layer calculation is executed by calculating a previous layer and a plurality of weights. An example of neural network includes, but is not limited to, a Convolutional Neural Network (CNN), a Deep Neural Network (DNN), a Recurrent Neural Network (RNN), a Restricted Boltzmann Machine (RBM), a Deep Belief Network (DBN), a Bidirectional Recursion Deep Neural Network (BRDNN), a Generative Adversarial Network (GAN) and a deep Q network.

When the base station includes the AI model described with reference to any one of FIGS. 14-17, namely the receiver of the neural network, it represents that the base station can receive the signal that does not satisfy the preset signal transmission quality requirement at this time; when it does not include the receiver of the neural network described with reference to any one of FIGS. 14-17, it represents that the base station can only receive a signal that satisfies the preset signal transmission quality requirement at this time.

When the base station includes the receiver comprising the neural network described in any one of FIGS. 14-17, the base station further selects the signal transmission quality level and/or reference signal type and/or uplink power adjustment level of the signal transmitted by the terminal, according to the current application scenario and transmits the same to the terminal, and configure the neural network in the receiver of the base station at the same time.

Optionally, the base station configures the neural network in the receiver according to the configuration parameters transmitted by the base station to the terminal and/or the signal transmission quality characteristics reported by the terminal. Wherein, the configuration parameters transmitted by the base station to the terminal can determine the transmission quality level of the signal transmitted by the terminal, and the signal transmission quality characteristics reported by the terminal can determine the nonlinear mathematical characteristics of the signal. The neural network in the receiving end is configured according to these pieces of information, so that the reception performance can be improved.

One particular implementation for configuring the neural network in the receiver by the base station is to configure parameters of the neural network according to the configuration parameters transmitted by the base station to the terminal, namely the signal transmission quality level and/or the reference signal type and/or the uplink power adjustment level of the signal transmitted by the selected terminal. Based on the configuration parameters transmitted by the base station to the terminal, the base station can finally know the signal transmission quality level of the signal transmitted by the terminal through an explicit or implicit relationship. Corresponding to different signal transmission quality levels, the base station selects different parameters to configure the neural network in the receiver, as shown in Table 15. When the signal transmission quality level of the signal transmitted by the terminal is A, the base station selects a neural network configuration parameter 1 to configure the neural network in the receiver; when the signal transmission quality level of the signal transmitted by the terminal is B, the base station selects a neural network configuration parameter 2 to configure the neural network in the receiver; when the signal transmission quality level of the signal transmitted by the terminal is C, the base station selects a neural network configuration parameter 3 to configure the neural network in the receiver; and so on.

TABLE 15

| Signal transmission quality level and configuration of neural network | |
| --- | --- |
| Signal transmission quality level of signal transmitted by terminal | Configuration parameters of neural network in receiver |
| A | Neural network configuration parameter 1 |
| B | Neural network configuration parameter 2 |
| C | Neural network configuration parameter 3 |
| . . . | . . . |

One particular implementation for the base station configuring the neural network in the receiver can also be to select the configuration parameters of neural network by using signal transmission quality characteristic indicator that are reported by the terminal. Wherein, the signal transmission quality characteristic indicator at least includes a model type indicator and/or model parameter indicator of the nonlinear characteristic of the signal.

When the signal transmission quality characteristic indicator is the model type indicator of the signal nonlinear characteristic of the signal, neural network configuration parameters correspondingly selected are as shown in table 16. Wherein, when the model type of nonlinear characteristic of signal is 1, the neural network configuration parameter 1 is selected to configure the neural network; when the model type of nonlinear characteristic of the signal is 2, the neural network configuration parameter 2 is selected to configure the neural network; when the model type of nonlinear characteristics of signal is 3, the neural network configuration parameter 3 is selected to configure the neural network, and so on. Corresponding to different model types of signal nonlinear characteristics, for example a Rapp model, a Saleh model and the like, for its different mathematical features, different neural network parameters are used to match, so that better signal recovery can be obtained.

TABLE 16

| Model type indicator of nonlinear characteristic and configuration of neural network | |
| --- | --- |
| Model type indicator domain of signal nonlinear characteristic | Configuration parameters of neural network in receiver |
| 1 | Neural network configuration parameter 1 |
| 2 | Neural network configuration parameter 2 |
| 3 | Neural network configuration parameter 3 |
| . . . | . . . |

When the signal transmission quality characteristic indicator is to determine the nonlinear characteristic model type of the signal by predefined or other ways, while the model parameter of the nonlinear characteristic of the signal is reported, different neural network configuration is correspondingly selected based on different model parameters. Taking the Rapp model as an example, for different model parameters, the selected neural network configuration is as shown in Table 17. For example, when the Rapp model parameter indicator is 1, the neural network configuration parameter 1 is selected to configure the neural network;

when the Rapp model parameter indicator is 2, the neural network configuration parameter 2 is selected to configure the neural network; when the Rapp model parameter indicator is 3, the neural network configuration parameter 3 is selected to configure the neural network, and so on. For a certain type of nonlinear model, corresponding to its different parameters, the configuration parameters of neural network are further optimized to improve the reception performance.

TABLE 17

| Rapp model parameter indicators and configuration of neural network | |
|---|---|
| Rapp model parameter indicator field | Configuration parameters of neural network in receiver |
| 1 | Neural network configuration parameter1 |
| 2 | Neural network configuration parameter 2 |
| 3 | Neural network configuration parameter 3 |
| . . . | . . . |

When the signal transmission quality characteristic indicator is to report the model type and model parameter of the nonlinear characteristic of the signal simultaneously, corresponding to each model type and model parameter, different neural network configuration is selected correspondingly, as shown in Table 18. For example, when the higher $N_1$ bits of the signal transmission quality characteristic indicator field are 0 . . . 01, and the lower $N_2$ bits are 0 . . . 01, it represents that the nonlinear characteristics of the signal can be characterized by a type-a model at this time, and a first set of parameters of the type-a model is used, and at this time, a neural network configuration parameter a1 is correspondingly selected to configure the neural network, to correspond to the first set of parameters of the type-a model; when the higher $N_1$ bits of the signal transmission quality characteristic indicator field are 0 . . . 01, and the lower $N_2$ bits are 0 . . . 010, it represents that the nonlinear characteristics of the signal can be characterized by the type-a model at this time, and a second set of parameters of the type-a model is used, and at this time, a neural network configuration parameter a2 is correspondingly selected to configure the neural network, to correspond to the second set of parameters of the type-a model; when the higher $N_1$ bits of the signal transmission quality characteristic indicator field are 0 . . . 010, and the lower $N_2$ bits are 0 . . . 01, it represents that the nonlinear characteristics of the signal can be characterized by a type-b model at this time, and a first set of parameters of the type-b model is used, and at this time, a neural network configuration parameter b1 is correspondingly selected to configure the neural network; and so on. At this time, corresponding to different signal transmission quality characteristic indicators, one table can be used to select the corresponding neural network configuration parameters for different models and different model parameters, thus saving storage resources.

TABLE 18

| Signal transmission quality characteristic indicator and configuration of neural network | | |
|---|---|---|
| Signal transmission quality characteristic indicator field | | Configuration parameters of |
| Higher $N_1$ bits | Lower $N_2$ bits | neural network in receiver |
| 0 . . . 01 | 0 . . . 01 | Neural network configuration parameter a1 |

TABLE 18-continued

| Signal transmission quality characteristic indicator and configuration of neural network | | |
|---|---|---|
| Signal transmission quality characteristic indicator field | | Configuration parameters of |
| Higher $N_1$ bits | Lower $N_2$ bits | neural network in receiver |
| 0 . . . 01 | 0 . . . 010 | Neural network configuration parameter a2 |
| . . . | . . . | . . . |
| 0 . . . 010 | 0 . . . 01 | Neural network configuration parameter b1 |
| . . . | . . . | . . . |

One particular implementation for configuring the neural network in the receiver by the base station can also be to configure the neural network in the receiver simultaneously according to the configuration parameters transmitted by the base station to the terminal and the signal transmission quality characteristics reported by the terminal. The configuration parameters transmitted by the base station to the terminal are analyzed to obtain the transmission quality level of the signal, and then combined with the signal transmission quality characteristics of the terminal, the transmission quality of the signal can be fully characterized, so as to correspondingly configure the neural network in the receiver, thus can better recover the signal from nonlinear distortion.

When the signal transmission quality characteristic indicator reported by the terminal is a model type indicator of the nonlinear characteristic of the signal, in combination with the signal transmission quality level, the neural network configuration parameters correspondingly selected by the base station are as shown in Table 19. Wherein, when the signal transmission quality level of the signal transmitted by the terminal is A, and the model type of the nonlinear characteristic is 1, a neural network configuration parameter A1 is selected to configure the neural network; when the signal transmission quality level of the signal transmitted by the terminal is A, and the nonlinear characteristic model type is 2, a neural network configuration parameter A2 is selected to configure the neural network; when the signal transmission quality level of the signal transmitted by the terminal is B, and the nonlinear characteristic model type is 1, a neural network configuration parameter B1 is selected to configure the neural network; and so on. At this time, the base station combines the transmission quality level of the signal transmitted by the terminal and the nonlinear model to configure the neural network. Compared with only using the transmission quality level or the nonlinear model, this way achieves a higher matching degree.

TABLE 19

| Signal transmission quality level, model type indicator of nonlinear characteristic, and configuration of neural network | | |
|---|---|---|
| Signal transmission quality levels | Model type indicator domain of nonlinear characteristic | Configuration parameters of neural network in receiver |
| A | 1 | Neural network configuration parameter A1 |
| A | 2 | Neural network configuration parameter A2 |
| . . . | . . . | . . . |

TABLE 19-continued

| Signal transmission quality level, model type indicator of nonlinear characteristic, and configuration of neural network | | |
|---|---|---|
| Signal transmission quality levels | Model type indicator domain of nonlinear characteristic | Configuration parameters of neural network in receiver |
| B | 1 | Neural network configuration parameter B1 |
| . . . | . . . | . . . |

When the signal transmission quality characteristic indicator is to determine the nonlinear characteristic model type of the signal through the predefined or other ways, while the nonlinear characteristic model parameters of the signal are reported, different neural network configuration is correspondingly selected based on different model parameters in combination with the signal transmission quality level of the signal transmitted by the terminal. Taking a Rapp model as an example, for different model parameters and signal transmission quality levels, the selected neural network configuration is as shown in Table 20. For example, when the signal transmission quality level of the signal transmitted by the terminal is A, and the Rapp model parameter indicator is 1, a neural network configuration parameter A1 is selected to configure the neural network; when the signal transmission quality level of the signal transmitted by the terminal is A, and the Rapp model parameter indicator is 2, a neural network configuration parameter A2 is selected to configure the neural network; when the signal transmission quality level of the signal transmitted by the terminal is B, and the Rapp model parameter indicator is 1, a neural network configuration parameter B1 is selected to configure the neural network; and so on. For a certain type of nonlinear model, corresponding to its different parameters, in combination with different signal transmission quality levels, the configuration parameters of neural network can be further optimized to improve the reception performance.

TABLE 20

| Signal transmission quality level, Rapp model parameter indicator and configuration of neural network | | |
|---|---|---|
| Signal transmission quality level | Rapp model parameter indicator field | Configuration parameters of neural network in receiver |
| A | 1 | Neural network Configuration parameter A1 |
| A | 2 | Neural network Configuration parameter A2 |
| . . . | . . . | . . . |
| B | 1 | Neural network Configuration parameter B1 |
| . . . | . . . | . . . |

When the signal transmission quality characteristic indicator is to report the model type and model parameter of the nonlinear characteristic of the signal simultaneously, corresponding to each model type and model parameters, in combination with the signal transmission quality level, different neural network configuration is correspondingly selected, as shown in Table 21. For example, when the signal transmission quality characteristic indicator is a1, it represents that the nonlinear characteristic of the signal can be characterized by the type-a model at this time, and a first set of parameters of the type-a model is used, and if the signal transmission quality level of the signal transmitted by the terminal is A, at this time, the neural network configuration parameter Aa1 is correspondingly selected to configure the neural network; when the signal transmission quality characteristic indicator is a2, it represents that the nonlinear characteristics of the signal can be characterized by the type-a model at this time, and a second set of parameters of the type-a model is used, and if the signal transmission quality level of the signal transmitted by the terminal is A, the neural network configuration parameter Aa2 is correspondingly selected to configure the neural network; when the signal transmission quality characteristic indicator is b1, it represents that the nonlinear characteristics of the signal can be characterized by a type-b model, and a first set of parameters of the type-b model is used, and if the signal transmission quality level of the signal transmitted by the terminal is A, the neural network configuration parameter Ab1 is correspondingly selected to configure the neural network; if the signal transmission quality level of the signal transmitted by the terminal is B, and the signal transmission quality characteristic indicator is a1, the neural network configuration parameter Ba1 is correspondingly selected to configure the neural network; and so on. At this time, corresponding to different signal transmission quality characteristic indicators, one table can be used to select the corresponding neural network configuration parameters for different models, different model parameters, and different signal transmission quality levels, thus saving storage resources.

TABLE 21

| Signal transmission quality level, signal transmission quality characteristic indicator and configuration of neural network | | | |
|---|---|---|---|
| Signal transmission quality levels | Signal transmission quality characteristic indicator field | | Configuration parameters of neural network in receiver |
| | Higher $N_1$ bits | Lower $N_2$ bits | |
| A | 0 . . . 01 | 0 . . . 01 | Neural network configuration parameter Aa1 |
| A | 0 . . . 01 | 0 . . . 010 | Neural network configuration parameter Aa2 |
| . . . | . . . | . . . | . . . |
| . . . | 0 . . . 010 | 0 . . . 01 | Neural network configuration parameter Ab1 |
| . . . | . . . | . . . | . . . |
| B | 0 . . . 01 | 0 . . . 01 | Neural network configuration parameter Ba1 |
| . . . | . . . | . . . | . . . |

The configuration parameters of neural network include at least one of:

a first parameter: a neural network structure. The neural network structure is used to determine which type of neural network to select;

a second parameter: a parameter of the number of nodes in the input layer of the neural network. The parameter of the number of nodes in the input layer is used to indicate the number of inputs to the neural network each time;

a third parameter: a parameter of the number of neurons in the hidden layer of the neural network. The parameter of the number of neurons in the hidden layer is used to indicate the number of neurons in the hidden layer;

a fourth parameter: the characteristic of the hidden layer of the neural network. Particularly, the characteristic of the hidden layer can be iterative. Further, its iterative characteristic can be a spectral radius, the spectral radius of hidden layer is used to determine the Jacobian matrix of state transition in the hidden layer and/or the memory property of the neural network;

a fifth parameter: a parameter of the number of neurons in the output layer of the neural network, wherein the parameter of the number of nodes in the output layer is used to indicate the number of outputs out of the neural networks each time;

a sixth parameter: an activation function of the neurons of the neural network. The activation function of the neurons is used to learn the nonlinearity of input data;

a seventh parameter: the layer number of the hidden layers of the neural network. The layer number of the hidden layers is used to indicate the learning depth of the neural network.

Step 1103: the base station receives an uplink signal, and enables the neural network to process the uplink signal.

Wherein, the way of the base station to enable the neural network can be determined according to particular application requirement. The particular implementation of the base station enabling the neural network can be the base station always enabling the neural network, so that the neural network can process all data received by the base station, to improve the nonlinear distortion of all the received data. Alternatively, the particular implementation of the base station enabling the neural network can also be the base station enabling the neural network only when receiving a signal that does not satisfy the preset signal transmission quality requirement, and thus, the power consumption overheads when the neural network is enabled are reduced.

Preferably, the configuration parameters delivered by the base station in step 1102 will trigger the reporting of the power headroom. When the base station requests to receive the signal that satisfies the preset signal transmission quality requirement, the base station will receive a set of power headroom calculated in a preset manner. When the base station requests to receive the signal that does not satisfy the preset signal transmission quality requirement, the power headroom received by the base station may be the power headroom calculated according to the power adjustment parameter indicator, and/or the power headroom calculated in a preset manner. When the base station only receives the power headroom calculated in the preset manner, the base station can calculate the corresponding power headroom when receiving the signal that does not satisfy the preset signal transmission quality requirement according to the delivered configuration parameters. Similarly, when the base station only receives the power headroom calculated according to the power adjustment parameter indicator, the base station can calculate the corresponding power headroom when receiving the signal that satisfies the preset signal transmission quality requirement according to the delivered configuration parameters. FIG. 12 illustrates a flowchart of a method for downlink signal reception in a wireless communication system according to one embodiment of the present disclosure. The method can be used for downlink signal reception in a case where the signal does not satisfy the preset signal transmission quality requirement. The particular flowchart includes the following steps of:

Step 1201: a terminal reports parameters for signal transmission quality for receiving downlink signal in a particular modulation mode.

Step 1202: the terminal obtains configuration parameters of the base station in the particular modulation mode.

Step 1203: the terminal receives the downlink signal, and enables the neural network to process the downlink signal.

Optionally, in the step 1201, the modulation mode refers to a mapping mode from a bit group to symbols that is performed according to a preset rule. The particular modulation mode refers to at least one of 256 Quadrature Amplitude Modulation (QAM), 1024 QAM, amplitude-phase keying modulation, or star-QAM, and one of its characteristics is that a modulated transmission signal has a property of a high PAPR after being converted from a frequency domain to a time domain, such as quadrature amplitude high-order modulation, while one of the beneficial effects of using the high-order modulation. A particular implementation for the terminal reporting the parameters of the signal transmission quality in the particular modulation mode can be the terminal reporting the reception capability related to the particular modulation mode, to facilitate a base station to schedule the particular modulation mode. The parameters of the signal transmission quality in the particular modulation mode include at least one of the following:

a first quality parameter: used to indicate whether a terminal has the capability to receive signal that does not satisfy the preset signal transmission quality requirement in the particular modulation mode, to facilitate the base station to decide whether to schedule the particular modulation mode for transmission according to the capability indicator.

If the first quality parameter indicates that the terminal has no capability to receive the signal that does not satisfy the preset signal transmission quality requirement in the particular modulation mode, the terminal can only perform signal reception according to a preset signal transmission mode.

If the first quality parameter indicates that the terminal has the capability to receive the signal that does not satisfy the preset requirement of signal transmission quality in the particular modulation mode, the terminal can be scheduled to receive downlink signal in the particular modulation mode, wherein the downlink signal transmission quality does not satisfy the preset signal transmission quality requirement.

Particularly, whether the terminal has the capability to receive the signal that does not satisfy the preset signal transmission quality requirement can be characterized as whether it has Artificial Intelligence (AI) model described with reference to FIGS. 14-17, that is, the receiver of neural network.

A second quality parameter: used to indicate signal quality level(s) that the terminal can support. Furthermore, the second quality parameter reported by the terminal can be the signal quality level indicator that the terminal can receive in a specific modulation mode, which facilitates the base station to adjust the transmission power in different application scenarios, and the coverage radius of the terminal in the particular modulation mode can be increased.

A third quality parameter: used to indicate reference signal type(s) that the terminal can support. The reference signal includes a demodulation reference signal of a physical downlink channel, and the physical downlink channel includes a Physical Downlink Shared Channel (PDSCH) and a Physical Downlink Control Channel (PDCCH). Furthermore, the reference signal type indicator can represent the reference signal type(s) that can be supported in the particular modulation mode, and at least include a time-frequency resource pattern indicator and/or a reference signal sequence indicator, etc. The terminal reports the reference signal type indicator, to facilitate the base station to configure different reference signal types according to different application scenarios in the particular modulation mode, so that the configured reference signal types satisfy the requirement, to facilitate processing at a receiving end.

The particular implementation of the above first quality parameter, second quality parameter, and third quality parameter can be similar to or the same as the particular implementation of the first quality parameter, the second quality parameter, and the third quality parameter in the step 401 described with reference to FIG. 4. For clarity and conciseness, detailed descriptions are omitted here.

Optionally, in the step 1202, the method of obtaining the configuration parameters by the terminal includes at least one of the following: obtaining the configuration parameters by analyzing the physical downlink control channel, obtaining the configuration parameters by analyzing the higher-level signaling, and obtaining the configuration parameters by analyzing the Media Access Control (MAC) information of the physical downlink shared channel. When being not configured with the parameters, the terminal can obtain the configuration parameters by using a preset value or by estimating the reference signal. The configuration parameters include at least one of the following:

An Indicator of Signal Transmission Quality Level(s) Required to be Satisfied for Receiving Signal;

When the terminal is required to use the particular modulation mode when not satisfying the preset signal transmission quality requirement, the terminal performs signal reception according to the configured signal transmission quality requirement. Wherein, the way of acquiring the configuration parameters can be explicit or implicit. For example, one particular implementation of explicitly acquiring the configuration parameters can be directly reading the signal transmission quality level indicator. One particular implementation of implicitly acquiring the configuration parameters can be the terminal obtaining its signal transmission quality level using traditional method. The traditional method refers to a traditional equalization technique. One particular implementation of implicitly acquiring the configuration parameters can also be using the preset value by the terminal.

An Indicator for Reference Signal Type(s);

An indicator for reference signal type(s) includes at least one of a time-frequency resource pattern indicator and a reference signal sequence indicator, and is used to indicate reference signal type(s) that the terminal can support. When being required to use the particular modulation mode for transmission when not satisfying the preset signal transmission quality requirement, the terminal selects the used reference signal according to the configured reference signal type indicator. Wherein, the way of acquiring the configuration parameters can be explicit or implicit. For example, one particular implementation of explicitly acquiring the configuration parameters can be directly reading the reference signal type indicator. One particular implementation of implicitly acquiring the configuration parameters can be using the preset value by the terminal.

A Signal Transmission Quality Characteristic Indicator;

The signal transmission quality characteristic indicator can represent the nonlinear characteristic of the signal. Particularly, the signal transmission quality characteristic indicator is used to represent a model type indicator and/or a model parameter indicator of the nonlinear characteristic of the signal. When being required to use the particular modulation mode for signal reception when not satisfying the preset signal transmission quality requirement, the terminal configures the neural network in the receiver according to the signal transmission quality characteristic of the received signal. Wherein, the way of acquiring the configuration parameters can be explicit or implicit. For example, one particular implementation of explicitly acquiring the configuration parameters can be directly reading the reference signal type indicator. One particular implementation of implicitly acquiring the configuration parameters can be using the preset value by the terminal.

When including the receiver having the neural network described with reference to any one of FIGS. 14-19, the terminal further determines the signal transmission quality level, the reference signal type, and the signal transmission quality characteristic according to the obtained configuration parameters, and configures the neural network in the receiver. Wherein, the reference signal type determined by the terminal can be a time-frequency resource pattern of the reference signal, used for the receiver to extract the reference signal from a data stream to obtain the nonlinear distortion experienced by the data.

Optionally, the terminal configures the receiver according to the configuration parameters transmitted by the base station, that is, the neural network in the receiving end is configured by the signal transmission quality level and/or signal transmission quality characteristic, to improve the reception performance.

The above-mentioned particular implementation that the terminal configures the neural network in the receiving end according to the signal transmission quality level and/or signal transmission quality characteristics can be similar to or the same as the particular implementation in step 1102 described with reference to FIG. 11 that the base station configures the neural network in the receiving end according to the signal transmission quality level and/or the signal transmission quality characteristics. For clarity and conciseness, detailed descriptions are omitted here.

The configuration parameters of neural network in the receiver of the terminal include at least one of:

a first parameter: a neural network structure. The neural network structure is used to determine which type of neural network to select;

a second parameter: a parameter of the number of nodes in the input layer of the neural network. The parameter of the number of nodes in the input layer is used to indicate the number of inputs to the neural network each time;

a third parameter: a parameter of the number of neurons in the hidden layer of the neural network. The parameter of the number of neurons in the hidden layer is used to indicate the number of neurons in the hidden layer;

a fourth parameter: the characteristic of the hidden layer of the neural network. Particularly, the characteristic of the hidden layer can be iterative. Further, its iterative characteristic can be a spectral radius, the spectral radius of hidden layer is used to determine the Jacobian matrix of state transition in the hidden layer and/or the memory property of the neural network;

a fifth parameter: a parameter of the number of neurons in the output layer of the neural network, wherein the parameter of the number of nodes in the output layer is used to indicate the number of outputs out of the neural networks each time.

a sixth parameter: an activation function of the neurons of the neural network. The activation function of the neurons is used to learn the nonlinearity of input data;

a seventh parameter: the layer number of the hidden layers of the neural network. The layer number of the hidden layers is used to indicate the learning depth of the neural network.

Optionally, the way of the terminal to enable the neural network in step 1203 can be determined according to particular application requirement. The particular implementation of the terminal enabling the neural network can be the terminal always enabling the neural network, so that the neural network can process all data received by the terminal, to improve the nonlinear distortion of all the received data. The particular implementation of the terminal enabling the neural network can also be the terminal enabling the neural network only when receiving a signal that does not satisfy the preset signal transmission quality requirement, and thus, the power consumption overheads when the neural network is enabled are reduced, which is very important for the terminal where batteries are limited.

FIG. 13 illustrates a flowchart of a method for downlink signal transmission in a wireless communication system according to one embodiment of the present disclosure.

Step 1301: the base station receives parameters for signal transmission quality in the particular modulation mode from the terminal.

The base station receives the parameters for the signal transmission quality of the downlink signal in the particular modulation mode from the terminal, and performs analysis, thereby obtaining the reception capability indicator of the terminal. The parameters for the signal transmission quality include at least one of:

a first quality parameter: an indicator of whether a terminal has the capability to receive signal that does not satisfy the preset signal transmission quality requirement in the particular modulation mode, to facilitate the base station to decide whether to schedule the particular modulation mode for transmission according to the capability indicator.

If the first quality parameter indicates that the terminal has no capability to receive the signal that does not satisfy the preset signal transmission quality requirement in the particular modulation mode, the base station decides not to schedule the particular modulation mode for transmission.

If the first quality parameter indicates that the terminal has the capability to receive the signal that does not satisfy the preset requirement of signal transmission quality in the particular modulation mode, the base station can schedule the particular modulation mode for transmission.

A second quality parameter: An indicator of signal transmission quality level(s) that the terminal can support. Furthermore, the indicator of signal transmission quality level(s) can indicate an indicator of signal transmission quality level(s) that can be supported in the particular modulation mode. The base station configures the transmission quality of the downlink signal in the particular modulation mode according to the indicator of signal transmission quality level(s).

A third quality parameter: an indicator of reference signal type(s) that the terminal can support. The indicator of reference signal type(s) can represent the reference signal type(s) that can be supported in the particular modulation mode, and at least include a time-frequency resource pattern indicator and/or a reference signal sequence indicator, etc. The base station configures different reference signal types according to the indicator of signal transmission quality level(s).

The particular implementation of the above first quality parameter, second quality parameter, and third quality parameter can be similar to or the same as the particular implementation of the first quality parameter, the second quality parameter, and the third quality parameter in the step 1101 described with reference to FIG. 11. For clarity and conciseness, detailed descriptions are omitted here.

Step 1302: the base station transmits the configuration parameters in the particular modulation mode to the terminal.

Based on the parameters obtained in the step 1301, according to the particular application scenario, the base station selects the signal transmission quality level and/or reference signal type indicator and/or signal transmission quality characteristic indicator of the transmitted downlink signal and transmit them/it to the terminal through the configuration parameters.

Step 1303: the base station performs downlink signal transmission.

According to an embodiment of the present disclosure, the above-mentioned receiver that has the capability to process a signal that does not meet the preset signal transmission quality requirement can include a neural network, wherein the neural network comprises neural network output noise power estimation for demodulation and Log-Likelihood Ratio (LLR) calculation.

FIG. 14 illustrates a receiver comprising a neural network according to an embodiment of the present disclosure.

As shown in FIG. 14, one of the particular implementations of the receiver comprising the neural network can be that the receiving end determines the configuration parameters of the neural network through the signal quality parameters of the data that needs to be processed, and then setting the parameters of the neural network; the time-domain digital signal that is received by the receiving end passes through a neural network module to generate an equalized time-domain signal; the equalized time-domain signal passes through a FFT module to generate a frequency-domain signal, the frequency-domain signal passes through a demodulation and LLR calculation module to generate the log-likelihood value of the signal, and finally the channel decoding module recovers transmitted data. Wherein the neural network uses the reference signal as training data, and a trained network is used for channel estimation and equalization of the transmitted data. In particular, the trained network outputs noise power estimation for signal demodulation, and generates the log-likelihood ratio of the signal for channel decoding to improve decoding performance.

The signal quality parameters of the data to be processed can be obtained from signaling, or can be obtained after equalization is performed on a reference signal in a traditional manner.

In addition, the configuration parameters of the neural network can also be configured by using predefined parameters, so as to optimize the configuration parameters of the neural network in advance, thereby reducing the complexity of configuring the neural network.

The neural network needs to be configured with parameters before use, particularly, the configuration parameters comprising at least one of:

a first parameter: a neural network structure. The neural network structure is used to determine which type of neural network to select;

a second parameter: a parameter of the number of nodes in the input layer of the neural network. The parameter of the number of nodes in the input layer is used to indicate the number of inputs to the neural network each time;

a third parameter: a parameter of the number of neurons in the hidden layer of the neural network. The parameter of the number of neurons in the hidden layer is used to indicate the number of neurons in the hidden layer;

a fourth parameter: the characteristic of the hidden layer of the neural network. Particularly, the characteristic of the hidden layer can be iterative. Further, its iterative characteristic can be a spectral radius, the spectral radius of hidden layer is used to determine the Jacobian matrix of state transition in the hidden layer and/or the memory property of the neural network;

a fifth parameter: a parameter of the number of neurons in the output layer of the neural network, wherein the parameter of the number of nodes in the output layer is used to indicate the number of outputs out of the neural networks each time;

a sixth parameter: an activation function of the neurons of the neural network. The activation function of the neurons is used to learn the nonlinearity of input data;

a seventh parameter: the layer number of the hidden layers of the neural network. The layer number of the hidden layers is used to indicate the learning depth of the neural network.

The particular implementation of the neural network structure in the first parameter may be a feed-forward neural network model, a convolutional neural network model, a recurrent neural network model, etc., preferably an Echo State Network (ESN). The ESN is a type of recurrent neural network, which is characterized by only containing one hidden layer, and weights of the input layer and the hidden layer are randomly generated under the condition of satisfying a certain spectral radius. The generated random weights remain constant during training and testing, and only the weight of the output layer participates in training. The advantage of this network is to preset the weight of a cyclic hidden unit, so that the number of parameters of training and the computational complexity can be greatly reduced.

The particular implementation of the activation function of the neurons in the sixth parameter may be a tanh function, a ReLU function or an eLU function.

One of the characteristic of the neural network can be that input signals are transmitted signals at several times, at least comprising signal transmitted at the current time and signals transmitted at several previous times, and in addition, the input signals can also include the transmitted signals at later time.

One of the characters of the neural network can also be that real number data or complex number data can be processed; when the complex number data is processed, data input to the network and data output from the network are both complex number date. When the real number data is processed, for each complex number symbol in digital domain, a real part and an imaginary part are taken as two data inputs, and the network outputs two real signals, corresponding to I channel and Q channel of the input signal.

The method of the neural network generating the noise power estimation can be calculating the mean square error of the reference signal and an estimated signal of the reference signal, as shown in the following formula. The neural network can generate instantaneous noise power from the pilot of a current transmission subframe, or can use the pilots of a plurality of transmission subframes to generate average noise power.

$$\sigma^2 = \frac{1}{N} \sum |y_i - \hat{y}_i|^2$$

Where N represents the length of a reference signal sequence participating in the training, $y_i$ represents the $i_{th}$ of transmitted reference signal sequences, and $\hat{y}_i$ represents the $i_{th}$ of received reference signal sequences.

Optionally, in other implementations, noise variance estimation can be directly output, and is used for signal demodulation.

FIG. 15 illustrates a receiver comprising a neural network according to an embodiment of the present disclosure.

As shown in FIG. 15, the particular implementation of the receiver comprising the neural network can also be that, the neural network at the receiving end is connected after the FFT module, that is, after the time domain signal is transformed into the frequency domain signal by the FFT module, channel estimation and equalization is performed on the frequency domain signal using neural network, and noise power estimation is output for demodulation and LLR calculation.

FIG. 16 illustrates a receiver comprising a neural network according to an embodiment of the present disclosure.

As shown in FIG. 16, the particular implementation of the receiver comprising the neural network can also be that, when the neural network is used for the frequency-domain signal, a filter can be added to its front end, and noise power estimation is made in a filtered useful frequency band, thereby reducing out-of-band noise due to PA amplification, so that inter-symbol interference is reduced.

FIG. 17 illustrates a receiver comprising a neural network according to an embodiment of the present disclosure.

As shown in FIG. 17, the particular implementation of the receiver comprising neural network can also be that, the neural network module and FFT module at the receiving end are integrated into one module, that is, the received signal is output to the demodulation and LLR calculation module after passing through a intergrated neural network.

FIG. 22 illustrates a receiver comprising a neural network according to an embodiment of the present disclosure.

As shown in FIG. 22, the particular implementation of the receiver comprising the neural network can also be that, the neural network at the receiving end is connected after a channel estimation and equalization module in the frequency domain, that is, after a time-domain signal is transformed into a frequency-domain signal by the FFT module, channel estimation and equalization is performed on the frequency-domain signal using a traditional algorithm; then the equalized frequency-domain signal is transformed into the time-domain signal by the IFFT module, and the neural network is used to perform nonlinear processing; after being transformed into the frequency-domain signal by FFT, the nonlinearly processed time-domain signal is transmitted to the demodulation and LLR calculation module. This method can effectively overcome the effect of a complex channel environment using traditional a channel estimation and equalization algorithm.

At this time, there are two sources for the input noise power estimation of the demodulation and LLR calculation module to select, one coming from the channel estimation and equalization module, and the other coming from the neural network.

Optionally, the method of the demodulation and LLR calculation module selecting the source of the input noise power estimation can be pre-selecting noise power estimation that is output by the channel estimation and equalization module or selecting noise power estimation that is output by the neural network. This method fixes the source of noise power estimation, and is simple and convenient to implement.

Optionally, the method of the demodulation and LLR calculation module selecting the source of the input noise power estimation can also be the receiving end adaptively switching the source of the input noise power estimation according to the signal-to-noise ratio estimation that is output by the channel estimation and equalization module. For example, when the signal-to-noise ratio estimation that is output by the channel estimation and equalization module is higher than a predetermined threshold, the noise power estimation that comes from the neural network is selected, and otherwise, the noise power estimation that comes from the channel estimation and equalization module is selected. Compared with the method of fixing the source of noise power estimation, this method can adaptively select a more reasonable source according to channel conditions, so that performance can be effectively improved.

Optionally, the method of the demodulation and LLR calculation module selecting the source of the input noise power estimation can also be analysing the high-level signaling and the MAC information of the channel to switch the source of the input noise power estimation. Compared with the adaptive switching method, this method increases the flexibility of human intervention, and is more suitable for complex application scenarios.

FIG. 23 illustrates a receiver comprising a neural network according to an embodiment of the present disclosure.

As shown in FIG. 23, the particular implementation of the receiver comprising neural network can also be that, the neural network at the receiving end is connected after a buffer, that is, after the time-domain signal is transformed into the frequency-domain signal and then is transformed into the time-domain signal after undergoing frequency domain channel estimation and equalization, the time-domain signal firstly passes through the buffer, and the current time-domain signal to be estimated is input to the neural network together with signals at several adjacent times to eliminate the nonlinearity of the current time-domain signal. Using buffer can effectively eliminate the interference caused by the signals at the adjacent times due to the memory property of the nonlinear model, and meanwhile, for a memoryless nonlinear model, the buffer can also improve the channel effect caused by the non-ideal channel estimation and equalization.

In the particular implementation process, the buffer in FIG. 23 can also be implemented as a part of the neural network, for example, an eighth parameter of the neural network is the length of the input buffer, the length of the input buffer being used to represent the total number of signals at the current time and the signals at the several adjacent times that are transmitted into the neural network.

FIG. 39 shows a receiver comprising a neural network according to an embodiment of the present disclosure.

As shown in FIG. 39, a particular implementation of the receiver including the neural network may also be that, when the receiver is configured with a plurality of receiving antennas, the received signal from each receiving antenna is converted into the frequency domain through the FFT module, and the channel estimation is performed respectively. When the channel estimation is completed, the frequency-domain received signals from different receiving antennas are combined with the maximum ratio, and an equalized frequency-domain signal is output. The frequency-domain signal combined with the maximum ratio is converted into the time domain by the IFFT module, and then first passes through the input buffer; the current time-domain signal to be estimated and the signal at several adjacent moments are input into the neural network together to eliminate the nonlinear of the current time-domain signal. The time-domain signal after passing through the neural network passes through the output buffer and is input into the FFT module to be converted into the frequency domain for subsequent demodulation and decoding operations.

It should be noted that the length of the above input buffer and output buffer can be configured as 1, or the input buffer and/or output buffer are not configured. Similar to the above embodiment, the neural network estimates the noise variance and uses it for LLR calculation in subsequent demodulation and decoding.

The receiver results in the above embodiments are all receiver results when the transmitter transmits a single stream. FIG. 40 shows a block diagram of an uplink signal receiving apparatus according to an embodiment of the present disclosure. In this embodiment, the transmitter transmits a plurality of data streams through a plurality of transmitting antennas. The receiver structure shown in FIG. 40 is particularly suitable for the case where the plurality of data streams transmitted by the transmitter are orthogonal in frequency domain, that is, the plurality of data streams occupy different frequency domain resources and do not overlap with each other.

As shown in FIG. 40, the received signal from each receiving antenna is converted into the frequency domain through the FFT module, and the channel estimation is performed respectively. When the channel estimation is completed, the frequency-domain received data stream from each receiving antenna passes through a conventional multi-antenna equalization module to obtain each equalized frequency-domain data stream. Each equalized frequency domain data stream is converted into time domain through IFFT. Each time-domain equalized data stream converted into the time domain is input to the neural network through an input buffer to remove the nonlinear interference introduced by a plurality of transmitters. The output of the neural network passes through the output buffer, and is input to the FFT module and converted into the frequency domain for subsequent demodulation and decoding operations.

In this embodiment, it is assumed that the processing length of a single time domain data stream is M, and there are K data streams in total. When entering the input buffer, each data stream takes M samples, and the samples of each data stream are cascaded to input to the buffer. That is, the buffer length is MK. It should be noted that the processing length of a single time domain data stream can be set to 1.

In addition, it should be noted that, in this embodiment, the data stream transmitted by the transmitter occupies non-overlapping frequency domain resources, which are orthogonal in the frequency domain, so after passing through the output buffer of the neural network, only a single FFT module is required to complete the subsequent time domain-frequency domain conversion, demodulation, decoding and other operations.

In the above implementation, a single neural network is used to process data from a plurality of transmitted streams. In another possible implementation, a plurality of neural networks can be used to process data from the plurality of transmitted streams. The particular implementation is shown in FIG. 41.

The signal received from each receiving antenna is converted into the frequency domain through the FFT module, and the channel estimation is performed respectively. When the channel estimation is completed, the frequency-domain received data stream from each receiving antenna passes through a conventional multi-antenna equalization module to obtain each equalized frequency-domain data stream.

Each equalized frequency domain data stream is converted to time domain through IFFT.

Assuming that the number of time-domain data streams that need to be processed is K, in this embodiment, K neural networks are used to process the K time-domain data streams respectively. Each neural network processes the data of one transmitted stream, but the input buffer connected to it receives the time domain data from all IFFT outputs, as shown in FIG. 41. The neural network output is summed after passing through the output buffer, that is, the K data streams processed by the neural network are summed and pass through FFT, and the subsequent demodulation and decoding operations are performed to estimate the transmitted data of the K data streams.

It should be noted that, in this embodiment, the data stream transmitted by the transmitter occupies non-overlapping frequency domain resources, which are orthogonal in the frequency domain, so after passing through the output buffer of the neural network, only a single FFT module is needed to complete the subsequent time domain-frequency domain conversion, demodulation, decoding and other operations.

In the above embodiment, it is described that when the transmitter transmits a plurality of data streams, a single neural network is used to process all the data streams to be processed; or a plurality of neural networks are used, and each neural network processes one data stream to be processed. In another possible implementation, a plurality of neural networks are used, but the number of neural networks is less than the number of data streams to be processed. That is, in this implementation, the number of data streams processed by each neural network is not less than one. Similar to the above embodiment, the input buffer connected to each neural network receives time-domain data from all the IFFT outputs. The processed time domain data output by the output buffer connected to each neural network is summed, and passes through a single FFT module to complete the subsequent time domain-frequency domain conversion, demodulation and decoding.

It should be noted that the case where the transmitter transmits a plurality of data streams orthogonal to each other in the frequency domain described in the above embodiment is also applicable to the case where a plurality of transmitters transmit data, and each transmitter transmits one or more data streams.

In another implementation, it is assumed that the transmitter transmits a plurality of data streams, or that a plurality of transmitters transmit data streams, and different transmitted streams occupy the same time-frequency resources. In this case, the possible receiver structure is shown in FIG. 42.

As shown in FIG. 42, the received signal from each receiving antenna is converted into frequency domain through the FFT module, and the channel estimation is performed respectively. When the channel estimation is completed, the frequency-domain received data stream from each receiving antenna passes through a conventional multi-antenna equalization module to obtain each equalized frequency-domain data stream. Each equalized frequency domain data stream is converted into time domain through IFFT. Each time-domain equalized data stream converted into the time domain is input to the neural network through an input buffer to remove the nonlinear interference introduced by a plurality of transmitters. After the plurality of data streams processed by the neural network pass through the output buffer, each processed data stream undergoes a single FFT and then undergoes subsequent demodulation and decoding.

In consideration of such a case that different data streams occupy the same time-frequency resources, a plurality of FFTs and subsequent demodulation and decoding modules are required to process a plurality of neural network-processed data streams.

In the above implementation, a single neural network is used to process data from a plurality of transmitted streams. In another possible implementation, a plurality of neural networks can be used to process data from the plurality of transmitted streams. The specific implementation is shown in FIG. 43.

The received signal from each receiving antenna is converted into the frequency domain through the FFT module, and the channel estimation is performed respectively. When the channel estimation is completed, the frequency-domain received data stream from each receiving antenna passes through a conventional multi-antenna equalization module to obtain each equalized frequency-domain data stream. Each equalized frequency domain data stream is converted into time domain through IFFT.

Assuming that the number of time-domain data streams that need to be processed is K, in this embodiment, K neural networks are used to process the K time-domain data streams respectively. Each neural network processes the data of one transmitted stream, but the input buffer connected to it receives the time domain data from all IFFT outputs, as shown in FIG. 43. The output of the neural network passes through the output buffer, and undergoes a single FFT to be converted into the frequency domain for subsequent demodulation and decoding operations.

In the above embodiment, it is described that when the transmitter transmits a plurality of data streams, a single neural network is used to process all the data streams to be processed; or a plurality of neural networks are used, and each neural network processes one data stream to be processed. In another possible implementation, a plurality of neural networks are used, but the number of neural networks is less than the number of data streams to be processed. That is, in this implementation, the number of data streams processed by each neural network is not less than one. Similar to the above embodiment, the input buffer connected to each neural network receives time-domain data from all IFFT outputs. The processed time-domain data output by the output buffer connected to each neural network is summed, and passes through the same number of FFT modules as the number of data streams, to complete the subsequent time domain-frequency domain conversion, demodulation and decoding operations.

In another possible implementations, non-linear interference introduced by non-ideal radio frequency devices is more serious, and neural networks with limited simultaneous processing capabilities cannot fully handle such severe non-linear interference. At this time, the performance of the system will be significantly reduced due to residual non-linear interference. At this time, additional modules are needed to help improve the processing performance of the neural network. One possible way is to first calculate the higher-order items of the time-domain signal after obtaining the time-domain signal undergoing equalization and/or multi-antenna processing, and then use the calculated higher-order items as the input signal, which input into the neural network together with the time-domain signal undergoing equalization and/or multiantenna processing, or input into the input buffer connected to the neural network.

FIG. 44 shows a possible implementation, in which the higher-order term calculation is used to calculate the higher-order items of the input signal. A simple example is as follows, the equalized signal after IFFT is denoted as x, then the n-th order item (n is an odd number) is calculated as:

$$x^{(n)} = x|x|^{n-1}$$

where the operation |x| means taking the modulus of x. Some preset parameters are used in the higher-order item calculation module, for example, the highest order that needs to be calculated is set in advance, whether even-numbered items need to be calculated is set in advance, and so on. After the calculation of all higher-order items is completed according to the preset configuration, the obtained higher-order items are used as input, and input into the input buffer of the neural network together with the equalized signal after IFFT, or input directly into the neural network. Specifically, if the highest order that the higher-order item calculation module needs to calculate is N, the signal that enters the input buffer or enters the neural network is x, $x^{(1)}, \ldots, x^{(N)}$.

In another implementation, the order to be calculated is set in advance. For example, the order to be calculated is set in advance by the vector $l=[I_1, I_2, \ldots, I_N]$, where $I_i$, $1 \le i \le N$. One simple example is that, if it is necessary to calculate the odd-order items within N=7, the vector l is expressed as l=[1, 3, 5, 7]. The vector is input into the higher-order item calculation module, and the higher-order item calculation module will calculate the desired higher-order item according to the order indicated in the vector l.

In another possible implementation, the order or the number of the higher-order items to be calculated is determined according to the residual nonlinear interference. For example, after completing training and data processing according to the preset order of higher-order items, the signal-to-interference and noise ratio or residual interference of the processed data is measured, and the measured signal-to-interference and noise ratio and residual interference are compared with preset thresholds. If the measured signal-to-interference and noise ratio is higher than the preset first threshold, or the measured residual interference is lower than the preset second threshold, it means that the training effect of the neural network is very good, and fewer higher-order items can be used for training and data processing. Then in the subsequent training and data processing, the higher-order calculation module calculates less higher-order items. If the measured signal-to-interference and noise ratio is lower than the preset third threshold, or the measured residual interference is higher than the preset fourth threshold, it means that the training effect of the neural network cannot satisfy the performance requirements, and more higher-order items are needed to improve the effectiveness of training. Then in the subsequent training and data processing, the higher-order item calculation module calculates more higher-order items.

A higher-order item calculation module is added before the neutral network, which is applicable to all the receiver implementations described above. For implementations that need to receive output signals from a plurality of IFFTs as input, the output signals from the plurality of IFFTs enter the higher-order item calculation module to calculate the higher-order items of the signals from the plurality of IFFTs, and then input into the subsequent neural network or the input buffer connected to the neural network.

FIG. 18 illustrates a block diagram of receiving apparatus for uplink signal according to an embodiment of the present disclosure.

Referring to FIG. 18, the receiving apparatus 1800 for the uplink signal may include a receiver 1801, a controller 1802, and a transmitter 1803.

The receiving apparatus 1800 for the uplink signal can implement the method for uplink signal reception as described with reference to FIG. 11.

The receiver 1801 can be configured as one of the receivers described with reference to FIGS. 14-17, which is used to receive and process a signal under the control of the controller 1802.

The transmitter 1802 may be configured to transmit a signal under the control of the controller 1802.

The controller 1803 can be a circuit particular integrated circuit or at least one processor. The controller 1802 can be configured to control the overall operation of the receiving apparatus for the uplink signal, and to control the receiving apparatus for the uplink signal to implement the method for uplink signal reception described with reference to FIG. 11.

Optionally, the receiver 1801 of the receiving apparatus 1800 can be implemented in the RX processing circuit 376 as shown in FIG. 3B, the transmitter 1802 may be implemented in the TX processing circuit 374 as shown in FIG. 3B, and the controller 1803 may be implemented in the processor 378 as shown in FIG. 3B.

FIG. 19 illustrates a block diagram of receiving apparatus for downlink signal according to an embodiment of the present disclosure.

Referring to FIG. 19, the receiving apparatus 1900 for the downlink signal may include a receiver 1901, a controller 1902, and a transmitter 1903.

The receiving apparatus 1900 for the downlink signal can implement the method for downlink signal reception as described with reference to FIG. 12.

The receiver 1901 may be configured as one of the receivers described with reference to FIGS. 14-17, which is used to receive and process a signal under the control of the controller 1902.

The transmitter 1903 may be configured to transmit a signal under the control of the controller 1902.

The controller 1902 may be a circuit-particular integrated circuit or at least one processor. The controller 1902 may be configured to control the overall operation of the receiving device for the downlink signal, and to control the receiving apparatus for the downlink signal to implement the method for downlink signal reception described with reference to FIG. 12.

Optionally, the receiver 1901 of the receiving apparatus 1900 may be implemented in the RX processing circuit 310 as shown in FIG. 3A, the transmitter 1902 may be implemented in the TX processing circuit 315 as shown in FIG. 3A, and the controller 1903 may be implemented in the processor 340 as shown in FIG. 3A.

FIG. 20 illustrates a block diagram of transmitting apparatus for uplink signal according to an embodiment of the present disclosure.

Referring to FIG. 20, the transmitting apparatus 2000 for the uplink signal may include a receiver 2001, a controller 2002, and a transmitter 2003.

The transmitting apparatus 2000 for the uplink signal can implement the method for uplink signal transmission as described with reference to FIG. 4.

The receiver 2001 may be configured to receive a signal under the control of the controller 1802.

The transmitter 2002 may be configured to transmit a signal under the control of the controller 1802.

The controller 2003 may be a circuit-particular integrated circuit or at least one processor. The controller 2002 may be configured to control the overall operation of the transmitting apparatus for the uplink signal, and to control the transmitting apparatus for the uplink signal to implement the method for uplink signal transmission as described with reference to FIG. 4.

Optionally, the receiver 2001 of the transmitting apparatus 2000 may be implemented in the RX processing circuit 310 as shown in FIG. 3A, the transmitter 2002 may be implemented in the TX processing circuit 315 as shown in FIG. 3A, and the controller 2003 may be implemented in the processor 340 as shown in FIG. 3A.

FIG. 21 illustrates a block diagram of transmitting apparatus for downlink signal according to an embodiment of the present disclosure.

Referring to FIG. 21, the receiving apparatus 2100 for the downlink signal may include a receiver 2101, a controller 2102, and a transmitter 2103.

The receiving apparatus 2100 for the downlink signal can implement the method for downlink signal transmission as described with reference to FIG. 13.

The receiver 2101 may be configured to receive and process a signal under the control of the controller 2102.

The transmitter 2103 may be configured to transmit a signal under the control of the controller 2102.

The controller 2102 may be a circuit-particular integrated circuit or at least one processor. The controller 2102 may be configured to control the overall operation of the transmitting apparatus for the downlink signal, and to control the transmitting apparatus for the downlink signal to implement the method for downlink signal reception as described with reference to FIG. 13.

Optionally, the receiver 2101 of the transmitting device 2100 may be implemented in the RX processing circuit 376 as shown in FIG. 3B, the transmitter 2102 may be implemented in the TX processing circuit 374 as shown in FIG. 3B, and the controller 2103 may be implemented in the processor 378 as shown in FIG. 3B.

In some embodiments of the present disclosure, a downlink (DL) is a wireless transmission path through which signals are transmitted from the base station to the terminal, and an uplink (UL) is a wireless transmission path through which signals are transmitted from the terminal to the base station. In some embodiments of the present disclosure, considering an application in an Integrated Access and Backhaul (IAB) scenario, an IAB node (e.g., IAB MT or LAB) serves as a relay between an IAB donor (or referred to as an IAB base station or a donor base station) and the terminal. In this case, for ease of description, for signal transmission between the IAB node and the IAB donor, the downlink (DL) can refer to a wireless transmission path through which signals are transmitted from the IAB donor to the IAB node, and the uplink (UL) can refer to a wireless transmission path through which signals are transmitted from the IAB node to the IAB donor. In addition, one or more embodiments of the present disclosure can be applied to 5G wireless communication technologies (5G, New Radio, NR) developed after LTE-A, or applied to new wireless communication technologies proposed based on 4G or 5G (e.g., B5G (Beyond 5G) or 6G).

Wireless communication is one of the most successful innovations in modern history. Recently, the number of subscribers to wireless communication services has exceeded 5 billion, and it continues to grow rapidly. As smart phones and other mobile data devices (for example, tablet computers, laptops, netbooks, e-book readers, and machine-type devices) become increasingly popularized among consumers and enterprises, the demand for wireless data services is growing rapidly. In order to meet rapid growth of mobile data services and support new applications and deployments, it is essential to improve efficiency and coverage of wireless interfaces.

In order to meet an ever-increasing demand for mobile services, new wireless communication technologies (e.g., B5G and 6G) need to be proposed based on 4G or 5G wireless communication systems to further improve transmission rate and throughput of the wireless communication systems. Improvement to duplex technology is an important means to further improve the transmission rate and throughput of the wireless communication systems. Duplex technologies used in existing systems and protocols include Frequency Division Multiplexing (FDM) and Time Division Multiplexing (TDM). However, neither FDM nor TDM can fully utilize available resources, with their resource utilization efficiency less than 50%.

A duplex mode of a conventional communication system is generally a half-duplex mode, which mainly includes a time division duplex (TDD) mode and a frequency division duplex (FDD) mode. The time division duplex mode distinguishes uplink transmission and downlink transmission through time domain, and the frequency division duplex mode distinguishes uplink transmission and downlink transmission through frequency domain. The two half-duplex modes can avoid self-interference between transmission and reception of a same device. However, since only one direction of transmission is allowed on a same time-frequency resource, the half-duplex modes do not have a high utilization rate of spectrum.

In order to improve resource utilization efficiency, a dynamic TDD technology can be used, that is, a transmission direction (uplink or downlink) of each time slot can be flexibly changed according to factors such as traffic data or demand. Configuring the transmission direction of the time slot in a semi-static or dynamic manner can increase flexibility of time-frequency resource configuration, thereby improving performance of the system.

In addition, a full duplex technology can also be used to improve resource utilization efficiency. Unlike conventional half-duplex systems that use time domain (e.g., Time Division Duplex (TDD)) or frequency domain (e.g., Frequency Division Duplex (FDD)) orthogonal divisions for uplink and downlink, a full-duplex system can allow the uplink (UL) and downlink (DL) of a communication device (e.g., a terminal) to be transmitted simultaneously on a same resource, that is, simultaneous co-frequency transmission is allowed. Because the full-duplex system uses the same time-frequency resource for transmission and reception, the spectrum efficiency is effectively improved. In theory, a full-duplex system can achieve twice the throughput or spectrum utilization of a half-duplex system. However, when the uplink and downlink are simultaneously co-frequency, transmitted signal of the full-duplex system will cause strong self-interference to a received signal. In some cases, a self-interference signal can even be about 120 dB higher than noise floor. Therefore, in order for the full-duplex system to work, self-interference needs to be cancelled, so that strength of the self-interference signal is at least reduced to a same level as the noise floor.

A self-interference cancellation method can include antenna self-interference cancellation, radio frequency self-interference cancellation, and digital domain self-interference cancellation. A core issue of the digital domain self-interference cancellation is how to accurately estimate a self-interference channel and reconstruct a self-interference signal in the presence of non-ideal characteristics of components (e.g., hardware components). Since the self-interference signal is more than 100 dB higher than the receiver noise floor, any non-ideal characteristics of components that are negligible in conventional channel estimation cannot be neglected in channel estimation of a full-duplex system. Two most influential non-ideal characteristics of components are a non-ideal characteristic of a Power Amplifier (PA) and a synchronization error (or referred to as a fractional synchronization error) caused by a fractional sampling interval used for receiver sampling.

The non-ideal characteristic of PA is manifested in two aspects. In one aspect, an output power of any PA cannot be infinite; and within a dynamic range of the PA, a ratio of the output power to an input power of the PA is approximately constant, that is, an output signal and an input signal show a linear relationship. When the input power of the PA continues to increase, it will enter a saturation zone of the PA, wherein the ratio of the output power to the output power is no longer constant, that is, the output signal and the input signal show a non-linear relationship. In the communication system, from a perspective of PA utilization rate, a power of the input signal is usually made to be close to an upper limit of the PA dynamic range. Therefore, in addition to a linear component that is proportional to the input signal, there is a nonlinear component having a relatively small power in the output signal. For remote reception, the power of this nonlinear component can be ignored; but for a self-interference signal, since the self-interference signal is tens of dB or even more than 100 dB higher than the noise floor, even the power of the PA nonlinear component is far less than that of the PA linear component, its absolute power can still be higher than the noise floor power. Therefore, if the non-linear component is not considered during self-interference cancellation, it will affect self-interference cancellation ability, and further affect normal communication performance. In the other aspect, since an actual charging and discharging process of the PA cannot be completed instantaneously, if an amplitude of time-domain waveform of the input signal changes quickly, the PA will not output a low (or high) level transient signal immediately after outputting a high (or low) level transient signal, which causes the PA to have memory, that is, an output at each moment depends on the levels (high level or low level) at several previous moments.

The synchronization error caused by the fractional sampling interval used for receiver sampling can occur when an ADC (Analog-Digital Convertor) module of the receiver performs digital-to-analog conversion. When performing analog-to-digital conversion, the ADC samples received analog signals at a fixed sampling rate. Generally, instability of the sampling rate can be ignored, but there can be a time error of the fractional sampling interval at the time of sampling, that is, a time error less than one sampling interval. This results in a time deviation between the self-interference signal received by the receiver and a local reference signal used for self-interference cancellation, which in turn affects accuracy of self-interference channel estimation and accuracy of subsequent self-interference signal reconstruction.

Generally, if these non-ideal characteristics are mathematically modeled and then estimated and processed by using a conventional signal processing method, complexity will be very high. In addition, some non-ideal characteristics can not be modeled, thereby affecting a result of self-interference cancellation.

In order to solve at least the above problems, at least one embodiment of the present disclosure proposes a method and apparatus for configuring resources for training when a communication device (e.g., a base station or an JAB base station) trains its receiver (for example, when it trains a model corresponding to the receiver (e.g., a machine learning model)), to facilitate communication between the communication device and another communication device (e.g., a terminal or an IAB node).

In order to solve at least the above problems, at least one embodiment of the present disclosure proposes a method for self-interference cancellation using a machine learning model (e.g., a neural network) for self-interference signal reconstruction that can be used to fit a system that cannot be simply modeled.

In order to solve at least the above problems, to ensure that the communication device (e.g., a base station or an IAB base station) that uses the machine learning model (e.g., a neural network) for self-interference signal construction can be protected from interference of transmission of another communication device (e.g., a terminal or an IAB node), at least one embodiment of the present disclosure proposes a method for configuring resources for training with a machine model for self-interference signal construction in the communication device (e.g., a base station or an IAB donor), so that the communication device (e.g., a base station or an IAB donor) can use the machine learning model (e.g., a neural network) for training.

In an embodiment of the present disclosure, resources can include one or more of: time resource (e.g., subframe, symbol, or time slot), frequency resource (e.g., subchannel or subcarrier of designated bandwidth), or a combination of time resource and frequency resource (which can be referred to as a time-frequency resource).

Exemplary embodiments of the present disclosure are further described below with reference to the accompanying drawings.

Text and drawings are provided as examples only to help understand the present disclosure, and should not be construed as limiting the scope of the present disclosure in any way. Although certain embodiments and examples have been provided, based on the content disclosed herein, it is obvious to those skilled in the art that the embodiments and examples shown can be changed without departing from the scope of the present disclosure.

FIG. 27 shows a schematic diagram of self-interference generation of a communication device operating in a full-duplex mode according to some embodiments of the present disclosure. In FIG. 27, the communication device 270 can include one of a terminal, a base station, a backhaul link node, a relay link node, or any other full-duplex device. For example, the communication device 270 can include one of an IAB node, an IAB access point, or an IAB donor.

For example, in the full-duplex mode, the communication device 270 can simultaneously perform data signal transmission and reception on the same time-frequency resource.

Referring to FIG. 27, due to self-interference of transmitted signal, signals received by the communication device 270 operating in the full-duplex mode can include a self-interference signal and a received signal.

It should be noted that in the embodiments of the present disclosure, if not otherwise defined, for ease of description, the transmitted signal can refer to a signal transmitted to another communication device through a communication link, and the received signal can refer to a signal received from another communication device through a communication link. In addition, the self-interference signal can refer to interference of the transmitted signal to the received signal.

For example, in a case where the communication device 270 as a terminal communicates with a base station, the received signal can refer to a signal received by the terminal from the base station through a downlink, and the transmitted signal can refer to a signal transmitted by the terminal to the base station through a UL.

For example, in a case where the communication device 270 as a base station communicates with a terminal, the received signal can refer to a signal that the base station receives from the terminal through a UL, and the transmitted signal can refer to a signal that the base station transmits to the terminal through a downlink.

It should be noted that in some of the embodiments described below, configuration of uplink resources and transmission of uplink signals are considered in the case of communication between a terminal and a base station operating in a full-duplex mode. However, it is obvious to those skilled in the art that these embodiments, after modified slightly, can also be used in the communication between the IAB base station and the IAB node. In this case, the IAB base station is functionally similar to the base station, and the IAB node is functionally similar to the terminal.

When the base station operating in the full-duplex mode performs self-interference cancellation, the self-interference signal needs to be reconstructed. In some embodiments, the base station can use a machine learning model (e.g., a neural network) to reconstruct the self-interference signal. Before using the machine learning model (e.g., the neural network) to reconstruct the self-interference signal, in order to make the machine learning model more accurately reconstruct the self-interference signal, the machine learning model (e.g., the neural network) needs to be trained.

In the embodiments of the present disclosure, for ease of description, training resources can refer to resources related to the training of the communication device, and can be used interchangeably with the term "training-related resources". For example, training resources can refer to resources used when the receiver of the communication device is trained. In some examples, in a case where the model used for the receiver is a machine learning model (e.g., a neural network) and the machine learning model is used to reconstruct the self-interference signal, the training resources can refer to resources for training of the machine learning model (e.g., the neutral network) used to reconstruct the self-interference signal. It should be noted that although the definition of "training resources" as described above is adopted in description of some of the embodiments of the present disclosure, the embodiments of the present disclosure are not limited thereto, for example, the "training resources" (or "training-related resources") can refer to resources related to any proper training of the base station.

In order to ensure that the base station can train the machine learning model (e.g., the neural network) used to reconstruct the self-interference signal without interference from the transmission of the terminal, it is necessary to reasonably configure a UL resource.

According to some embodiments of the present disclosure, there is provided a method for UL resource configuration and UL signal transmission. By using this method, it can be ensured that the training of the machine learning model (the neural network) is not interfered by any UL signal when the base station needs to train the machine learning model (e.g., the neural network). The method for UL resource configuration and UL signal transmission according to some embodiments of the present disclosure will be described below with reference to FIGS. 28-29.

FIG. 28 shows a flowchart of a UL signal transmission method according to at least one embodiment of the present disclosure.

Referring to FIG. 28, in operation S2810, a terminal obtains training resource configuration information from a base station, and the training resource configuration information indicates one or more training resources.

In some embodiments, the training resource configuration information indicates one or more training resources used when a receiver of the base station is trained. For example, the training resource configuration information indicates one or more training resources used when the base station operating in a full-duplex mode trains a machine learning model (e.g., a neural network) used to reconstruct a self-interference signal.

In some embodiments, the terminal can obtain the training resource configuration information from the base station through system information or higher-layer signaling. The higher-layer signaling can include, for example, RRC (Radio Resource Control) signaling and/or MAC (Media Access Control) signaling.

In some embodiments, the terminal can obtain the training resource configuration information from the base station through physical layer signaling. The physical layer signaling can include DCI (Downlink Control Information) carried by a PDCCH (Physical Downlink Control Channel) and/or control signaling carried by a PDSCH (Physical Downlink Shared Channel).

Next, in operation S2820, the terminal determines the one or more training resources according to the obtained training resource configuration information. For example, the terminal can determine a resource location (time domain location and/or frequency domain location) where the base station trains the machine learning model (e.g., the neural network) based on the training resource configuration information.

Then, in operation 52830, the terminal does not perform UL transmission on at least one of the one or more training resources. For example, the terminal does not perform the configured UL transmission on the resource location where the base station trains the machine learning model (e.g., the neural network). That is, the terminal can regard at least one of the one or more training resources as an invalid UL resource, and the terminal only performs UL transmission on resources other than the invalid UL resource.

In some embodiments, the UL transmission can include transmission of a physical channel and/or transmission of a physical signal. For example, the physical channel can include at least one of: a physical uplink shared channel, a physical uplink control channel, or a physical random access channel. For example, the physical signal can include at least one of: a demodulation reference signal of a physical uplink shared channel, a demodulation reference signal of a physical uplink control channel, a sounding reference signal, or a phase tracking reference signal.

In some embodiments, if the training resources (e.g., periodic training resources or aperiodic training resources) obtained by the terminal overlap (partially or completely overlap) with random access resources obtained by the terminal from a system message, the terminal determines that random access resources not overlapping with the training resources are valid. The terminal randomly selects a random access resource from among the valid random access resources for transmission of a random access preamble sequence; if the training resources (e.g., periodic training resources or aperiodic training resources) obtained by the terminal and the random access resources configured by the terminal in higher-layer signaling at least partially overlap (partially or completely overlap), then the terminal does not transmit the random access preamble sequence on overlapping random access resources.

In some embodiments, if the training resources (e.g., periodic training resources or aperiodic training resources) overlap (partially or completely overlap) with SRS (Sounding Reference Signal) resources configured by the base station for the terminal, the terminal does not transmit an SRS on resources, which overlap with the periodic training resource or aperiodic training resource, among the SRS resources.

In some embodiments, if the training resources (e.g., periodic training resources or aperiodic training resources) overlap (partially or completely overlap) with PUCCH or PUSCH resources that the base station has configured for the terminal, the terminal can be configured to perform puncturing transmission on resources that overlap with the training resources; that is, after the PUCCH or PUSCH resources are mapped to one or more of the resources that overlap with the training resources, the terminal sets a signal amplitude on the mapped one or more resources to 0.

In some embodiments, if the training resources (e.g., periodic training resources or aperiodic training resources) overlap (partially or completely overlap) with the PUCCH or PUSCH resources that the base station has configured for the terminal, the terminal can be configured to report all UL control information or transmit all UL data on resources, which do not overlap with the training resources, among the same PUCCH or PUSCH resources.

In some embodiments, if the training resources (e.g., periodic training resources or aperiodic training resources) overlap (partially or completely overlap) with the PUCCH or PUSCH resources that the base station has configured for the terminal, then: for UL control information in a PUCCH resource that overlaps with the training resources, the terminal can be configured not to report the UL control information on the overlapping PUCCH resource and to report the UL control information on a next non-overlapping PUCCH resource; for UL control information in a PUSCH resource that overlaps with the training resources, the terminal can be configured not to report the UL control information on the overlapping PUSCH resource and to report the UL control information on a next non-overlapping PUSCH resource; or, for UL data in a PUSCH resource that overlaps with the training resources, the terminal can be configured not to transmit the UL data on the overlapping PUSCH resource and to transmit the UL data on a next non-overlapping PUSCH resource.

In some embodiments, if the training resources (e.g., periodic training resources or aperiodic training resources) overlap (partially or completely overlap) with the PUCCH or PUSCH resources that the base station has configured for the terminal, the terminal can be configured not to transmit (or discard) UL control information that is not reported because of overlapping with the training resources or UL data that is not transmitted because of overlapping with the training resources. According to the embodiments of the present disclosure, since the terminal only performs UL transmission on resources other than the training resources determined to be used by the base station to train the machine learning model (e.g., the neural network), it is possible to avoid the influence or interference of the UL transmission on the training of the machine learning model (e.g., the neural network), so as to ensure that the machine learning model (e.g., the neural network) can be effectively trained. Since the machine learning model (e.g., the neural network) for self-interference signal reconstruction can be well trained, the machine learning model (e.g., the neural network) can more accurately reconstruct the self-interference signal when performing self-interference cancellation, so that the base station can perform self-interference cancellation more effectively.

In some embodiments, the training resource configuration information includes at least one of: training activation indication information, periodic training resource indication information, periodic training resource information, or aperiodic training resource information.

In some examples, the periodic training resource information is related to the periodic training resource and is used to indicate the location of the periodic training resource. The periodic training resource can refer to a periodic training resource used by the base station when training its receiver (for example, a model corresponding to the receiver (e.g., a machine learning model, such as a neural network)). In some examples, there can be at least one periodic training resource information, wherein each of the at least one periodic training resource information provides a corresponding periodic training resource. Thus, by configuring the at least one periodic training resource information, the base station can semi-statically configure at least one candidate periodic training resource to the terminal.

In some examples, the periodic training resource indication information is used to indicate a periodic training resource information which is actually applied (or to be used) among the configured at least one periodic training resource information. As described above, the base station can configure the at least one periodic training resource, and can determine the periodic training resource information which is actually applied (or to be used) from the at least one periodic training resource. The base station can use the periodic training resource indication information to indicate the periodic training resource information which is actually applied (or to be used). The terminal can determine the periodic training resource information which is actually applied (or to be used) based on the periodic training resource indication information.

In some examples, the training activation indication information is used to indicate whether to activate the indicated periodic training resource information which is actually applied. Or, the training activation indication information can be used to indicate whether to activate the periodic training resource indicated by the indicated periodic training resource information which is actually applied. For example, when the training activation indication information indicates to activate the indicated periodic training resource information which is actually applied (or indicates to activate the periodic training resource indicated by the periodic training resource information), the terminal determines that the periodic training resource indicated by the periodic training resource information which is actually applied shall be used for training, and UL transmission will not be performed on the periodic training resource indicated by the periodic training resource information which is actually applied. On the contrary, when the training activation indication information indicates that the indicated periodic training resource information which is actually applied is not activated (or indicates that the periodic training resource indicated by the periodic training resource information is deactivated), the terminal determines the periodic training resource indicated by the periodic training resource information which is actually applied shall be used for training, and UL transmission can be performed on the periodic training resource indicated by the periodic training resource information which is actually applied. According to some embodiments of the present disclosure, the periodic training resource information which is actually applied can refer to a periodic training resource information corresponding to the periodic training resource to be used for training by the base station.

In some examples, the aperiodic training resource information is related to the aperiodic training resource and is used to indicate the location of the aperiodic training resource. For example, the aperiodic training resource can refer to an aperiodic training resource used by the base station when training its receiver (for example, a model corresponding to the receiver (e.g., a machine learning model, such as a neural network)).

The following describes some embodiments of possible content and methods for obtaining each of the training activation indication information, periodic training resource indication information, periodic training resource information, or aperiodic training resource information.

In some embodiments, the periodic training resource information is related to the periodic training resource. The periodic training resource information can be used to indicate a time domain location and/or a frequency domain location of the periodic training resource. For example, the periodic training resource information can include information on the time domain location of the periodic training resource and/or information on the frequency domain location of the periodic training resource.

In some examples, the information on the frequency domain location of the periodic training resource can include information on a start resource block sequence number of the periodic training resource in a system bandwidth and a number of occupied resource blocks. That is, the frequency domain location of the periodic training resource can be obtained by the terminal in the form of the start resource block sequence number of the periodic training resource in the system bandwidth and the number of occupied resource blocks. Based on the start resource block sequence number and the number of occupied resource blocks, the terminal can obtain the frequency domain location of the periodic training resource.

In other examples, the information on the frequency domain location of the periodic training resource can include a bitmap related to the frequency domain location of the periodic training resource. In other words, the frequency domain location of the periodic training resource can be obtained by the terminal in the form of a bitmap. Coverage of the bitmap can be an entire system bandwidth, and granularity of the bitmap can be several resource blocks. In a particular example, if the system bandwidth has 40 resource blocks and the granularity of the bitmap is 4 resource blocks, then the bitmap "1111000000" can indicate that the frequency domain location of the periodic training resource is 16 resource blocks with a lowest frequency in the system bandwidth.

The method for obtaining the frequency domain location of the periodic training resource described above is only an example, and the frequency domain location of the periodic training resource can also be obtained by the terminal in other ways that can exclusively determine the frequency domain location. If the periodic training resource information does not include information indicating the frequency domain location, the terminal can determine by default that the periodic training resource occupies the entire system bandwidth.

In some embodiments, the information on the time domain location of the periodic training resource can include information on a period of the periodic training resource and information on the time domain location in the period. For example, the period can be in units of half-slot, slot, half-subframe, sub-frame, half-frame, radio frame, or time, and the terminal determines by default that a system frame number of an initial frame of the period is 0.

In some examples, the information on the time domain location in the period can include duration of the periodic training resource. That is to say, the time domain location information in the period can be obtained by the terminal in the form of the duration of the periodic training resource, wherein the duration can be in units of half-slot, slot, half-subframe, sub-frame, half-frame, radio frame or time, and the terminal determines by default that a location of a first time slot of the periodic training resource coincides with a location of a first time slot in the period.

In other examples, the information on the time domain location in the period can include a bitmap related to the time domain location of the periodic training resource. In other words, the information on the time domain location in the period can be obtained by the terminal in the form of a bitmap. Coverage of the bitmap can be a period of the periodic training resource (can be referred to as a training period). Granularity of the bitmap can be a half slot, a slot, a half subframe, a subframe, a half frame, or a radio frame. For example, a bit with a value of "1" in the bitmap indicates that the time domain resource corresponding to this bit in the period is a training resource. In a particular example, if there are 10 time slots in a period, and the bitmap granularity is a time slot, then the bitmap "1111000000" indicates that first 4 time slots in the period are used for training. In another specific example, if there are 10 time slots in a period, and the bitmap granularity is a half time slot, the bitmap "11111111000000000000" indicates that first 4 time slots in the period are used for training.

In some embodiments, the periodic training resource information can be obtained through system information or higher-layer signaling. The periodic training resource information as a non-dynamic parameter can be obtained through the higher-layer signaling. When the periodic training resource information is obtained through the system information, the terminal can obtain the training resource of the base station for training during initial access, and avoid the training resource, thereby further reducing a possibility of the training resource conflicting with the resource used for UL transmission.

The method for obtaining the time domain location of the periodic training resource described above is only an example, and the time domain location of the periodic training resource can also be obtained by the terminal in other ways that can exclusively determine the time domain location.

In some embodiments, the terminal can determine by default that a maximum of $$N_{periodicResource}^{max}$$

periodic training resource information are transmitted (or configured) by the base station, where $$N_{periodicResource}^{max}$$

is a constant. The value of $$N^{max}_{periodicResource}$$

can be obtained through system information, can be obtained through higher-layer signaling, or can be a default value known to both the base station and the terminal (for example, through a specification). Different periodic training resource information can have different periods and locations within periods (time domain locations and/or frequency domain locations). The base station configures at least one periodic training resource information for the terminal to achieve an effect of training period switching. For example, when the training content of the base station has strong time variability, the base station can apply periodic training resource information corresponding to a periodic training resource with a shorter training period; and when the training content of the base station has weak time variability, the base station can apply periodic training resource information corresponding to a periodic training resource with a longer training period.

In some embodiments, the periodic training resource indication information can be a binary field with a length of $$\lceil \log_2(N^{max}_{periodicResource}) \rceil,$$

and a decimal value of the binary field can indicate a serial number of periodic training resource information to be used.

$$N^{max}_{periodicResource}$$

can represent a maximum number of periodic training resource information transmitted (or configured) by the base station, and is a constant. In a particular example, if the terminal is configured with 5 periodic training resource information, the length of the periodic training resource indication information is 3 bits. In this example, a field value "100" means that the periodic training resource information to be used is periodic training resource information numbered 4, and a field value "011" means that the periodic training resource information to be used is periodic training resource information numbered 3, and so on. In some embodiments of the present disclosure, the periodic training resource information to be used (or actually applied) can correspond to the periodic training resource to be used (or actually applied).

In some embodiments, the periodic training resource indication information can be a bitmap with a length of $$N^{max}_{periodicResource}.$$

$$N^{max}_{periodicResource}$$

can represent a maximum number of periodic training resource information transmitted (or configured) by the base station, and is a constant. The periodic training resource information corresponding to a bit whose value is "1" in the bitmap is the periodic training resource information which is actually applied. In a particular example, if the terminal is configured with 5 periodic training resource information, then the bitmap "10000" indicates that the periodic training resource information to be used is periodic training resource information numbered 0, and the bitmap "01000" indicates that the periodic training resource information to be used is periodic training resource information numbered 1, and so on.

In some embodiments, the periodic training resource indication information can be obtained through system information, higher-layer signaling, or physical layer signaling (for example, DCI). The periodic training resource indication information as a non-dynamic parameter can be obtained through the higher-layer signaling. When the periodic training resource indication information is obtained through the system information or higher-layer signaling, the terminal can obtain the training resource of the base station for training during initial access, and avoid the training resource, thereby further reducing a possibility of the training resource conflicting with the resource used for UL transmission. When the periodic training resource indication information is obtained through the physical layer signaling (for example, DCI), the periodic training resource information can be switched dynamically without re-transmitting the system information or higher-layer signaling to the terminal to indicate the switching, thereby saving signaling overhead and efficiently perform periodic resource information switching.

In some embodiments, the training activation indication information can be a binary field with a size of 1 bit. In some examples, a field value of the training activation indication information is "0", which means that the applied periodic training resource information is not activated, and the terminal can perform configured UL transmission on the trained resource according to scheduling authorization or configuration. In some examples, a field value of the training activation indication information is "1", which means that the applied periodic training resource information is activated, and the terminal cannot perform the configured UL transmission on the resource indicated by the applied periodic training resource information. The training activation indication information can be obtained through system information, higher-layer signaling, or physical layer signaling (for example, downlink control information (DCI)). By obtaining the training activation indication information through the physical layer signaling (for example, downlink control information (DCI)), dynamic activation and deactivation of the training resource can be implemented. The field values of the training activation indication information described above are only examples, and any suitable field value can be used to indicate whether to activate or deactivate the corresponding periodic training resource information.

In some embodiments, all of periodic training resource information, periodic training resource indication information, and training activation indication information can be configured. The following describes a particular example of behavior of the terminal with respect to the resource indicated by the periodic training resource information when the periodic training resource information, the periodic training resource indication information, and the training activation indication information are jointly used to indicate. For example, assuming a configuration as follows: the maximum number $$N^{max}_{periodicResource}$$

of periodic training resource information that the base station can configure for the terminal is 4, and the base station configures 3 periodic training resource information for the terminal, including first periodic training resource information, second periodic training resource information and third periodic training resource information, which are used to configure 3 candidate periodic training resources for the terminal, including a first periodic training resource, a second periodic training resource, and a third periodic training resource, wherein a period of the first periodic training resource indicated by the first periodic training resource information is 10 time slots, a period of the second periodic training resource indicated by the second periodic training resource information is 20 time slots, and a period of the third periodic training resource indicated by the third periodic training resource information is 40 time slots, and a full bandwidth resource of a first time slot in the period of the periodic training resource indicated by each periodic training resource information is used for training; the periodic training resource indication information is a bitmap with a size of 4 and the value of the bitmap is "1000", indicating that the periodic training resource information which is actually applied by the terminal is the periodic training resource information corresponding to the periodic training resource with a period of 10 time slots (that is, the first periodic training resource information); the training activation indication information (for example, a value of the training activation indication information is "1") indicates the terminal that the periodic training resource information corresponding to the periodic training resource with a period of 10 time slots (that is, the first periodic training resource information) is activated. After the receiving the information, the terminal determines not to perform UL signal transmission in the first time slot of the corresponding period every 10 time slots. Assuming that after certain time (for example, 1 second), the base station needs to train with 20 time slots as a period, then the base station will set the value of the bitmap of the periodic training resource indication information to "0100", and after receiving this configuration, the terminal determines not to perform UL signal transmission in the first time slot of the corresponding period every 20 time slots. Assuming that after certain time (for example, 1 second), the base station no longer needs to train, then the base station will indicate to deactivate the corresponding training resource through the training activation indication information (for example, the value of the training activation indication information is set to "0"), and after the terminal receives the training activation indication information, the terminal no longer needs to avoid the training resource when performing the UL transmission. When the periodic training resource information, the periodic training resource indication information, and the training activation indication information are jointly used to indicate, the terminal can flexibly determine whether to use the training resource based on whether the corresponding training resource is activated. In this way, on the one hand, it can be ensured that no uplink transmission is performed on the training resource. On the other hand, since the training resource can be dynamically deactivated to be used by the terminal, a utilization rate of resource can be improved.

In some embodiments, the training resource configuration information can include aperiodic training resource information. For example, in addition to periodically or semi-statically configured training resources, the terminal can also receive occasional aperiodic training resource information. The aperiodic training resource information can include information on a time domain location of an aperiodic training resource and/or information on a frequency domain location of the aperiodic training resource.

In some examples, the information on the frequency domain location of the aperiodic training resource can include a start resource block sequence number of the aperiodic training resource in a system bandwidth and a number of occupied resource blocks. That is, the frequency domain location of the aperiodic training resource can be obtained by the terminal in the form of the start resource block sequence number of the aperiodic training resource in the system bandwidth and the number of occupied resource blocks. Or, the information on the frequency domain location of the aperiodic training resource can include a bitmap related to the frequency domain location of the aperiodic training resource. That is to say, the information on the frequency domain location of the aperiodic training resource can be obtained by the terminal in the form of a bitmap. The method for obtaining the frequency domain location of the aperiodic training resource described above is only an example, and the frequency domain location of the aperiodic training resource can also be obtained by the terminal in other forms that can exclusively determine the frequency domain location. If the frequency domain location is not included in the aperiodic training resource information, the terminal determines by default that the aperiodic training resource occupies the entire system bandwidth.

In some examples, the information on the time domain location of the aperiodic training resource can include a time delay and duration relative to time when the aperiodic training resource information is received. That is, the time domain location of the aperiodic training resource can be obtained by the terminal in the form of a delay and duration relative to the time when the aperiodic training resource information is received. For example, the time delay can be in units of OFDM symbol, half slot, slot, half subframe, subframe, half frame, frame, or time, and the duration can be in units of half slot, slot, half subframe, subframe, half frame, frame or time. Or, the information on the time domain location of the aperiodic training resource can include a time domain location and duration of a first half-slot of the aperiodic training resource. In other words, the time domain location of the aperiodic training resource can be obtained by the terminal in the form of the time domain location and duration of the first half-slot of the aperiodic training resource, wherein the time domain location of the first half-slot of the aperiodic training resource can be determined by a half-slot sequence number in the time slot where the half-slot is located, a time slot sequence number in the subframe where the time slot is located, a subframe sequence number in the radio frame where the subframe is located, and the system frame number of the wireless frame where it is located, wherein the duration can be in units of half slot, slot, half subframe, subframe, half frame, frame or time.

In some examples, the aperiodic training resource information can be obtained from system information, higher-layer signaling, or physical layer signaling (for example, downlink control information (DCI)).

Some embodiments of possible content and methods for obtaining each of the training activation indication information, periodic training resource indication information, periodic training resource information, or aperiodic training resource information are described above. It should be noted that the embodiments of the present disclosure are not limited thereto, and any suitable method can be used to implement configuration of each of the training activation indication information, periodic training resource indication information, periodic training resource information, or aperiodic training resource information.

FIG. 29 shows a flowchart of a UL signal transmission method according to at least one embodiment of the present disclosure.

In the embodiment shown in FIG. 29, the terminal determines invalid resources and performs UL transmission according to the obtained training resource configuration information. Various operations performed by the terminal in FIG. 29 are described in detail below.

Referring to FIG. 29, in operation S2902, the terminal obtains training resource configuration information. For example, the training resource configuration information can include one or more periodic training resource information and periodic training resource indication information. For various implementations of the periodic training resource information and periodic training resource indication information, reference can be made to the previous description.

Next, according to the periodic training resource information in the obtained training resource configuration information and the periodic training resource indication information in the obtained training resource information, the periodic training resource information which is actually applied is determined. For example, in operation S2904, the terminal determines whether a number of periodic training resource information which is actually applied among the training resource configuration information indicated by the periodic training resource indication information is equal to a predetermined number (e.g., 1). If the number of periodic training resource information is not equal to the predetermined number (e.g., 1), the terminal does not apply any periodic training resource information (S2906), and can further determine whether the aperiodic training resource information is configured (S2916); otherwise, if the number of the periodic training resource information is equal to the predetermined number (e.g., 1), the terminal applies the periodic training resource information indicated by the periodic training resource indication information (S2908).

In some embodiments, the periodic training resource indication information can be used to indicate one periodic training resource information which is actually applied among the one or more periodic training resource information. In some cases, the periodic training resource indication information transmitted by the base station cannot be correctly received by the terminal (for example, decoding failure due to reasons such as interference, etc.), so the terminal may determine a plurality of periodic training resource information which are actually applied based on the periodic training resource indication information, for example, in a case of implementing periodic training resource indication information by means of a bitmap. Therefore, it is necessary to determine whether the periodic training resource indication information is correctly received or decoded. According to some embodiments of the present disclosure, by determining whether the number of periodic training resource information actually applied (which are determined based on the periodic training resource indication information) is equal to a predetermined number, it can be determined whether the periodic training resource indication information is correctly received or decoded, thereby ensuring accuracy of indications of the training resources. In operation S2910, the terminal determines the time domain location and/or frequency domain location of the periodic training resource according to the periodic training resource information which is actually applied in operation S2908.

In operation S2912, the terminal obtains training activation indication information from the obtained training resource information. In operation S2914, based on the training activation indication information, the terminal determines whether the periodic resource information actually applied is activated. If the periodic resource information actually applied is activated, the terminal determines a training resource indicated by the periodic resource information (S2918); otherwise, if the periodic resource information actually applied is not activated, the terminal can determine whether aperiodic training resource information is configured (S2916).

After the training resource indicated by the periodic resource information actually applied is determined in the operation S2918, the terminal can determine whether the aperiodic training resource information is configured in operation S2920. If it is determined in the operation S2920 that the aperiodic training resource information is configured, the terminal determines an aperiodic training resource based on the aperiodic training resource information (S2924), and does not perform UL transmission on the periodic training resource and the aperiodic training resource (S2926); otherwise, if it is determined in the operation S2920 that the aperiodic training resource information is not configured, the terminal does not perform UL transmission on the periodic training resource (S2922).

After the operation S2906, the terminal can determine whether the aperiodic training resource information is configured in the operation S2916. If it is determined that the aperiodic training resource information is configured, the terminal determines the aperiodic training resource (S2930), and the terminal does not perform UL transmission on the determined aperiodic training resource (S2932); otherwise, if it is determined that the aperiodic training resource information is not configured, the terminal performs normal UL transmission according to scheduling or configuration (S2928).

In some embodiments, operation S2940 can be omitted. In this case, after the terminal obtains the training resource configuration information, it determines by default that the training resource configuration information has been correctly received or decoded, and the operation S2908 is further performed.

In some embodiments, if the training activation indication information indicates that the periodic resource information actually applied is activated and the terminal has been configured to be able to perform UL transmission on a resource that overlaps with the periodic training resource before obtaining the training activation indication information, the terminal starts from a next training period after the training activation indication information is obtained, and no UL transmission is performed on the periodic training resource.

In some embodiments, if the terminal is configured with the aperiodic training resource information through system information, higher-layer signaling, or physical layer signaling (for example, downlink control information (DCI)), the terminal determines a location of the aperiodic training resource according to the aperiodic training resource information.

In some embodiments, if the terminal has been configured to perform UL transmission on the resource that overlaps with the aperiodic training resource before obtaining the aperiodic training resource information, the terminal will not perform the UL transmission on the aperiodic training resource after obtaining the aperiodic training resource information. The terminal determines by default that the aperiodic training resource information received each time is not periodic or semi-continuous.

In some embodiments, if the training resources (e.g., periodic training resources or aperiodic training resources) obtained by the terminal overlap (partially or completely overlap) with random access resources obtained by the terminal from a system message, the terminal determines that random access resources not overlapping with the training resources are valid. The terminal randomly selects a random access resource from among the valid random access resources for transmission of a random access preamble sequence; if the training resources (e.g., periodic training resources or aperiodic training resources) obtained by the terminal and the random access resources configured to the terminal in higher-layer signaling at least partially overlap (partially or completely overlap), then the terminal does not transmit the random access preamble sequence on overlapping random access resources.

In some embodiments, if the training resources (e.g., periodic training resources or aperiodic training resources) overlap (partially or completely overlap) with SRS (Sounding Reference Signal) resources configured by the base station for the terminal, the terminal does not transmit an SRS on resources, which overlap with the periodic training resource or aperiodic training resource, among the SRS resources.

In some embodiments, if the training resources (e.g., periodic training resources or aperiodic training resources) overlap (partially or completely overlap) with PUCCH or PUSCH resources that the base station has configured for the terminal, the terminal can be configured to perform puncturing transmission on resources that overlap with the training resources; that is, after the PUCCH or PUSCH resources are mapped to one or more of the resources that overlap with the training resources, the terminal sets a signal amplitude on the mapped one or more resources to 0.

In some embodiments, if the training resources (e.g., periodic training resources or aperiodic training resources) overlap (partially or completely overlap) with the PUCCH or PUSCH resources that the base station has configured for the terminal, the terminal can be configured to report all UL control information or transmit all UL data on resources, which do not overlap with the training resources, among the same PUCCH or PUSCH resources.

In some embodiments, if the training resources (e.g., periodic training resources or aperiodic training resources) overlap (partially or completely overlap) with the PUCCH or PUSCH resources that the base station has configured for the terminal, then: for UL control information in PUCCH resource that overlaps with the training resources, the terminal can be configured not to report the UL control information on the overlapping PUCCH resource and to report the UL control information on a next non-overlapping PUCCH resource; for UL control information in a PUSCH resource that overlaps with the training resources, the terminal can be configured not to report the UL control information on the overlapping PUSCH resource and to report the UL control information on a next non-overlapping PUSCH resource; or, for UL data in a PUSCH resource that overlaps with the training resources, the terminal can be configured not to transmit the UL data on the overlapping PUSCH resource and to transmit the UL data on a next non-overlapping PUSCH resource.

In some embodiments, if the training resources (e.g., periodic training resources or aperiodic training resources) overlap (partially or completely overlap) with the PUCCH or PUSCH resources that the base station has configured for the terminal, the terminal can be configured not to transmit (or discard) UL control information that is not reported because of overlapping with the training resources or UL data that is not transmitted because of overlapping with the training resources. An example of the UL signal transmission method according to the embodiment of the present disclosure is described above. According to the embodiment of the present disclosure, the behavior of the terminal when there are training resources is clarified, to avoid invalid communication in some of the training resources, so as to improve communication efficiency of the terminal. In addition, in some embodiments, since the terminal only performs UL transmission on resources other than the training resources determined to be used by the base station to train the machine learning model (e.g., the neural network), it is possible to avoid the influence or interference of the UL transmission on the training of the machine learning model (e.g., the neural network), so as to ensure that the machine learning model (e.g., the neural network) can be effectively trained.

It needs to be noted that although FIG. 29 shows the UL signal transmission method according to the embodiment of the present disclosure in a specific order, the embodiment of the present disclosure is not limited to the order shown in the drawing. For example, the operations in FIG. 29 can be performed in any suitable order. In addition, some of the operations shown in the drawing can be omitted or additional operations can be added.

It should also be noted that in some of the above-described embodiments, configuration of uplink resources and transmission of uplink signals are considered in a case of communication between a terminal and a base station operating in a full-duplex mode. However, it is obvious to those skilled in the art that these embodiments, after modified slightly (for example, replacing the terminal with an IAB node and replacing the base station with an IAB donor), can also be used for communication between the IAB node and the IAB donor. In this case, the IAB donor is functionally similar to the base station, and the IAB node is functionally similar to the terminal.

When a communication device (such as a terminal or a base station) operating in a full-duplex mode performs digital domain self-interference cancellation, if non-ideal characteristics in the receiver are mathematically modeled and then estimated and processed by using a conventional signal processing method, complexity will be very high. In addition, some non-ideal characteristics cannot be modeled, thereby affecting a result of self-interference cancellation.

In order to at least solve this problem, at least one embodiment of the present disclosure proposes a digital domain self-interference cancellation method based on a neural network. By using this method, a neural network (for example, a single-layer neural network) can be used to approximate the non-ideal characteristics of the circuit (for example, nonlinear characteristics, synchronization error, and the like in the PA), so as to achieve accurate self-interference cancellation. In addition, it should be noted that the structure of the self-interference cancellation circuit and/or the self-interference cancellation method described below can be applied to any suitable communication device, such as a terminal, a base station, an IAB node, or an IAB donor.

FIG. 30 shows a structural schematic diagram of a digital domain self-interference cancellation circuit based on a neural network according to at least one embodiment of the present disclosure.

Referring to FIG. 30, the digital domain self-interference cancellation circuit can include a neural network preprocessing module 3010, a neural network 3020, a neural network post-processing module 3030, and a self-interference cancellation module 3040.

An input of the neural network preprocessing module 3010 includes a PA-related parameter (for example, a memory depth M of the PA) and a local baseband signal. The neural network preprocessing module 3010 is configured to convert the local baseband signal and the PA-related parameter into a neural network input suitable for being processed by the neural network post-processing module.

FIG. 31 shows a structural schematic diagram of a neural network preprocessing module according to some embodiments of the present disclosure. Referring to FIG. 31, the neural network preprocessing module can include $$\frac{P+1}{2}$$

component generators, including a first-order component generator, a third-order component generator, . . . , and a P-th order component generator. For example, the P-th order component generator is configured to generate a P-th order component of the input. Each component generator corresponds to an IQ decomposer, where P is an cancellation order and can be a positive odd number. The IQ decomposer can be configured to separate and decompose a real part and an imaginary part of an output of the corresponding component generator to obtain a component preprocessing signal composed of the real part and the imaginary part. For specific configuration of the neural network preprocessing module 3010, reference can be made to method embodiments below.

The neural network 3020 is configured to process the neural network input and output a processing result. The neural network 3020 can be a feedforward neural network, for example. For specific configuration of the neural network 3020, reference can be made to the method embodiments below.

The neural network post-processing module 3030 is configured to reconstruct a self-interference signal based on the processing result. For specific configuration of the neural network post-processing module 3030, reference can be made to the method embodiments below.

The self-interference cancellation module 3040 is configured to perform self-interference cancellation based on a reconstructed self-interference signal and a received signal. For specific configuration of the self-interference cancellation module 3040, reference can be made to the method embodiments below.

Each of the components in FIGS. 30 and 31 can be implemented using only hardware or a combination of hardware and software/firmware. As a particular example, at least some of the components in FIGS. 30 and 31 can be implemented with software, while other components can be implemented with configurable hardware or a mixture of software and configurable hardware.

It should be noted that although the neural network pre-processing module 3010, neural network 3020, and neural network post-processing module 3030 are shown as separate structures, these modules can be combined together to form a neutral network for self-interference signal reconstruction based on the PA-related parameter (for example, the memory depth M of the PA) and the local baseband signal.

As shown in FIG. 30, the local baseband signal and the PA-related parameter in the digital domain are input to the neural network preprocessing module. The neural network preprocessing module converts the local baseband signal into a form matching an input of the feedforward neural network, and then inputs it into the feedforward neural network. A self-interference signal is reconstructed by the feedforward neural network, and an output of the feedforward neural network passes through the neural network post-processing module to generate a reconstructed self-interference signal in the digital domain. The reconstructed self-interference signal is then input to the digital domain self-interference cancellation module. The digital domain self-interference cancellation module cancels the reconstructed self-interference signal with the received self-interference signal to complete self-interference cancellation in the digital domain.

In some embodiments, the neural network 3020 (e.g., a feedforward neural network) is a single-layer neural network (i.e., there is only one output layer in addition to one input layer). The number of neural cells in the output layer can be 2, for example. The activation function can be, for example, a linear function, such as f(x)=x. Compared with the digital domain self-interference cancellation method based on a multi-layers neural network, use of a digital domain self-interference cancellation circuit based on a single-layer neural network can quickly track non-ideal characteristics of the transmitter and receiver and change of a self-interference channel.

In some embodiments, the digital domain self-interference cancellation circuit needs to use specific training resources for neural network training. When the communication device is, for example, a base station, as for the method for configuring specific training resources, the content described above can be referred to. When the communication device is, for example, a terminal, the terminal can select appropriate resources as training resources for training.

The above describes the structure of the digital domain self-interference cancellation circuit based on the neural network according to at least one embodiment of the present disclosure. The following describes a method for self-interference cancellation using the self-interference cancellation circuit in FIG. 30 according to at least one embodiment of the present disclosure.

FIG. 32 shows a flowchart of a self-interference cancellation method according to at least one embodiment of the present disclosure.

Referring to FIG. 32, in step S3210, a local baseband signal and a parameter related to the PA model of the receiver (referred to as a "PA-related parameter") are processed by using a neutral network to reconstruct a self-interference signal. The neural network can be a single-layer neural network including an input layer and an output layer. For example, the neural network can be implemented as the neural network pre-processing module 3010, neural network 3020, and neural network post-processing module 3030 described in FIG. 30.

Then, in step S3220, self-interference cancellation is performed based on a reconstructed self-interference signal and a received signal. For example, the reconstructed self-interference signal can be subtracted from the received signal to complete the self-interference cancellation.

In some embodiments, before the step S3210, the method can further include adjusting parameters of the neural network.

In some examples, adjusting the parameters of the neural network can include determining a number of neurons in the input layer of the neural network according to a multipath number L of self-interference channel, and/or the memory depth M of the PA, and/or the cancellation order P, and/or a length K of the interpolation kernel.

For example, the number of neurons in the input layer of the neural network can be determined based on equation (1):

$$N = 2 \left[ \max\{L, M, K/2\} + \frac{K}{2} \right] \sum_{p=1}^{(P+1)/2} M^{2p-1}$$ [Equation (1)]

In equation (1), max{L,M,K/2} represents a memory depth of the network, that is, how many data at past moments are related. Influence of the self-interference channel of the multipath number L on the received signal can mean that a received signal at each receiving sampling moment is related to transmitted data at past L−1 sampling moments, influence of the memory depth M of the power amplifier on the received signal can mean that a received signal at each receiving sampling moment is related to transmitted data at past M−1 sampling moments, so max{L, M} means including a maximum memory depth of the PA of the transmitter and of the self-interference channel. In addition, when the receiver is sampling, the received signal with fractional sampling error can be regarded as a result of interpolation (for example, using sinc function interpolation) of the received signal without fractional sampling error; the length of the interpolation kernel (for example, sinc function interpolation) being K indicates that when interpolating data at a certain moment (for example, sinc function interpolation), data of past K/2 moments and data of future $$\frac{K}{2} - 1$$

moments shall be used, that is, in order to process the fractional sampling error, the neural network needs the data of past K/2 moments and the data of future $$\frac{K}{2} - 1$$

moments when reconstructing the self-interference signal. Therefore, max{L,M,K/2} represents the memory depth of the entire network, and max $$\{L, M, K/2\} + \frac{K}{2}$$

represents a number of data of the local baseband signal required to reconstruct the self-interference signal at one moment. In addition, each moment the local baseband signal passes through the PA of the transmitter, it will produce M first-order components, $M^3$ third-order components, . . . , $M^{2P-1}$ of (p+1)/2-th order components, so the self-interference received at each moment is a weighted sum of $$\left[ \max\{L, M, K/2\} + \frac{K}{2} \right] \sum_{p=1}^{(P+1)/2} M^{2p-1}$$

complex signals. In addition, because the neural network only processes real numbers, and each complex number can be decomposed into real and imaginary parts, the self-interference signal received at each moment is a weighted sum of $$2 \left[ \max\{L, M, K/2\} + \frac{K}{2} \right] \sum_{p=1}^{(P+1)/2} M^{2p-1}$$

complex signals. Finally, the number of neurons in the input layer can be determined as $$2 \left[ \max\{L, M, K/2\} + \frac{K}{2} \right] \sum_{p=1}^{(P+1)/2} M^{2p-1}.$$

In equation (1), the multipath number L of the self-interference channel can be set to a positive integer that does not exceed the number of cyclic prefix sampling points, or can be set dynamically. The following describes an example of a particular setting method: during a first neural network training, the multipath number L of the self-interference channel can be set to a positive integer that does not exceed the number of cyclic prefix sampling points; each time after the neural network training is completed, before a next neural network training, the base station estimates the multipath number of the self-interference channel during self-interference channel estimation; in the next neural network training, the multipath number L of the self-interference channel is set to the estimated multipath number of the self-interference channel.

In equation (1), the memory depth M can be given by the PA model. For example, if the PA model is a "no memory model", the memory depth M=1, and if the PA model is a "memory model", the memory depth M is a positive number greater than 1.

In equation (1), the cancellation order P can be a positive odd number. For example, if only the linear component of PA needs to be cancelled, then P=1, if it is needed to cancel the third-order component of PA, then P=3, and so on. The length K of the interpolation kernel can be a positive even number, for example, it can be set to 8, 16, or 32.

In some embodiments, step S810 can include inputting the local baseband signal and PA-related parameter into the neural network preprocessing module for preprocessing.

Referring to FIG. 31, the neural network preprocessing module includes $$\frac{P+1}{2}$$

component generators, and each component generator corresponds to an IQ decomposer. Since the processing method at each moment is the same, as an example, the following only describes a calculation process of M elements of x(n−M−1) to x(n) at an n-th moment in the neural network preprocessing module.

Each of the M elements of x(n−M−1) to x(n) is processed by a component generator of each orders, wherein M first-order components are obtained after processing by a first-order component generator, $M^3$ third-order components are obtained after processing by a third-order component generator, and $M^5$ fifth-order components are obtained after processing by a fifth-order component, and so on. Then, an output of each order component generator is input to the IQ decomposer to separate a real part from an imaginary part to obtain a preprocessing signal of each order component. Among the M first-order components generated by the first-order component generator, an item numbered $i_1$ is x(n−$i_1$), where a value of $i_1$ goes from 0 to M−1 among the $M^3$ third-order components generated by the third-order component generator, an item numbered ($i_1$, $i_2$, $i_3$) is x(n−$i_1$)x(n−$i_2$)x*(n−$i_3$), where values of $i_1$, $i_2$ and $i_3$ go from 0 to M−1, and a superscript "*" indicates a conjugate operation; among the $M^5$ fifth-order components generated by the fifth-order component generator, an item numbered ($i_1$, $i_2$, $i_3$, $i_4$, $i_5$) is x(n−$i_1$)x(n−$i_2$)x(n−$i_3$)x*(n−$i_4$)x*(n−$i_5$), where values of $i_1$, $i_2$, $i_3$, $i_4$ and $i_5$ go from 0 to M−1, and a superscript "*" indicates a conjugate operation, and so on. In this way, $$2\sum_{p=1}^{(P+1)/2} M^{2p-1}$$

preprocessing signal values can be obtained at each sampling moment. For convenience of presentation, these preprocessing signal values are expressed as a preprocessing signal vector $\vec{x}_n$ with $$2\sum_{p=1}^{(P+1)/2} M^{2p-1}$$

rows and 1 column. n is given a value starting from n=M, and preprocessing signal vectors composed of the preprocessing signals at each sampling moment can be obtained, namely $\hat{x}_M$, $\vec{x}_{M+1}$, $\vec{x}_{M+2}$, and so on.

Assuming that a sampling moment to reconstruct a self-interference signal is m, where m>N, in order to reconstruct the self-interference signal at the sampling moment m, it is necessary to input all the $$N + \frac{K}{2}$$

preprocessing signal vectors of $$\vec{x}_{m-N} \text{ to } \vec{x}_{m+\frac{K}{2}-1}$$

into the feedforward neural network. A total number of elements of these $$N + \frac{K}{2}$$

preprocessing signal vectors is $$2\left(N + \frac{K}{2}\right)\sum_{p=1}^{(p+1)/2} M^{2p-1},$$

which is the same as the number of neurons in the input layer of the neural network.

After all the $$N + \frac{K}{2}$$

preprocessing signal vectors of $$\vec{x}_{m-N} \text{ to } \vec{x}_{m+\frac{K}{2}-1}$$

are input into the feedforward neural network, two real numbers can be obtained from the output layer through operation of the neutral network.

The two outputs of the feedforward neural network are taken as the real part and the imaginary part respectively, to obtain a reconstructed self-interference signal in the form of complex number at the sampling moment m.

Among the received signal in the form of complex number at the sampling moment m, the obtained reconstructed self-interference signal in the form of complex number at the sampling moment m is subtracted, to complete the digital domain self-interference cancellation at the sampling moment m.

In the embodiments of the present disclosure, the parameters of the neural network in the self-interference cancellation method based on the neural network can be determined through training. For example, sampling outputs of channel I and channel Q of the receiving link can be used as labels. The labels and the symbols of the local baseband signal serving as the neural network input at the transmitting end form a training data sample, and a plurality of training data samples form a training data set. The neural network is trained using the training data set to obtain a trained neural network, and the trained neural network is used to reconstruct the self-interference signal. The training method can adopt, for example, a stochastic gradient descent. In addition, the parameters of the neural network can be continuously updated during the communication process to have a better approximation of the environmental channel changes.

In the digital domain self-interference cancellation method according to some embodiments of the present disclosure, components of the receiver (for example, PA) are modeled, and the parameter related to the PA model (for example, the memory depth M of the PA) together with the local baseband signal are input to a machine learning model (e.g., a neural network) for calculation to reconstruct a self-interference signal, wherein non-ideal characteristics such as fractional synchronization errors are simulated by the neural network. In this way, there is no need to model the non-ideal characteristics of components other than the PA (for example, fractional synchronization errors), to achieve accurate self-interference cancellation.

FIG. 33 shows a flowchart of a method performed by a first communication device according to at least one embodiment of the present disclosure.

Referring to FIG. 33, in step S3310, the first communication device receives configuration information, for example, from a second communication device, wherein the configuration information indicates one or more resources. For example, the configuration information indicates one or more resources (hereinafter, referred to as "training resources") used when a receiver of the second communication device is trained. That is, the one or more resources can be related to the training of the receiver of the second communication device.

Then, in step S3320, the first communication device determines not to perform communication with the second communication device on at least one of the one or more resources based on the configuration information.

In some embodiments, the not performing communication with the second communication device on the at least one of the one or more resources includes: not transmitting an uplink physical channel and/or an uplink physical signal on at least one of the one or more resources. For example, the uplink physical channel can include at least one of: a physical uplink shared channel, a physical uplink control channel, or a physical random access channel. For example, the uplink physical signal can include at least one of: a demodulation reference signal of a physical uplink shared channel, a demodulation reference signal of a physical uplink control channel, a sounding reference signal, or a phase tracking reference signal.

In some embodiments, additionally or alternatively, the not performing communication with the second communication device on the at least one of the one or more resources can include: not receiving a downlink physical channel and/or a downlink physical signal on at least one of the one or more resources. For example, the downlink physical channel can include at least one of: a physical broadcast channel, a physical downlink shared channel, or a physical downlink control channel. For example, the downlink physical signal can include at least one of: a demodulation reference signal, a phase tracking reference signal, a channel state information reference signal, a primary synchronization signal, or a secondary synchronization signal.

In some embodiments, the configuration information can include at least one of: periodic training resource information, periodic training resource indication information, or training activation indication information. The periodic training resource information is used to indicate the location of the periodic training resource. The periodic training resource indication information is used to indicate at least one periodic training resource information which is actually applied among the configured one or more periodic training resource information. The training activation indication information is used to indicate whether to activate at least one periodic training resource information which is actually applied. For an exemplary embodiment of the configuration information, reference can be made to various embodiments described previously (for example, the embodiments described in conjunction with FIG. 28 and FIG. 29), and repeated descriptions are omitted here.

In some embodiments, the configuration information can include one or more periodic training resource information, training activation indication information, and periodic training resource indication information.

In some embodiments, the determining, based on the configuration information, not to perform communication with the second communication device on the at least one of the one or more training resources includes: determining at least one periodic training resource information which is actually applied among the one or more periodic training resource information based on the periodic training resource indication information; determining whether a number of the at least one periodic training resource information which is actually applied is equal to a predetermined value; determining whether the training activation indication information activates the at least one periodic training resource information which is actually applied, when the number of the at least one periodic training resource information which is actually applied is equal to the predetermined value; and determining not to perform communication with the second communication device on a periodic resource indicated by the at least one periodic training resource information, when it is determined that the training activation indication information activates the at least one periodic training resource information which is actually applied.

In some embodiments, the predetermined value is 1.

In some embodiments, the periodic training resource information can include at least one of: information on a time domain location of the periodic training resource or information on a frequency domain location of the periodic training resource.

In some embodiments, the information on the time domain location of the periodic training resource can include information on a duration of the periodic training resource.

In some embodiments, the information on the time domain location of the periodic training resource can include information on a bitmap related to the time domain location of the periodic training resource.

In some embodiments, the information on the frequency domain location of the periodic training resource can include information on a start resource block sequence number of the periodic training resource in a system bandwidth and the number of occupied resource blocks.

In some embodiments, the information on the frequency domain location of the periodic training resource can include information on a bitmap related to the frequency domain location of the periodic training resource.

For an exemplary embodiment of the periodic training resource information, reference can be made to various embodiments described previously (for example, the embodiments described in conjunction with FIG. 28 and FIG. 29), and repeated descriptions are omitted here.

In some embodiments, the configuration information can include aperiodic training resource information, and the aperiodic training resource information can be used to indicate a location of an aperiodic training resource.

In some embodiments, the determining, based on the configuration information, not to perform communication with the second communication device on at least one of the one or more resources can include: not performing communication with the second communication device on the aperiodic training resource indicated by the aperiodic training resource information.

In some embodiments, the aperiodic training resource information can include at least one of: information on a time domain location of the aperiodic training resource or information on a frequency domain location of the aperiodic training resource.

In some embodiments, the information on the time domain location of the aperiodic training resource can include information on a time delay and duration relative to time when the aperiodic training resource information is received.

In some embodiments, the information on the time domain location of the aperiodic training resource can include information on a time domain location and duration of a first half-slot of the aperiodic training resource.

In some embodiments, the information on the frequency domain location of the aperiodic training resource can include information on a start resource block sequence number of the aperiodic training resource in a system bandwidth and a number of occupied resource blocks.

In some embodiments, the information on the frequency domain location of the aperiodic training resource can include information on a bitmap related to the frequency domain location of the aperiodic training resource.

For an exemplary embodiment of the aperiodic training resource information, reference can be made to various embodiments described previously (for example, the embodiments described in conjunction with FIG. 28 and FIG. 29), and repeated descriptions are omitted here.

In some embodiments, for example, the configuration information is received through system information, physical layer signaling or higher-layer signaling.

In some embodiments, for example, the first communication device is a terminal, and the second communication device is a base station.

In some embodiments, for example, the first communication device is an Integrated Access and Backhaul (IAB) node, and the second communication device is an IAB donor.

The method performed by the first communication device according to at least one embodiment of the present disclosure has been described above. By using this method, the second communication device can be protected from interference of any other communication transmission (for example, UL transmission from the first communication device) when it needs to train its receiver (for example, the machine learning model of the receiver, such as a neural network). Therefore, by using this method, a conflict between the transmission or reception of the first communication device and the training of the receiver of the second communication device is avoided. In addition, by using this method, the behavior of the terminal when the second communication device is trained is clarified, to avoid invalid communication in some of the training resources of the first communication device, so as to improve communication efficiency of the first communication device.

FIG. 34 shows a flowchart of a method performed by a second communication device according to at least one embodiment of the present disclosure.

Referring to FIG. 34, in step S3410, configuration information is transmitted to the first communication device, wherein the configuration information indicates one or more resources. For example, the configuration information indicates one or more resources (which, for example, can be referred to as "training resources") used when a receiver of the second communication device is trained. That is, the one or more resources can be related to the training of the receiver of the second communication device.

Then, in step S3420, the second communication device does not perform communication with the first communication device on at least one of the one or more resources determined based on the configuration information.

In some embodiments, the not performing communication with the first communication device on at least one of the one or more resources includes: not receiving an uplink physical channel and/or an uplink physical signal on at least one of the one or more resources. For example, the uplink physical channel can include at least one of: a physical uplink shared channel, a physical uplink control channel, or a physical random access channel. For example, the uplink physical signal can include at least one of: a demodulation reference signal of a physical uplink shared channel, a demodulation reference signal of a physical uplink control channel, a sounding reference signal, or a phase tracking reference signal.

In some embodiments, additionally or alternatively, the not performing communication with the first communication device on at least one of the one or more resources can include: not transmitting a downlink physical channel and/or a downlink physical signal on at least one of the one or more resources. For example, the downlink physical channel can include at least one of: a physical broadcast channel, a physical downlink shared channel, or a physical downlink control channel. For example, the downlink physical signal can include at least one of: a demodulation reference signal, a phase tracking reference signal, a channel state information reference signal, a primary synchronization signal, or a secondary synchronization signal.

In some embodiments, the configuration information can include at least one of: periodic training resource information, periodic training resource indication information, or training activation indication information. The periodic training resource information is used to indicate the location of the periodic training resource. The periodic training resource indication information is used to indicate at least one periodic training resource information which is actually applied among the configured one or more periodic training resource information. The training activation indication information is used to indicate whether to activate at least one periodic training resource information which is actually applied.

For an exemplary embodiment of the configuration information, reference can be made to various embodiments described previously (for example, the embodiments described in conjunction with FIG. 28 and FIG. 29), and repeated descriptions are omitted here.

In some embodiments, the periodic training resource information can include at least one of: information on a time domain location of the periodic training resource or information on a frequency domain location of the periodic training resource.

In some embodiments, the not performing communication with the first communication device on at least one of the one or more resources can include: not performing communication with the first communication device on the periodic training resource indicated by the periodic training resource information.

In some embodiments, the information on the time domain location of the periodic training resource can include information on duration of the periodic training resource.

In some embodiments, the information on the time domain location of the periodic training resource can include information on a bitmap related to the time domain location of the periodic training resource.

In some embodiments, the information on the frequency domain location of the periodic training resource can include information on a start resource block sequence number of the periodic training resource in a system bandwidth and a number of occupied resource blocks.

In some embodiments, the information on the frequency domain location of the periodic training resource can include information on a bitmap related to the frequency domain location of the periodic training resource.

For an exemplary embodiment of the periodic training resource information, reference can be made to various embodiments described previously (for example, the embodiments described in conjunction with FIG. 28 and FIG. 29), and repeated descriptions are omitted here.

In some embodiments, the configuration information can include aperiodic training resource information, and the aperiodic training resource information can be used to indicate a location of an aperiodic training resource.

In some embodiments, the not performing uplink reception from the first communication device on at least one of the one or more resources determined based on the configuration information can include: not performing the uplink reception from the first communication device on the aperiodic training resource indicated by the aperiodic training resource information.

In some embodiments, the aperiodic training resource information can include at least one of: information on a time domain location of the aperiodic training resource or information on a frequency domain location of the aperiodic training resource.

In some embodiments, the information on the time domain location of the aperiodic training resource can include information on a time delay and duration relative to time when the aperiodic training resource information is received.

In some embodiments, the information on the time domain location of the aperiodic training resource can include information on a time domain location and duration of a first half-slot of the aperiodic training resource.

In some embodiments, the information on the frequency domain location of the aperiodic training resource can include information on a start resource block sequence number of the aperiodic training resource in a system bandwidth and the number of occupied resource blocks.

In some embodiments, for example, the information on the frequency domain location of the aperiodic training resource can include information on a bitmap related to the frequency domain location of the aperiodic training resource.

For an exemplary embodiment of the aperiodic training resource information, reference can be made to various embodiments described previously (for example, the embodiments described in conjunction with FIG. 28 and FIG. 29), and repeated descriptions are omitted here.

In some embodiments, for example, the configuration information is transmitted through system information, physical layer signaling or higher-layer signaling.

In some embodiments, for example, the method further includes: obtaining, using a machine learning model, a reconstructed self-interference signal based on a local baseband signal and parameters related to a power amplifier, and obtaining a self-interference cancellation signal based on the reconstructed self-interference signal and a received signal. For an exemplary embodiment of the method for the second communication device to perform self-interference cancellation, reference can be made to the various embodiments described previously (for example, the embodiments described in conjunction with FIG. 30-FIG. 32), and repeated descriptions are omitted here.

In some embodiments, for example, the first communication device is a terminal, and the second communication device is a base station.

In some embodiments, for example, the first communication device is an IAB node, and the second communication device is an IAB donor.

The method performed by the second communication device according to at least one embodiment of the present disclosure has been described above. By using this method, the second communication device can be protected from interference of any other communication transmission (for example, UL transmission from the first communication device) when it needs to train its receiver (for example, the machine learning model of the receiver, such as a neural network). Therefore, by using this method, a conflict between the transmission or reception of the first communication device and the training of the receiver of the second communication device is avoided.

FIG. 35 shows a block diagram of an apparatus for self-interference cancellation according to some embodiments of the present disclosure. For example, the apparatus 3500 can be a base station or a terminal, or be implemented as a part of the base station or the terminal. Alternatively, the apparatus can be an IAB node or an IAB donor, or be implemented as a part of the IAB node or the IAB donor.

Referring to FIG. 35, the apparatus 3500 for self-interference cancellation according to some embodiments of the present disclosure can include a transceiver 3501 and a controller 3502. For example, the controller 3502 can be coupled to the transceiver 3501. For example, the transceiver 3501 can be configured to transmit and receive signals. For example, the controller 3502 can be configured to execute the method for self-interference cancellation described above.

FIG. 36 shows a block diagram of configuration of a terminal according to some embodiments of the present disclosure.

Referring to FIG. 36, a terminal 3600 according to some embodiments of the present disclosure can include a transceiver 3601 and a controller 3602. For example, the controller 3602 can be coupled to the transceiver 3601. For example, the transceiver 3601 can be configured to transmit and receive signals. For example, the controller 3602 can be configured to perform one or more operations in the method according to some embodiments described above.

Although the terminal is illustrated as having separate functional blocks for convenience of explanation, the configuration of the terminal 3600 is not limited thereto. For example, the terminal 3600 can include a communication unit composed of a transceiver and a processor. The terminal 3600 can communicate with at least one network node by means of the communication unit.

FIG. 37 shows a block diagram of configuration of a base station according to some embodiments of the present disclosure.

Referring to FIG. 37, a base station 3700 according to various embodiments of the present disclosure can include a transceiver 3701 and a controller 3702. For example, the controller 3702 can be coupled to the transceiver 3701. For example, the transceiver 3701 can be configured to transmit and receive signals. The controller 3702 can be configured to perform one or more operations in the method according to some embodiments described above.

Although the base station 3700 is illustrated as having separate functional blocks for convenience of explanation, the configuration of the base station is not limited thereto. For example, the base station 3700 can include a communication unit composed of a transceiver and a processor. The base station 3700 can communicate with at least one network node by means of the communication unit.

FIG. 38 shows a block diagram of configuration of a wireless communication system according to some embodiments of the present disclosure.

Referring to FIG. 38, a wireless communication system 3800 according to some embodiments of the present disclosure can include the terminal 3600 shown in FIG. 36 and the base station 3700 shown in FIG. 37. The terminal 3600 can communicate with the base station 3700 through a radio link.

FIG. 24 shows a block diagram of configuration of an IAB node according to some embodiments of the present disclosure.

Referring to FIG. 24, an IAB node 2400 according to some embodiments of the present disclosure can include a transceiver 2401 and a controller 2402. For example, the controller 2402 can be coupled to the transceiver 2401. For example, the transceiver 2401 can be configured to transmit and receive signals. For example, the controller 2402 can be configured to execute the method according to some embodiments described above.

Although the IAB node 2400 is illustrated as having separate functional blocks for convenience of explanation, the configuration of the IAB node 2400 is not limited thereto. For example, the IAB node 2400 can include a communication unit composed of a transceiver and a processor. The IAB node 2400 can communicate with at least one network node by means of the communication unit.

FIG. 25 shows a block diagram of configuration of an IAB donor according to some embodiments of the present disclosure.

Referring to FIG. 25, an IAB donor 2500 according to some embodiments of the present disclosure can include a transceiver 2501 and a controller 2502. For example, the controller 2502 can be coupled to the transceiver 2501. For example, the transceiver 2501 can be configured to transmit and receive signals. The controller 2502 can be configured to execute the method according to some embodiments described above.

Although the IAB donor 2500 is illustrated as having separate functional blocks for convenience of explanation, the configuration of the IAB donor 2500 is not limited thereto. For example, the IAB donor 2500 can include a communication unit composed of a transceiver and a processor. The IAB donor 2500 can communicate with at least one network node by means of the communication unit.

FIG. 26 shows a block diagram of configuration of a wireless communication system according to some embodiments of the present disclosure.

Referring to FIG. 26, a wireless communication system 2600 according to some embodiments of the present disclosure can include the IAB node 2400 shown in FIG. 24 and the IAB donor 2500 shown in FIG. 25. The IAB node 2400 can communicate with the IAB donor 2500 through a radio link.

According to an embodiment of the present disclosure, at least a part of an apparatus (for example, a module or its function) or a method (for example, an operation or step) can be implemented as, for example, instructions stored in a computer-readable storage medium (for example, memory) in the form of program modules. When the instructions are performed by a processor or a controller, the instructions can enable the processor or the controller to perform corresponding functions. The computer readable medium can include, for example, a hard disk, a floppy disk, a magnetic medium, an optical recording medium, a DVD, and a magneto-optical medium. The instructions can include code created by a compiler or code executable by an interpreter. The modules or devices according to various embodiments of the present disclosure can include at least one or more of the above-mentioned components, some of them can be omitted, or other additional components can also be included. Operations performed by modules, programming modules, or other components according to various embodiments of the present disclosure can be performed sequentially, in parallel, repeatedly, or heuristically, or at least some operations can be performed in a different order or omitted, or other operations can be added.

The embodiments of this application are only for ease of description and help comprehensive understanding of this application, and are not intended to limit the scope of this application. Therefore, it should be understood that, except for the embodiments disclosed herein, all modifications and changes or forms of modifications and changes derived from the technical idea of the present application fall within the scope of the present application.

The invention claimed is:

1. An uplink signal transmission method performed by a terminal, the method comprising:

reporting, to a base station, parameters for signal transmission quality of an uplink signal in a specific modulation mode;

acquiring, from the base station, configuration parameters of at least one of an uplink physical channel or a physical signal determined based on the reported parameters for the signal transmission quality; and transmitting an uplink signal according to the configuration parameters of the at least one of the uplink physical channel or the physical signal, wherein the parameters for the signal transmission quality include a first quality parameter and a second quality parameter, wherein the first quality parameter indicates a capability to transmit a signal that does not satisfy a preset signal transmission quality requirement in the specific modulation mode, and wherein the second quality parameter comprises one or more signal transmission quality levels that the terminal supports.

2. The method of claim 1, wherein the specific modulation mode is at least one of 256 quadrature amplitude modulation (QAM), 1024 QAM, amplitude-phase keying modulation or star-QAM.

3. The method of claim 1, wherein the parameters for the signal transmission quality further include at least one of:

a third quality parameter, comprising at least one of a time-frequency resource pattern indicator and a reference signal sequence indicator, and to indicate a reference signal type that the terminal can support; or a fourth quality parameter, to indicate uplink power adjustment level(s) that the terminal supports; and a fifth quality parameter, to indicate a signal transmission quality characteristic indicator of the signal transmitted by the terminal, wherein the signal transmission quality characteristic indicator represents a mathematical feature of a nonlinear characteristic of the signal and includes at least one of a model type indicator or a model parameter indicator of the nonlinear characteristic of the signal.

4. The method of claim 3, wherein the first quality parameter is represented by 1 bit.

5. The method of claim 3, wherein the reporting further comprises:

in case that the second quality parameter is included in the parameters for the signal transmission quality and a signal transmission quality level is reported, indicating the highest quality level, the lowest quality level, or a predetermined quality level that is achieved by the signal transmitted by the terminal; and in case that a plurality of signal transmission quality levels are reported, indicating that the terminal supports each of the plurality of signal transmission quality levels.

6. The method of claim 1, wherein the configuration parameters include at least one of:

a signal transmission quality level indicator, to determine the signal transmission quality level required to be satisfied to transmit uplink signal;

a reference signal sequence indicator, to determine a sequence of a reference signal; a reference signal time-frequency resource pattern indicator; and a power adjustment level indicator, to determine an uplink power adjustment level to calculate transmission power.

7. The method of claim 6, wherein the time-frequency resource pattern indicator represents a design of at least one of when there are one or more reference symbols in a transmission time slot or when one reference symbol occupies one or more frequency domain subcarriers, wherein the design comprises one of:

a plurality of adjacent reference symbols are located in a start position of the transmission time slot, frequency domain is continuous;

a plurality of adjacent reference symbols are located in the middle position of the transmission time slot, frequency domain is continuous;

a plurality of separate reference symbols are located in the start position and middle position of the transmission time slot, frequency domain is continuous;

a plurality of adjacent reference symbols are located in the start position of the transmission time slot, frequency domain is discrete;

a plurality of adjacent reference symbols are located in the middle position of the transmission time slot, frequency domain is discrete; and a plurality of separate reference symbols are located in the start position and middle position of the transmission time slot, frequency domain is discrete.

8. The method of claim 3, wherein the reference signal sequence indicator represents a design of a reference signal sequence that makes the reference signal and data have similar signal transmission quality, wherein the design comprises at least one of: a power-boosted low-peak-to-average power ratio sequence, a zero-inserted low-peak-to-average power ratio sequence, a scrambled low-peak-to-average power ratio sequence, or a quadrature amplitude-modulated pseudo-random sequence.

9. The method of claim 8, wherein the scrambled low-peak-to-average power ratio sequence is generated using the following formula:

$$r_{RS}(n) = \bar{r}_{u,v}(n) * (1 - 2c(n)), \text{ or } r_{RS}(n) = \bar{r}_{u,v}(n) * (2c(n) - 1),$$

where $\bar{r}_{u,v}(n)$ is the low-peak-to-average power ratio sequence, and c (n) is the scrambled sequence.

10. The method of claim 3, wherein the fourth quality parameter comprises a power adjustment level indicator, the power adjustment level indicator comprising at least one of a maximum transmission power adjustment level indicator, a power headroom (PH) adjustment level indicator, or a transmission power adjustment level indicator.

11. The method of claim 1, wherein the acquiring configuration parameters of the uplink physical channel and/or the physical signal comprises: acquiring the configuration parameters by at least one of analyzing media access control (MAC) information of a downlink control channel, analyzing MAC information of high-layer signaling, analyzing MAC information of a downlink shared channel, or using a preset value.

12. The method of claim 6, wherein when the power adjustment level indicator is a maximum transmission power adjustment level indicator, wherein the method further comprises: determining the transmission power according to an adjustment value $\delta$ corresponding to the maximum transmission power adjustment level indicator.

13. A method for receiving uplink signal transmission performed by a base station, the method comprising:

receiving, from a terminal, parameters for signal transmission quality of an uplink signal in a specific modulation mode;

transmitting, to the terminal, configuration parameters of at least one of an uplink physical channel or a physical signal determined based on the received parameters for the signal transmission quality; and receiving an uplink signal according to the configuration parameters of the uplink physical channel or the physical signal, wherein the parameters for the signal transmission quality include a first quality parameter and a second quality parameter, wherein the first quality parameter indicates a capability to transmit a signal that does not satisfy a preset signal transmission quality requirement in the specific modulation mode, and wherein the second quality parameter comprises one or more signal transmission quality levels that the terminal supports.

14. The method of claim 13, wherein the specific modulation mode is at least one of 256 quadrature amplitude modulation (QAM), 1024 QAM, amplitude-phase keying modulation, or star-QAM.

15. A terminal for an uplink signal transmission, the terminal comprising:

a transceiver; and at least one processor configured to:

report, to a base station via the transceiver, parameters for signal transmission quality of an uplink signal in a specific modulation mode, acquire, from the base station, configuration parameters of at least one of an uplink physical channel or a physical signal determined based on the reported parameters for the signal transmission quality, and transmit, via the transceiver, an uplink signal according to the configuration parameters of the at least one of the uplink physical channel or the physical signal, wherein the parameters for the signal transmission quality include a first quality parameter and a second quality parameter, wherein the first quality parameter indicates a capability to transmit a signal that does not satisfy a preset signal transmission quality requirement in the specific modulation mode, and wherein the second quality parameter comprises one or more signal transmission quality levels that the terminal supports.

16. The terminal of claim 15, wherein the specific modulation mode is at least one of 256 quadrature amplitude modulation (QAM), 1024 QAM, amplitude-phase keying modulation or star-QAM.

17. A base station for receiving uplink signal transmission, the base station comprising:

a transceiver; and at least one processor configured to:

receive, from a terminal via the transceiver, parameters
for signal transmission quality of an uplink signal in
a specific modulation mode, transmit, to the terminal via the transceiver, configuration parameters of at least one of an uplink physical channel or a physical signal, the configuration parameters being related to the received parameters,
and receive, via the transceiver, an uplink signal according
to the configuration parameters of the uplink physical channel or the physical signal, wherein the parameters for the signal transmission quality
include a first quality parameter and a second quality
parameter, wherein the first quality parameter indicates a capability
to transmit a signal that does not satisfy a preset signal
transmission quality requirement in the specific modulation mode, and wherein the second quality parameter comprises one or
more signal transmission quality levels that the terminal supports.

18. The base station of claim 17, wherein the specific
modulation mode is at least one of 256 quadrature amplitude
modulation (QAM), 1024 QAM, amplitude-phase keying
modulation, or star-QAM.

* * * * *